United States Patent [19]

O'Neill

[11] 4,359,733
[45] Nov. 16, 1982

[54] SATELLITE-BASED VEHICLE POSITION DETERMINING SYSTEM

[76] Inventor: Gerard K. O'Neill, 127 McCosh Cir., Somerset County, Princeton, N.J. 08540

[21] Appl. No.: 189,744

[22] Filed: Sep. 23, 1980

[51] Int. Cl.³ ............................................. G01S 13/78
[52] U.S. Cl. ....................... 343/6.5 LC; 343/100 ST; 343/112 TC
[58] Field of Search ........ 343/6.5 R, 6.5 LC, 100 ST, 343/112 TC

[56] References Cited

U.S. PATENT DOCUMENTS

| | | |
|---|---|---|
| 2,972,742 | 2/1961 | Ross . |
| 3,047,861 | 7/1962 | Arnold et al. |
| 3,141,167 | 7/1964 | Sandretto . |
| 3,153,237 | 10/1964 | Lakatos . |
| 3,209,357 | 9/1965 | Wyatt . |
| 3,384,891 | 5/1968 | Anderson . |
| 3,430,234 | 2/1969 | Wright . |
| 3,495,260 | 2/1970 | Laughlin et al. |
| 3,497,807 | 2/1970 | Newton . |
| 3,534,367 | 10/1970 | Laughlin et al. |
| 3,544,995 | 12/1970 | Bottenberg et al. |
| 3,560,975 | 2/1971 | Manuali . |
| 3,665,464 | 5/1972 | Meilander . |
| 3,668,403 | 6/1972 | Meilander . |
| 3,742,498 | 6/1973 | Dunn . |
| 3,789,409 | 1/1974 | Easton . |
| 3,836,970 | 9/1974 | Reitzig . |
| 3,852,750 | 12/1974 | Klein . |
| 3,852,763 | 12/1974 | Kreutel, Jr. et al. |
| 4,114,155 | 9/1978 | Raab . |
| 4,161,730 | 7/1979 | Anderson . |

FOREIGN PATENT DOCUMENTS 1591518  4/1970  Fed. Rep. of Germany .

OTHER PUBLICATIONS

R. E. Anderson, "A Navigation System Using Range Measurements from Satellites with Cooperating Ground Stations", *Journal of the Institute of Navigation*, vol. 11, No. 3, pp. 315-334 (Fall 1964).

J. W. O'Grady et al., "ATCRBS Trilateration: The Advanced Airport Surface Traffic Control Sensor", *AGARD Conference Proceedings* (No. 188) on Plans and Developments for Air Traffic Systems (Cambridge, Massachusetts, May 20-23, 1975).

G. David, "Digital Airborne Equipment for AEROSAT", *Philips Telecommunication Review*, vol. 32, No. 4, pp. 225-236.

H. Hoffman, Jr., "Space Vehicle Electromagnetic Communications and Tracking", Rome Air Development Center, Griffis Air Force Base, New York, pp. 227-239.

Excerpts from NASA Report describing proposals for communications and/or navigation systems involving satellites (citation unavailable).

"NAVSTAR Plan is Not so Bright in FAA's Eyes", *North Atlantic Aviation*, 1980 (specific volume and date citation unavailable).

G. K. O'Neill, "Making the Skies Really Safe", *Washington Post*, Mar. 5, 1979, p. A-21.

*Primary Examiner*—T. H. Tubbesing
*Attorney, Agent, or Firm*—Robbins & Laramie

[57] ABSTRACT

A system for determining the positions of a plurality of vehicles traveling on or above a defined sector of the earth's surface comprises a transponder carried by each vehicle for transmitting a uniquely coded beacon signal in response to a general interrogation signal, at least three repeater-carrying satellites at spaced orbital locations above the earth for receiving and retransmitting the beacon signals produced by the vehicles, and a ground station for periodically transmitting the general interrogation signal and for receiving and processing the beacon signals retransmitted by the three satellites in order to determine vehicle position. In order to avoid signal overlap and equipment saturation at the ground station, each vehicle transponder includes means responsive to the general interrogation signal for inhibiting the transmission of further beacon signals by the transponder for a predetermined time interval following the response of the transponder to the general interrogation signal. In a preferred embodiment of the invention, the inhibited interval of the vehicle transponders may be varied automatically in response to a command signal transmitted by the ground station.

49 Claims, 29 Drawing Figures

SATELLITE-BASED VEHICLE POSITION DETERMINING SYSTEM

BACKGROUND OF THE INVENTION

1. Field of the Invention

The present inventon relates to a system for determining the instantaneous positions of a plurality of vehicles, particularly aircraft, traveling on or above a defined sector of the earth's surface.

2. Description of the Prior Art

Location of an aircraft in latitude and longitude by present-day air traffic control systems usually depends on direct radar interrogation. Radars typically scan only a few times per minute, because for each radial scanned the radar must wait for echoes out to the full range before transmitting the pulse for the next radial. Consequently, the frequency at which radar-derived position information can be updated is inherently limited. Radars are unable to detect aircraft beyond direct line-of-sight, and because of uneven terrain and the curvature of the earth many areas in which aircraft fly are unseen by radar, particularly if the aircraft is at low altitude. Although the range (i.e., the distance of the aircraft from the radar antenna) can in principle be measured quite precisely, precision of measurement of the azimuth (i.e., the bearing of an aircraft relative to North from a radar transmitter, usually expressed in degrees) depends on radar beam width and is relatively poor.

Measurement of the height of an aircraft cannot be made except very crudely by radar; therefore, even for the largest and best-equipped commercial jets, it is usually inferred from the local air pressure, corrected approximately by local barometric settings when those are known. Under the present system of air traffic control, the pressure measured by an aneroid barometer is converted to digital signals which are encoded and returned to Air Traffic Control (ATC) by way of the aircraft "transponder", a device which responds to radar impulses by returning a coded sequence of pulses. The existing system of altitude measurement is therefore inherently crude, and its usefulness for terrain avoidance in nonvisual instrument flight conditions (IFR) depends on accurate knowledge of the local barometer setting (which can change rapidly under certain weather conditions) and on the aircrew remembering to update the barometer setting frequently.

Because of the imprecise knowledge of height and azimuth, and the inability of radar to scan close to the ground, the air traffic control radar system cannot be used as a precision landing approach system in IFR conditions. It must therefore be supplemented by an entirely separate system, for example the ILS, which must be duplicated for each runway or airport.

For similar reasons, attempts to use the present system to provide warning of possible midair collisions have been unsatisfactory. At the slow radar scan rate, and with the large errors in measurement of height, azimuth and speed, the extrapolated paths of each aircraft are in fact expanding cones of uncertainty, so large in extent that many false alarms occur. In a typical moderate traffic airport region these "conflict-alert" warnings may sound ten or more times per day. Therefore, controllers tend to disregard them, having learned that most alarms are false. This has contributed to major air disasters.

The most dangerous navigational situation is flight in a mountain valley in nonvisual or IFR conditions. The present radar system can provide little help for that situation, because it cannot reach into a valley below its horizon-skyline.

Because of the many uncovered regions where radar does not reach, aircraft must navigate by still another, independent system. Of these, the most common is the Very High Frequency Omnidirectional Range (VOR) system stations to provide azimuth information. For aircraft so equipped, this is supplemented by Distance Measuring Equipment (DME) for distance from the ground VOR station. In the VOR system, a radio transmitter defines a narrow radial line which sweeps in a full circle around the transmitter many times per second. From it, special equipment on board an aircraft can obtain the bearing from the VOR transmitter. In this system azimuth is poorly measured, nominally with an uncertainty of several degrees, which converts to several miles at a typical distance of 60 miles from a VOR station. There are, in addition, many blind spots in this sytem, particularly at low altitude. Moreover, since most aircraft have to follow radial lines from VOR stations, typical air traffic routes are of zigzag form, covering greater than straight-line distance and thereby unnecessarily wasting fuel.

Distance Measuring Equipment refers to a special transmitter/receiver combination carried on board some aircraft. The transmitter sends out pulse-type interrogation signals which are received by military Tactical Air Navigation (TACAN) stations. TACAN stations are usually located at the same place as ("co-located" with) VOR stations. The TACAN station sends a reply signal which the airborne DME receives. From the elapsed time and the known speed of propagation of the radio signals, the aircraft DME computes the distance from the TACAN station. The principal drawback of this system is the complexity and expense of the airborne equipment required for interrogating the TACAN station and processing the reply signal; these factors render DME practical only for relatively expensive business aircraft, and for the larger and more sophisticated military and commercial aircraft.

The Nondirectional Beacon and the Instrument Landing System represent still further parts of the existing patchwork of air traffic control systems. The Nondirectional Beacon (NDB) is essentially a "homing" transmitter usable for nonprecision navigation and approaches. The Instrument Landing System (ILS), much more sophisticated, is implemented by special radio equipment provided for certain runways at some airports. The ILS actually consists of three separate radio systems (all unrelated to VOR, NDB or to any of the other systems described previously) for transmitting information to the aircraft relating to its left-right position and its angle vertically from the end of the runway (i.e., glideslope), and its horizontal distance from the runway. The radio information so transmitted must be decoded by special equipment provided for that purpose on board the aircraft.

Because the systems now required on an aircraft to enable it to measure its (a) height, (b) azimuth, and (c) distance from a VOR; its (d) height and (e) azimuth on ILS during a precision approach to landing; (f) its location relative to a Nondirectional Beacon (NDB); and (g) its distance from a runway on a precision approach are all different, an aircraft fully equipped for IFR flying requires a large number of different electronic units, all of them expensive and subject to failure. For that reason, only a fraction of all aircraft are equipped with even minimal blind-flying equipment. Only the largest, most expensive aircraft carry substantial redundant equipment for all of the many systems involved. Equipment weight is also a factor; on the smaller types of business aircraft normally equipped for IFR flying, the weight of the necessary IFR electronics carried is often as much as 5% of the aircraft useful load, and subtracts either from fuel or from payload.

Because the present system for precision approaches (Instrument Landing System or ILS) is unable to lead an aircraft except along a straight line, aircraft must line up for approach many miles out. This limits the ability of an airport to handle large traffic volume. Recognizing this limitation, the Federal Aviation Agency presently plans to require still another system, the Microwave Landing System (MLS), to overcome some of the deficiencies of ILS. This will further increase the onboard equipment necessary for IFR flying, and so further reduce the number of aircraft operators who can afford such flight.

A further problem in the existing system of monitoring and controlling air traffic relates to locating an aircraft in the event of a crash. At present, the so-called "emergency locator transmitter" (ELT) is relied upon for this purpose. The ELT is a battery-operated device, required by law for each aircraft, which is intended to begin transmitting a distress signal on crash impact. Most ELT signals are in fact false alarms, and in the event of an actual crash ELT antennas are often broken or covered by shielding debris, thereby rendering the ELT ineffectual. The air traffic control radar system is of little help in this critical situation, since a descending aircraft disappears below the radar horizon at the point when its situation becomes most serious.

A final problem in the existing air traffic control network is that of voice communications between aircraft and ground control. Such communications now depend on scattered transmitter-receiver locations across the country. This system, too, has blind spots, particularly at low altitudes or in mountainous terrain. In a given traffic area, it is common for many aircraft to communicate with air traffic control on the same frequency, forcing information to be exchanged on a "party line" basis and creating the danger that information intended for one aircraft will be erroneously acted on by another. During approach to landing, moreover, communications frequencies must often be switched manually as the aircraft passes from the jurisdiction of one ground controller to another, thus creating additional distraction for the aircraft's crew at a time when many other matters require their attention.

Various proposals have been made for supplementing or replacing the existing fragmented system of air traffic control and navigation with a unified, comprehensive system covering large areas of the earth's surface. One particularly ambitious attempt along these lines is the Navstar system, also referred to as the Global Positioning System (GPS), currently undergoing development in the United States by the Department of Defense. Military aircraft have navigational requirements entirely different from those of civilian aircraft. For military aircraft the cost of navigational equipment is a secondary consideration, the foremost being the ability to navigate easily in every part of the world and to avoid transmitting any signals that would reveal their whereabouts in a hostile situation. As presently envisioned, the Navstar system will employ a system of twenty-four satellites in three mutually orthogonal twelve-hour orbits about the earth (two polar and one equatorial). The satellites transmit unique identifying signals on a common carrier frequency received by the craft whose position is to be calculated. Based on the propagation times of signals from four of the satellites to the receiver on the craft, the location of the craft can be calculated from the known instantaneous positions of the satellites involved. Full implementation of this system will require, among other things, atomic clocks for providing timing synchronization to the necessary level of accuracy and complex computational equipment on the craft or at a central site accessible to the craft by a satellite link. The sophisticated equipment required for navigating with the Navstar system, particularly where the navigational computations must be carried out on board the craft, is likely to render this sytem inaccessible to most aircraft operators for cost reasons. Reference may be had to U.S. Pat. No. 4,114,155, for example, and to the references cited therein for a description of the Navstar system.

Other radio navigation systems employing artificial satellites in earth orbit have also been proposed. U.S. Pat. No. 3,665,464, for example, describes a system for high-speed aircraft position determination using three spaced antenna sites and a beacon responder aboard the aircraft to be located. The system is said to be usable in a ground-based configuration or in connection with a number of synchronous, near synchronous, or non-synchronous satellites. A beacon transmitter at one of the antenna sites interrogates the aircraft at a defined point in time using a discrete aircraft code or pulse group, in response to which the beacon responder on the aircraft transmits a reply signal which is received at all three antenna sites. A ground computer when calculates the aircraft position based on the interrogation time, the time a reply was received at each of the three antenna sites, and the known positions of the antenna sites. The aircraft position information thus calculated is transmitted back to the aircraft as part of the next interrogation signal. The problem of overlap between reply signals originating from different aircraft is handled essentially by initially determining the positions of all aircraft within the range of the system and thereafter interrogating the aircraft in order of their proximity to the beacon transmitter.

A somewhat different satellite-based radio navigation system is described in U.S. Pat. No. 3,384,891. In what is referred to as the "active" mode of operation, a ground station transmits time-spaced ranging signals to each of two satellites in synchronous or nonsynchronous orbits. The ranging signals each carry digital address codes identifying one of the satellites and the particular vehicle to be located. The satellites individually retransmit their respective ranging signals to the vehicle and also directly back to the ground station. Equipment carried aboard the vehicle repeats the two ranging signals retransmitted by the satellites and relays them back to the ground station through the respective satellites. Based on the measured differences between the arrival times at the ground station of the directly and indirectly retransmitted ranging signals associated with each satellite, the ground station computes the range of the vehicle from each satellite. Alternatively, a single nonsynchronous satellite may be interrogated at two known orbital positions to obtain the two range values. In either case, if the vehicle is located on the earth's surface, these two ranges define two circles of position intersecting at two points, one of which is the vehicle's position and the other of which is an ambiguity that is rejected based on an approximate knowledge of the vehicle's true position. If the vehicle is located above the earth's surface, a similar procedure can be carried out if the altitude of the vehicle is separately determined; alternatively, three (rather than two) satellites may be interrogated to obtain three range measurements to the vehicle, which permits calculation of a complete position fix, including altitude.

In the alternative "passive" mode of operation of the system described by U.S. Pat. No. 3,384,891, the ground station separately transmits the known instantaneous positions of the two satellites to the vehicles. Immediately thereafter, the ground station transmits ranging signals to each of the two satellites with anticipated propagation times such that the ranging signals are repeated and retransmitted by the two satellites substantially simultaneously. The retransmitted range signals are received by the vehicles with a time difference indicative of the range difference between the vehicle and the two satellites. This difference defines a hyperbolic surface which is resolved into a line of position for the vehicle if the vehicle is on the earth's surface or if its altitude is known. Repeating this procedure with different pairs of satellites produces intersecting lines of position which define the vehicle's position. The distinguishing feature of the passive mode is that no radio transmission is made from the vehicle, and its position is therefore not made known to others. A description of the above-described system in both the active and passive modes can also be found in a paper entitled "A Navigation System Using Range Measurements From Satellites With Cooperating Ground Stations", *Journal of the Institute of Navigation,* Vol. 11, No. 3 (Autumn 1964), at pp. 315–334.

U.S. Pat. No. 3,430,234 relates to a radio navigation system which employs a plurality of satellites in stationary (i.e., geosynchronous) earth orbit. In particular, six stationary satellites are evenly spaced about the earth in an equatorial plane for ensuring line-of-sight communication between a craft nearly anywhere in the world and at least two of the satellites. Each satellite carries a receiver for receiving identity-encoded interrogation signals generated by the craft to be located and a transmitter for transmitting signals synchronized with the received interrogation signals. The signals produced by the satellites in response to a craft-generated interrogation pulse are received by the craft and their time difference determined by craft-carried equipment to generate a hyperboloid which intersects the earth's surface (or, in the case of an aircraft having a known altitude, a spherical surface above the surface of the earth) to define a line of position for the craft. A second, intersecting position line is determined by measuring the round-trip transit time of an interrogation signal generated by the craft and relayed back to the craft by one of the satellites, thereby locating the craft position. Alternatively, the second position line is obtained by determining the sum of the round-trip transit times of the interrogation signal through the two satellites, which produces an elliptical position line that intersects the original hyperboloid-defined position line at the craft location. To prevent signal overlap at the satellites when a large number of craft are using the system, it is suggested that time division multiplexing may be realized by transmitting from one of the satellites an interrogation synchronizing signal which functions to ensure that the interrogation signals transmitted by the various craft sharing a common frequency occur in a predetermined sequence.

U.S. Pat. No. 3,544,995 discloses a further navigation system making use of one or more artificial earth satellites. In a first version of the system, a single satellite is used for relaying to a ground station aircraft position, identification and altitude information which has been generated separately by equipment carried on board the aircraft. The ground station receives and records the information generated by a plurality of aircraft for use in collision avoidance. In a second version of the system, signals coded with aircraft-identifying addresses are transmitted by the ground station and relayed to the identified aircraft via a pair of satellites. The aircraft carries a transponder which detects these signals and transmits a return signal that is relayed back to the ground station through the two satellites. Highly directive antennas are utilized at the ground station to separate the signals from the two satellites. The return signal includes altitude information derived from a radio or barometric altimeter aboard the aircraft. Based on the transit times of the signals relayed back to the ground station through the two satellites, a ground station computer calculates the position of the aircraft using the given altitude information. The position and aircraft identification information is then relayed back to the vehicle through one of the satellites. Overlap of return signals from different aircraft is prevented either by ensuring that the signals originated by the ground station for the different aircraft are sufficiently far apart to preclude overlap of the return signals, or by arranging the vehicle addresses in the ground station computer according to their distances from the satellite. In an exemplary system, six equidistant synchronous satellites are spaced around the earth's equator to allow coverage of all points on the surface of the earth up to geographic latitudes of $\pm 75°$.

Widespread acceptance of a satellite-based air traffic control and navigation system will ultimately depend upon the following four factors: (1) Precision of location of aircraft position, (2) the allocation of complex hardware which makes up the system as between aircraft, satellites, and ground station, (3) the extent to which the system can resist overloading or "saturation" even in the case of vigorous growth in the number of aircraft monitored by the system, and (4) the extent to which the system is adaptable to fully automatic or "pilotless" flight.

As to the first of these factors, all large-scale general-purpose position-measurement systems depend directly or indirectly on the measurement of time intervals, converted to distances through multiplication by the velocity of light. The precision of time-measurement is proportional to the bandwidth that can be allocated to the measurement. Any system that can only function effectively by subdividing the available bandwidth into a large number of narrower-band channels (for example, to avoid system saturation) must therefore sacrifice precision of measurement of time and therefore, ultimately, of position.

As to the second factor, it is clear that the optimum allocation of system components is that which places the least sophisticated hardware in the individual aircraft and the most sophisticated hardware at the ground station, since the latter represents what is essentially a one-time expenditure while the former represents an expense that is incurred for every aircraft that can use the system. An air traffic control system is of little use unless it is sensitive to all aircraft, and such capability will not be affordable for all aircraft unless the required on-board equipment is very simple and inexpensive. From a reliability standpoint, moreover, the complexity of the hardware carried by the satellites should also be minimized, since there are not readily accessible for repairs once they have been placed in orbit.

With respect to the third of the factors mentioned above, the dramatic escalation in commercial and private air traffic over the past few decades makes it clear that any system which is adopted must be able to handle a ten- or even hundred-fold increase in air traffic over present levels without a serious degradation in performance.

Finally, in view of the already critical nature of air traffic density over major urban centers, and the small margin for error at the high speeds attained by modern aircraft, it is inevitable that resort will be had to fully automatic or pilotless flight at least to some degree in the not-too-distant future. This will place exacting demands on the performance of the system; response times that are sufficient for passive monitoring purposes may be wholly unacceptable if the system will also be required to control the movements of the aircraft being monitored.

Implementation of a new air traffic control system is a major undertaking, typically requiring several decades. Once in place, an ATC system is expected to remain operational for several decades more. The system must therefore be designed with a great deal of foresight, since premature obsolescence can mean the loss of a large investment in labor and equipment. In light of what has been said above, it is clear that a fully satisfactory air traffic control system will have to be (1) applicable in at least a rudimentary form to every aircraft flying, in order to render the ATC effective in collision avoidance, (2) capable of expansion, without saturation or significant reduction in effectiveness, to match the enormous increase (perhaps by a factor of 100) in the total number of aircraft that could come about within the next several decades, and (3) readily extendible, without major retrofitting or scrapping of system components, to fully automatic or "pilotless" flight. It is only by satisfying all of these criteria, which have heretofore been seen as inherently incompatible or mutually exclusive, that an air traffic control system can be assured of practical implementation and freedom from premature obsolescence.

Each of the systems so far proposed for carrying out satellite-based air traffic control and navigation falls short with respect to one or more of the foregoing criteria which, it is to be emphasized, must all be met simultaneously if the system in question is to have general applicability and long-range utility. The Navstar system, with its dependence on complicated position-computation equipment aboard the individual craft, is not affordable except for military and the more expensive business and commercial aircraft. These constitute only a few percent of the total air fleet. Of the remaining systems, those which call for discrete interrogation of the individual aircraft using pre-assigned address codes or the like also place an undue equipment burden on the individual craft, since those craft must then carry special equipment for recognizing their unique addresses before responding to a particular interrogation. Such equipment must be duplicated for each aircraft using the system.

Discrete interrogation of individual aircraft has been seen as necessary in prior art systems for a number of reasons, important among these being the need to ensure that the signals returned by the different interrogated aircraft do not overlap at the receiving site. Even with discrete addressing, however, the overlap problem is not necessarily solved, since the return signals from aircraft at different distances will not necessarily arrive back at the ground station in the same order in which the aircraft were interrogated. Thus further makeshift solutions are required, such as the suggestion in the above-cited U.S. Pat. No. 3,665,464 that the positions of all aircraft within range of the system be initially determined and thereafter interrogated in order of their proximity to the transmitter. Clearly, the relative positions of the aircraft tracked by the system will be constantly changing, requiring continuous reshuffling of information in the system's computer memory. An alternative solution to the problem, suggested in U.S. Pat. No. 3,544,995, is to ensure that the interrogation signals originated by the ground station for the different aircraft are sufficiently far apart to preclude overlap of the return signals. This would require that the ground station wait for return signals from aircraft located at the maximum range of the system before transmitting the next interrogation signal, severely increasing the time required for a single inventory of all the aircraft tracked by the system. As a consequence, for any sizable number of aircraft, the frequency with which the position of any given aircraft could be fixed is far too low for the fully automated flight applications referred to previously.

Along similar lines is the solution proposed in U.S. Pat. No. 3,430,234. In this system, it will be recalled, interrogation is carried out by the craft itself and responded to by the satellites whose positions are used to fix the position of the craft. To prevent signal overlap at the satellites when a large number of craft are using the system, it is suggested that one of the satellites may transmit an interrogation synchronizing signal following which each craft is assigned a limited period for carrying out its distance measurement functions. During this period, no other interrogation takes place from craft sharing the same carrier frequency. The intended effect, therefore, is to time-division multiplex the interrogation signals transmitted by the various craft by ensuring that they occur in a predetermined sequence after the synchronizing signal. The necessary time "window" which must be assigned to each aircraft, however, is said to be equal to the maximum value of the possible range of variation of the signal transit time for the complete interrogation path, or twice the delay equivalent of an earth's radius. The problem with this expedient, then, is essentially the same as that encountered previously: for realistic numbers of aircraft, the cycle time of the system becomes intolerably large for effective air traffic control and automated flight applications. Perhaps in tacit recognition of this fact, U.S. Pat. No. 3,430,234 appears to contemplate use of the system only as a navigational aid for the individual craft, using craft-borne computational equipment to carry out all the necessary distance and position calculations, rather than as a centralized air traffic control system. The patent does suggest, however, that the cycle-time limitations of the system may be avioded by providing a number of different operating frequencies, and then assigning a limited number of aircraft to each frequency on the time-division multiplexed basis described earlier. This expedient, of course, merely substitutes one problem for another, since for large numbers of aircraft the number of channels required would be large, so that the bandwidth for each would be reduced and the precision of position measurement for all aircraft would be correspondingly degraded.

One attempt to avoid discrete addressing of individual aircraft, albeit not in connection with a satellite-based position determination system, is described by O'Grady et al. in a paper entitled "ATCRBS Trilateration: The Advanced Airport Surface Traffic Control Sensor", published in *AGARD Conference Proceedings* (No. 188) on Plans and Developments for Air Traffic Systems (Cambridge, Massachusetts, May 20-23, 1975). The purpose of the proposed system is to locate and identify aircraft on the airport surface using three ground antenna locations placed around the periphery of the airport. An interrogation signal from one of the antenna locations causes a beacon transponder aboard the aircraft to produce an identity-coded reply signal which is bracketed by leading and trailing framing pulses for time measurement purposes. Differences in the arrival times of the reply signals at the three antenna locations enables the aircraft position to be calculated in two dimensions (i.e., on the airport surface) by hyperbolic methods.

In the system proposed by O'Grady et al., the interrogation signal is not coded with the identity of any particular aircraft and will theoretically elicit a response from any aircraft receiving it. Consequently, reply signal overlap at the ground receiving antenna locations becomes a serious problem, particularly in the critical situation that occurs when two aircraft are very close to each other. This, of course, is the situation in which accurate position monitoring is most needed. As recognized by O'Grady et al., the problem is not avoided merely by using a highly directional interrogation signal radiation pattern, since it is always possible that two or more closely spaced aircraft may be in the interrogator beam at the same instant. To prevent undesirable reply signal overlap, therefore, O'Grady et al. provide for temporary suppression of the aircraft transponders (i.e., inhibition of the transponders from replying to all valid interrogations for a fixed period of time) in response to the receipt of an appropriately coded suppression signal. The suppression signal is transmitted in a steered (i.e., moveable) manner from two of the ground antenna locations with a deep notch or null in its radiation pattern, so that only aircraft located at the intersection of the suppression nulls will be able to reply to a subsequently transmitted narrow-beam interrogation signal. In this way, the directivity of the interrogation processes is said to be artificially sharpened without the need for physically large antennas.

In the abstract, the reply suppression technique proposed by O'Grady et al. possesses a number of distinct advantages over the discrete addressing systems described earlier. Most importantly, reply signal overlap is reduced or eliminated without the additional airborne hardware requirement entailed in selectively responding to specially coded interrogation signals. The manner in which this technique is implemented by O'Grady et al., however, would be unmanageable in a large-scale satellite-based air traffic control system. For example, while it may be possible to produce an interfering suppression signal radiation pattern with the required precision from a number of antennas spaced around the periphery of a small area such as an airport, as envisioned by O'Grady et al., it would be difficult or impossible to do so for a large area of the earth's surface from satellites in high orbits. Even assuming that this could be done, it would still be necessary to steer the beam pattern over the area covered on a periodic basis, which would tend to render the cycle time of the system intolerably long. This derives from the fact that the selectivity of the system for individual aircraft is spatial in nature, so that it becomes necessary to repeatedly scan through a sequence of discrete spatial segments in order to obtain complete coverage (in the discrete addressing systems, by analogy, selectivity for individual aircraft is defined in terms of aircraft identity, so that it is necessary to repeatedly scan through a sequence of discrete identity codes to obtain complete coverage). Implementation of the O'Grady et al. system would require, moreover, that two different types of signals be produced, one for interrogation and one for reply suppression, thereby introducing an additional and undesirable level of complexity into the system as well as a potential source of unreliability.

SUMMARY OF THE INVENTION

The present invention relates to a satellite-based vehicle position determining system which avoids many of the deficiencies and limitations associated with previously proposed satellite-based systems, and which is superior in terms of coverage, precision and hardware requirements to the fragmented air traffic control system upon which pilots and controllers must now rely. In its broadest aspect, a vehicle position determining system in accordance with the present invention comprises a transponder carried by each one of the vehicles covered by the system for transmitting, in response to a general interrogation signal directed to all vehicles within reach of the system, a beacon signal coded with information uniquely identifying that one vehicle; at least three satellites at spaced orbital locations above the earth, each of the satellites carrying repeater means for receiving and retransmitting the beacon signals transmitted by the vehicle transponders, whereby the three satellites will collectively produce three retransmitted beacon signals for each beacon signal transmitted by a vehicle transponder; and a ground station for periodically transmitting the general interrogation signal and for receiving and processing the retransmitted beacon signals in order to calculate the instantaneous positions of the vehicles covered by the system. In particular, the ground station includes means for detecting the arrival time of each retransmitted beacon signal at the ground station, means for detecting the vehicle identifying information carried by each retransmitted beacon signal, and means for calculating the instantaneous position of each one of the vehicles covered by the system based upon the time of transmission of the interrogation signal from the ground station and the arrival times of the three retransmitted beacon signals which carry vehicle identifying information identifying that one vehicle. In accordance with an important aspect of the present invention, each vehicle transponder includes means responsive to the general interrogation signal for inhibiting the transmission of further beacon signals by the transponder for a predetermined time interval following the response of the transponder to the interrogation signal. As will shortly become apparent, this provides a simple yet highly effective way of minimizing the occurrence of return signal overlap at the ground station, and also avoids saturation of the signal processing and computational equipment at the ground station by minimizing the total number of return signals received during a given time interval.

Preferably, the inhibit intervals of at least some of the vehicle transponders in the present system are different from the inhibit intervals of the remaining vehicle transponders (it is not necessary, however, that a unique inhibit interval be assigned to each and every vehicle transponder). Since the inhibit interval of a given vehicle transponder will effectively determine the frequency with which it will respond to ground station interrogation signals, it is therefore possible to tailor the response frequency of a given vehicle to its own particular needs without modifying the interrogation signal repetition rate at the ground station. When the vehicles involved are aircraft, for example, it will normally be desirable to provide the faster turbine aircraft with shorter inhibit intervals (i.e., higher response frequencies) in order to enable more frequent position updating, while providing slower piston aircraft with longer inhibit intervals (i.e., lower response frequencies) since they will ordinarily require less frequent position updating. By thus providing a different effective interrogation rate for each different class of aircraft, the number of return signals arriving at the ground station per unit time is much less than would be the case if all the aircraft were made to respond at a high rate suitable to the fastest aircraft, thereby minimizing return signal overlap and avoiding equipment saturation at the ground station. In effect, therefore, the present system achieves selectivity among different aircraft, or different classes of aircraft, without the need to resort either to time-consuming discrete addressing of the aircraft or to the even more cumbersome expedient of narrow-beam interrogation. Moreover, by keying the onset of the inhibit interval to the interrogation signal itself rather than to a separately-provided suppression signal, the inhibit function may be confined entirely to the individual aircraft transponders and the overall complexity of the system may therefore be minimized. It should also be appreciated that, in contrast to some of the previously proposed satellite-based navigation systems, the present system does not require that the available signal bandwidth be subdivided into a large number of narrower-band channels in order to avoid saturation or signal overlap for large numbers of aircraft, thereby preserving a wide bandwidth for use in making high-precision measurements of signal propagation times.

In accordance with a further aspect of the present invention, the inhibiting means of at least one of the vehicle transponders includes control means for varying the inhibit interval of the transponder. This may be accomplished manually or, in accordance with a particularly preferred embodiment of the invention, automatically in response to a command signal transmitted by the ground station. When the vehicles involved are aircraft, this permits the response frequency of a given aircraft to be tailored to the changing needs of that aircraft at different points during its flight. Thus, by way of example, high-speed turbine aircraft may require very frequent position updating in and around high-density air traffic zones such as major air parts, but will not require such frequent position updating when they are in straight and level flight far from other aircraft. By increasing the inhibit intervals (and thereby decreasing the response frequency) of the transponders carried by these aircraft in circumstances where frequent position updating is not required, the probability of return signal overlap at the ground station is reduced and saturation of the system is avoided.

In accordance with a preferred embodiment of the present invention, the three repeater-carrying satellites are in geosynchronous equatorial orbit about the earth, each satellite being located in a different longitudinal position in this orbit. One of the satellites may then be arranged to function as a fixed communication link (ground link) with the ground station for relaying to the ground station the retransmitted beacon signals produced by the two remaining satellites. The ground link satellite may also function to relay interrogation signals from the ground station to the vehicles covered by the system. In order to facilitate individual recognition at the ground station of the retransmitted beacon signals produced by each of the three satellites, the ground link satellite may include means for modifying in a characteristic manner the beacon signals retransmitted by at least one of the two remaining satellites during the relaying of these retransmitted beacon signals to the ground station. The ground station may then include means for detecting the characteristic modification, or lack thereof, in each retransmitted beacon signal in order to associate the beacon signal with the particular one of the satellites which produced it for purposes of carrying out the vehicle position calculation. When the beacon signal comprises a digital pulse group, as in the preferred embodiment, the characteristic modification may be in the form of an amplitude difference between the leading and trailing pulses of the pulse group.

In accordance with a further aspect of the present invention, the ground station may include means for detecting a retransmitted beacon signal which occupies a time interval in excess of a predetermined nominal value, as might result from overlap between two different retransmitted beacon signals at the ground station, and for producing a rejection signal in response thereto. The rejection signal is then used to suppress the use of the excessively-long retransmitted beacon signal in the calculation of vehicle position.

In accordance with a further aspect of the present invention, the beacon signal may comprise a digital pulse group having a leading pulse, a trailing pulse, and a plurality of intermediate pulses for carrying the vehicle-identifying information. The ground station may then include means for measuring the individual arrival times of the leading and trailing pulses of each retransmitted beacon signal, and for deriving an analog control voltage as a function of the difference between the arrival times of the leading and trailing pulses. The control voltage is used to control the frequency of a variable frequency clock which clocks the successive bits of the beacon signal pulse group into the successive stages of a shift register at the ground station. In this way, the clocking rate of the shift register is accurately matched to the bit rate of the digital information carried by the beacon signal, which may vary somewhat among the different vehicle transponders.

According to a further aspect of the present invention, the ground station may include signal encoder means for generating a navigational signal carrying position information calculated at the ground station for one of the vehicles and a preassigned address uniquely identifying that one vehicle, together with a transmitter for transmitting the navigational signal to all of the vehicles within reach of the system. The identified vehicle is provided with a receiver for receiving the navigational signal transmitted by the ground station, means for detecting equivalence between the address carried by the navigational signal and the preassigned address identifying the vehicle, and means for displaying the position information carried by the navigational signal when address equivalence is detected. The navigation signal may also be encoded with the command signal for varying the inhibit interval of the vehicle's transponder in cases where the transponder is arranged to have this capability. For vehicles equipped with automatic controls, the navigational signal may further be encoded with control information generated at the ground station for controlling the motion of the vehicle, whereby fully automatic flight may be realized. For the geosynchronous satellite configuration, the satellite which functions as the fixed communication link with the ground station may be provided with additional repeater means for relaying navigational signals from the ground station to all the vehicles within reach of the system.

BRIEF DESRIPTION OF THE DRAWINGS

These and other features and advantages of the present invention will be more readily apprehended from the following detailed description in connection with the appended drawings, in which.

Figure 19:
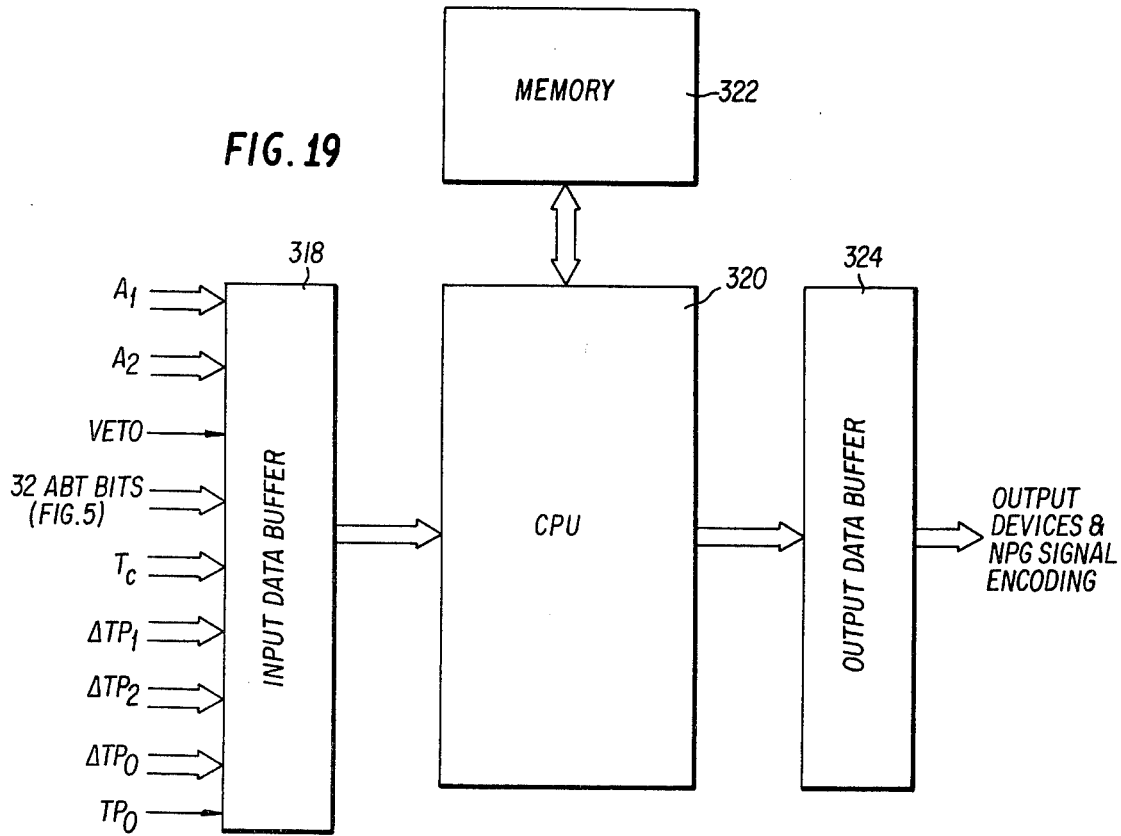
FIG. 19 illustrates an exemplary configuration for the ground station computer that is used to process the output information provided by the time measurement and decoding circuitry of FIG. 18.
Figure 21:
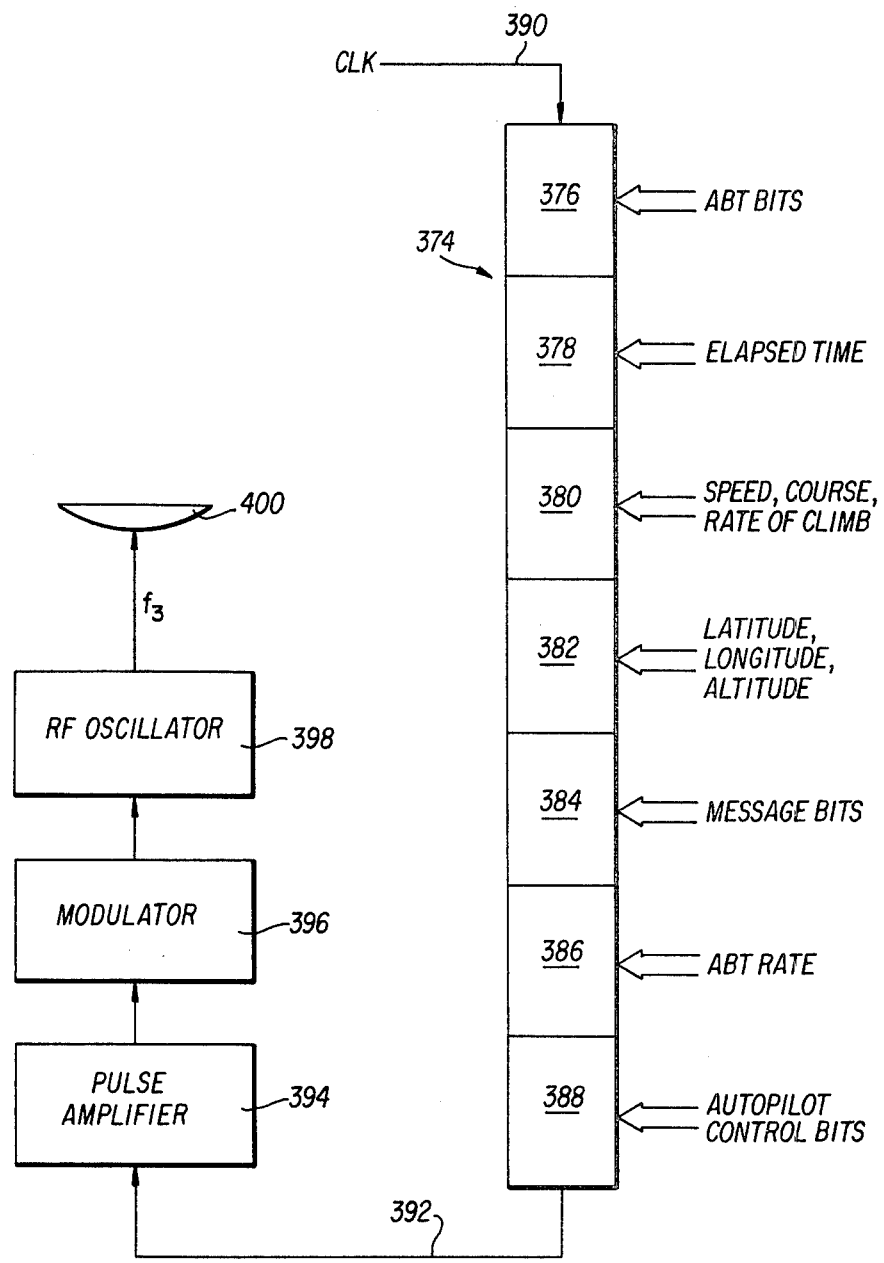
Figure 22:
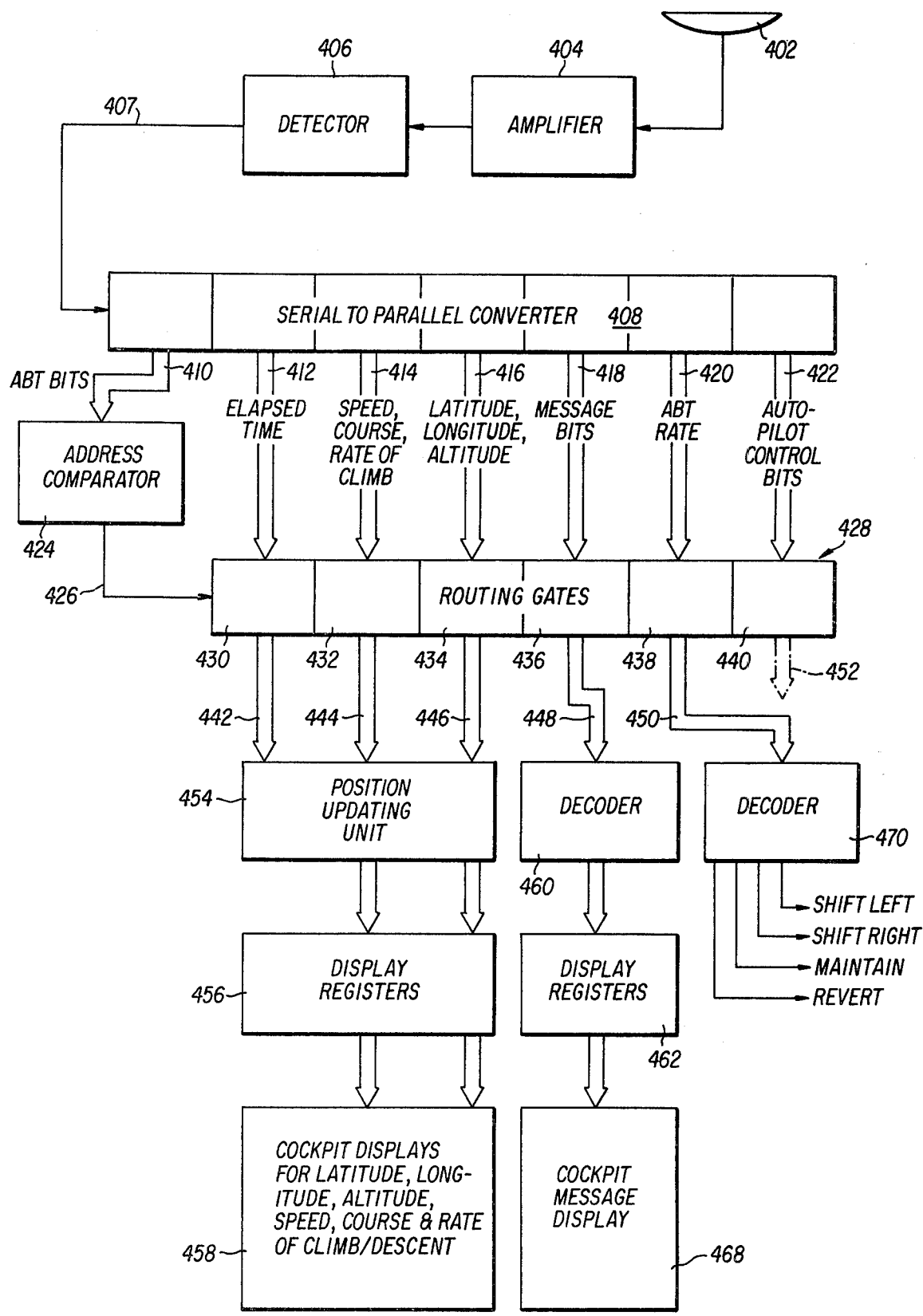
Figure 23:
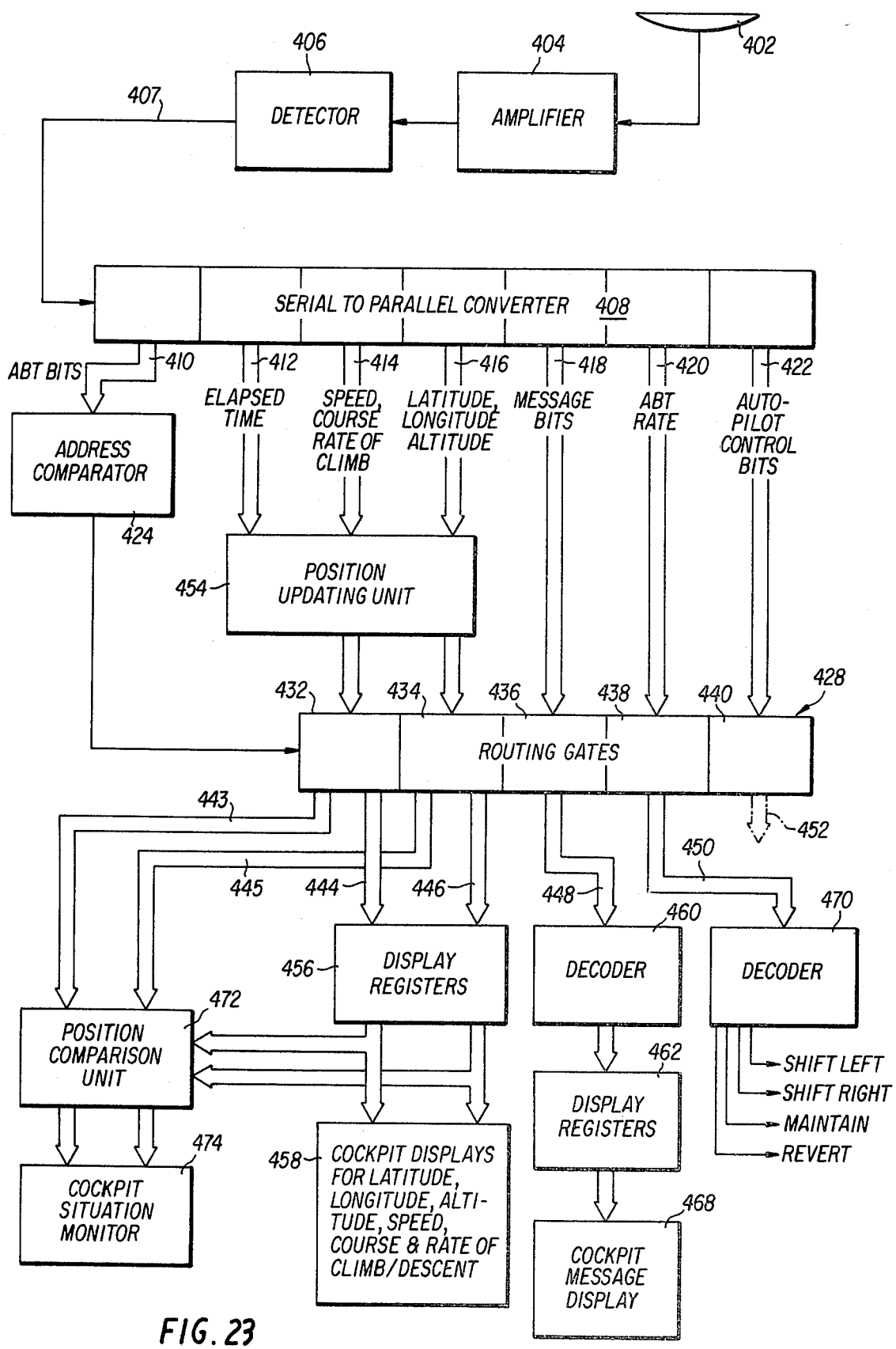
Figure 24:
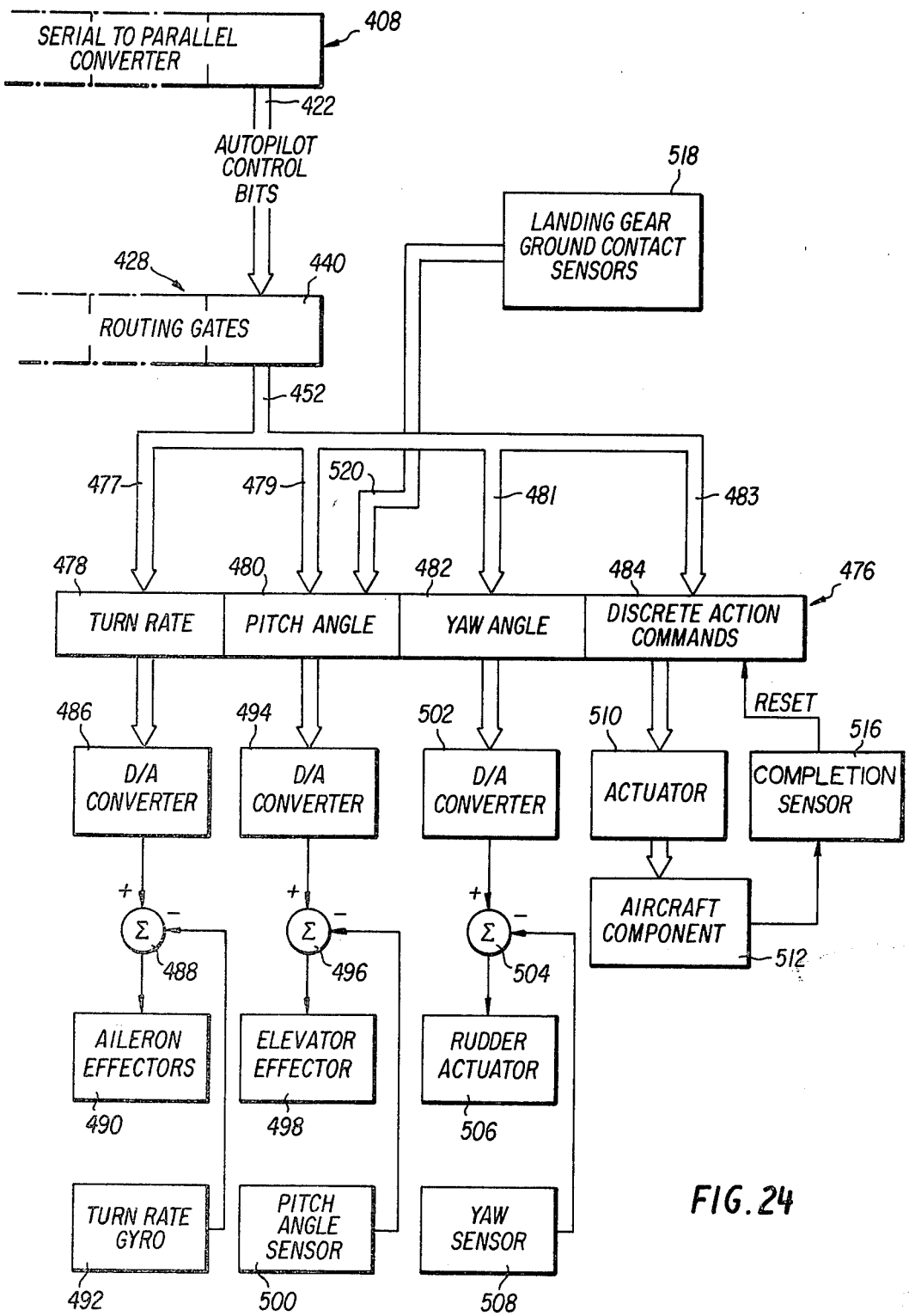

FIGS. 20A–20D comprise a flowchart which illustrates generally the sequence of operations that is carried out by the ground station computer of FIG. 19;

FIG. 21 depicts an exemplary system for encoding aircraft position and other information calculated at the ground station onto a navigational signal for transmission back to the particular aircraft to which it relates;

FIGS. 22 and 23 illustrate two different embodiments of an exemplary system for receiving and processing navigational signals aboard the individual aircraft; and FIG. 24 depicts an exemplary system for implementing automatic flight in aircraft equipped with a suitable three-axis autopilot, using control information derived from the navigational signal.

Throughout the drawings, like reference numerals are used to identify like parts.

DETAILED DESCRIPTION OF THE PREFERRED EMBODIMENT

General Description

All of the navigational, air traffic control, precision approach, collision avoidance, communications and emergency location functions now assumed by the numerous separate systems described previously can be carried out with high precision by the present invention by providing each aircraft with a simple, lightweight transponder running off the normal aircraft electrical system and sending out, in response to a general interrogation signal sent to all aircraft within range of the system, a reply signal (such as a series of digital pulses) coded with information uniquely identifying the particular aircraft with which it is associated. The transmission and reception carrier frequencies of the aircraft-carried transponder may be in the high-frequency or microwave region, for example an existing aircraft frequency allocation. In the description that follows, the transponder will be referred to as an Automatic Beacon Transponder or ABT, and the reply signal produced by the transponder will be referred to as the beacon signal. As will become readily apparent hereinafter, the ABT could replace the ELT now required by law to be carried by every aircraft.

Figure 1:
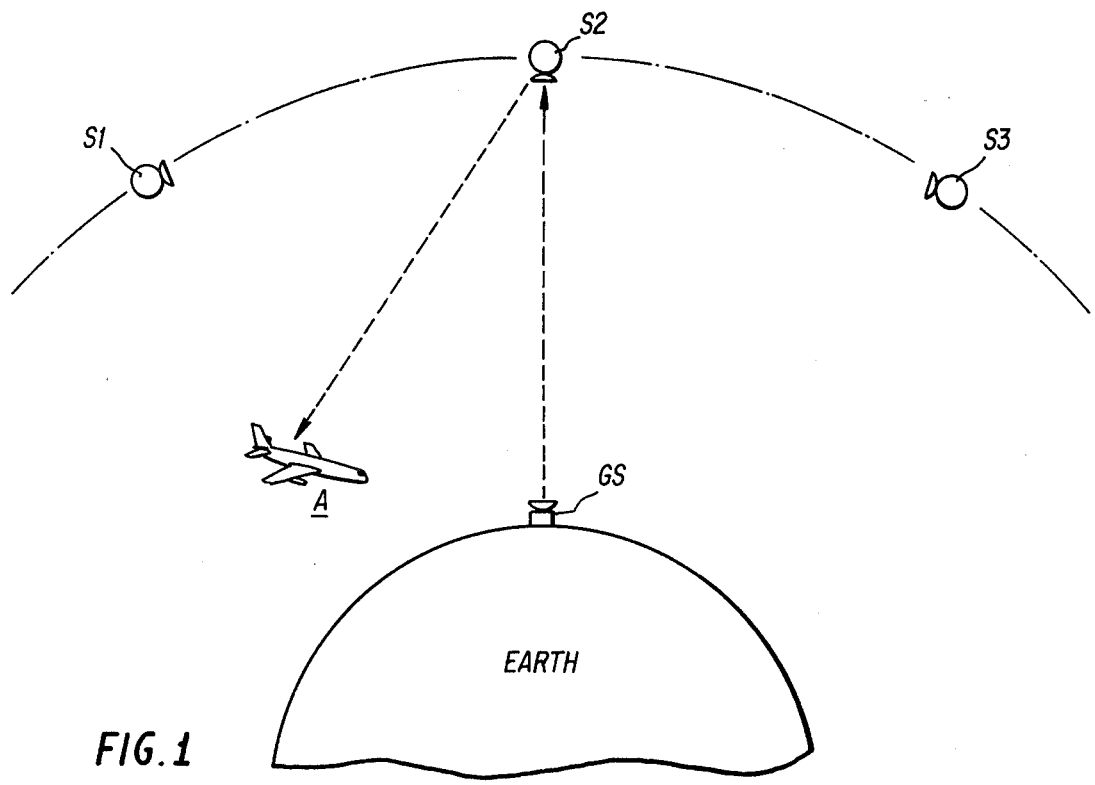
FIG. 1 depicts a preferred arrangement of satellites in accordance with the present invention, illustrating the manner in which an interrogation signal from the ground station is relayed to an aircraft by one of the satellites.

In a preferred embodiment, the system of the present invention includes at least three artificial satellites located in geosynchronous orbit about the earth and separated in longitude by a substantial angle, typically 45 degrees, from one to the next. Such an arrangement of satellites is illustrated in FIG. 1, where the three satellites are indicated at S1, S2 and S3 respectively (it is to be understood that FIG. 1 and those like it are not intended to be to scale, the orbital height of the satellites being in reality much greater than the altitude of the aircraft shown). It is to be understood that the present invention does not require that the satellites S1, S2 and S3 be in geosynchronous equatorial orbit; they may instead have near-synchronous, nonsynchronous, elliptical, inclined or any other type of orbit in which their positions are readily ascertainable at any given time. In order to simplify analysis and to describe the operation of the invention in terms of a single fixed ground station, however, the satellites S1, S2 and S3 will hereinafter be assumed to be in geosynchronous equatorial orbit about the earth in the general arrangement illustrated in FIG. 1. Even apart from considerations of analytical simplicity, moreover, it will shortly become apparent that this particular orbital configuration possesses certain advantages in terms of global coverage that render it preferable to other types of orbital configurations in the practice of the present invention.

As is well known, a satellite in geosynchronous equatorial orbit (GEO) has, by definition, an orbital period of 24 hours, so that it effectively remains stationary over a selected point on the earth's equator. The orbital height of such a satellite is roughly 22,000 miles, the precise value being readily derivable using the laws of physics.

With further reference to FIG. 1, a ground station GS is provided on the earth's surface at a point which is preferably at a longitude close to that of the stationary satellite S2. It is to be understood that the ground station may assume a variety of different forms depending upon the type of satellites used (i.e., synchronous or nonsynchronous) and the requirements of particular applications. Thus, for example, the ground station may be a fixed location on the earth's surface at or near sea level, as shown, or it may be located at a point substantially above sea level, as for example at the top of a hill or mountain. The ground station need not necessarily have a fixed location, but may instead be carried by a moving or movable craft such as a ship or even an aircraft. It is conceivable, moreover, that a number of geographically separated ground stations could be employed, such as in the case of a system of nonsynchronous satellites. Different groups of satellites might then "switch off" between different successive ground stations on a revolving basis in the course of their nonsynchronous orbits. In the description that follows, however, the ground station will be assumed to be a single fixed site on the earth's surface located at the same longitude as one of a number of stationary satellites as described previously.

At a time $t_0$, the ground station GS produces a general interrogation signal at a carrier frequency $f_1$ which is transmitted by a suitable narrow-beam antenna to another such antenna carried by the satellite S2. Repeater circuitry carried by the satellite S2 then retransmits the interrogation signal to the aircraft A as well as to all other aircraft which may be within the range of the system. This retransmission preferably takes place at the same carrier frequency $f_1$ using one or more broad-beam antennas (not shown) carried by the satellite S2. The path of the interrogation signal with respect to one particular aircraft A is shown by the dashed lines in FIG. 1.

The interrogation signal may assume any desired form but will ordinarily be a single digital pulse or a characteristic series of digital pulses. It is important to note, however, that the interrogation signal is not specific to any one particular aircraft but is instead recognized by, and capable of eliciting a response from, more than one of the different aircraft using the system. It is in this sense that the term "general" interrogation signal is intended to be understood, and further references to the "interrogation" signal hereinafter will be understood to refer to a general interrogation signal. As will be more fully apprehended as the description proceeds, it is entirely possible, and in fact preferable, for the ground station to produce only one type of interrogation signal that is recognized and acted upon by all (rather than only a subgroup) of the different aircraft using the system.

In an optional mode of operation, not illustrated in FIG. 1, the satellite S2 also retransmits the general interrogation signal directly back to the ground station GS. The time of arrival of the retransmitted interrogation signal at the ground station is then used as the reference time $t_0$, rather than the original transmission time of the interrogation signal. The advantage of this procedure is that it effectively cancels the signal propagation time between GS and S2 from the later calculations, and thus simplifies the subsequent analysis somewhat. Mathematically, however, the two modes of operation are essentially equivalent. To avoid introducing unnecessary additional complexity to the system at this point, therefore, it will be assumed hereinafter (except where otherwise indicated) that $t_0$ refers to the original transmission time of the general interrogation signal from the ground station GS as previously described.

When the ABT aboard the aircraft A receives the interrogation signal relayed by the satellite S2, the aircraft's ABT will, if it is not internally inhibited, respond by producing a beacon signal at a carrier frequency $f_2$ which is the same for all aircraft using the system but different from the interrogation signal carrier frequency $f_1$ (the manner in which the ABT may be internally inhibited and the reason therefor will be explained in some detail hereinafter). Choosing $f_2$ to be different from $f_1$ precludes the possibility that a beacon signal from one aircraft will be interpreted by another aircraft as an interrogation signal from the ground station.

Figure 2:
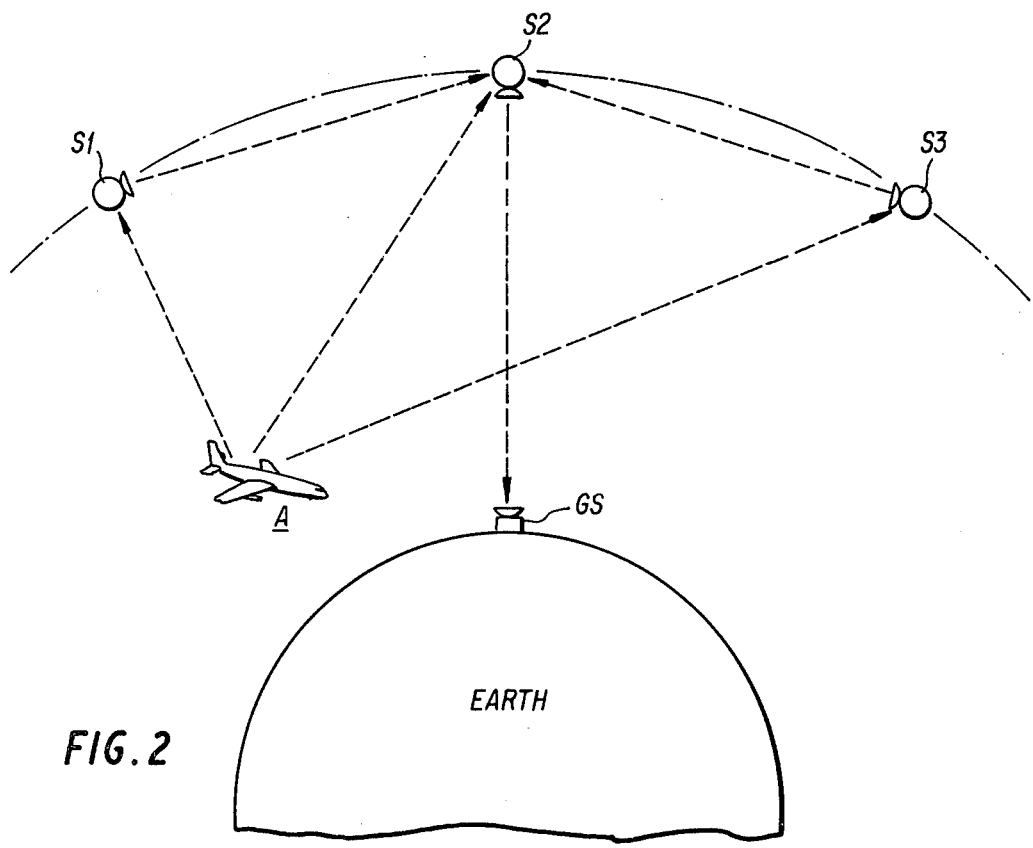
FIG. 2 illustrates the manner in which a responsive beacon signal from the aircraft transponder is received by each of the three satellites and retransmitted to the ground station through one of the satellites.

As noted previously, the beacon signal produced by the ABT carried by each aircraft A is coded with information uniquely identifying that particular aircraft. Referring now to FIG. 2, the beacon signal produced by the non-inhibited ABT of aircraft A is received at each of the satellites S1, S2, and S3 by means of suitable broad-beam antennas (not shown) provided at each satellite. Additional repeater circuitry operating at the frequency $f_2$ is carried by satellite S2 for relaying to the ground station GS the beacon signal directly received by satellite S2 from the aircraft A. This is done using the previously-described narrow-beam antennas provided at satellite S2 and ground station GS assuming they are operable at the frequency $f_2$ as well as $f_1$; alternatively, an independent narrow-beam antenna system (not shown) may be provided at S2 and GS for this purpose. Satellites S1 and S3, which also carry repeater circuitry operable at the carrier frequency $f_2$, include narrow beam antennas for retransmitting the beacon signal received by them from the aircraft to similar antennas (not shown) provided at satellite S2. The $f_2$ repeater circuitry of satallite S2 then relays the retransmitted beacon signals from satellites S1 and S3 to the ground station GS, using the combined or independent narrow beam antenna system previously referred to. In effect, therefore, satellite S2 functions as a fixed communication link, or ground link, when the ground station GS for all signals transmitted to and originating from the aircraft A. The dashed lines in FIG. 2 indicate the paths taken by the beacon signal from aircraft A through the various satellites and ultimately to the ground station GS.

At the ground station, three time-spaced return signals are received from satellite S2 for each beacon signal generated by the non-inhibited ABT of aircraft A (all three have been schematically indicated in FIG. 2 by the single dashed line connecting satellite S2 with the ground station GS). The arrival times of these signals at the ground station, which may be referred to as $t_1$, $t_2$ and $t_3$, respectively, are displaced from the original interrogation signal transmission time $t_0$ by time intervals which depend, in part, on the distances between the aircraft A and the respective satellites S1, S2 and S3. When a plurality of aircraft are within range of the system, the return signals from different aircraft will usually arrive at the ground station in an intermixed manner. Thus, by way of example, each pair of successive return signals from the aircraft A may, at the ground station, be separated by many other return signals from many different aircraft. The coded identification information carried by each return signal, however, provides a computer at the ground station with the information necessary for properly associating each return signal with the particular aircraft from which it originated. By decoding this information as the arrival time of each return signal is measured, the ground station computer is able to isolate the proper set of return signal arrival times $t_1$, $t_2$ and $t_3$ for each aircraft regardless of the intermixed manner in which they are received.

When a complete set of return signal arrival times has been accumulated, the ground station computer forms the differences $(t_1 - t_0)$, $(t_2 - t_0)$ and $(t_3 - t_0)$ and carries out a computational sequence which amounts essentially to solving a set of three equations for three unknowns, these unknowns being the three position coordinates of the aircraft A relative to the earth. These equations, which will be described in some detail hereinafter, are based on the different propagation times of the beacon signal from the aircraft to the three known satellite positions and take into account the signal propagation delays resulting from the distances separating satellites S1 and S3 from satellite S2, the turn-around time of the repeater circuitry in each of the three satellites, and the response delay of the aircraft-carried ABT. The position coordinates that result from these calculations are expressed in terms of (or are readily converted to) the latitude, longitude and height of the aircraft above a fixed reference surface (normally Mean Sea Level, or MSL).

Figure 4:
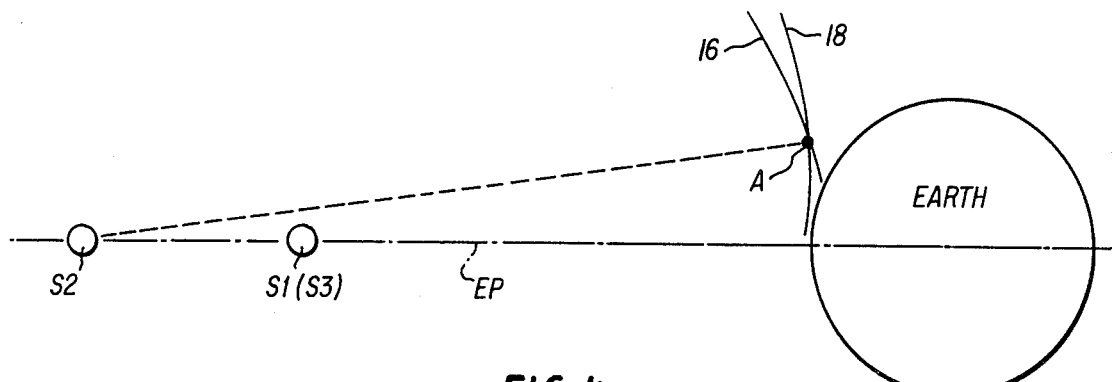
FIGS. 3 and 4 depict the geometrical basis for the calculation of aircraft position based on the arrival times of the three retransmitted beacon signals at the ground station.
Figure 3:
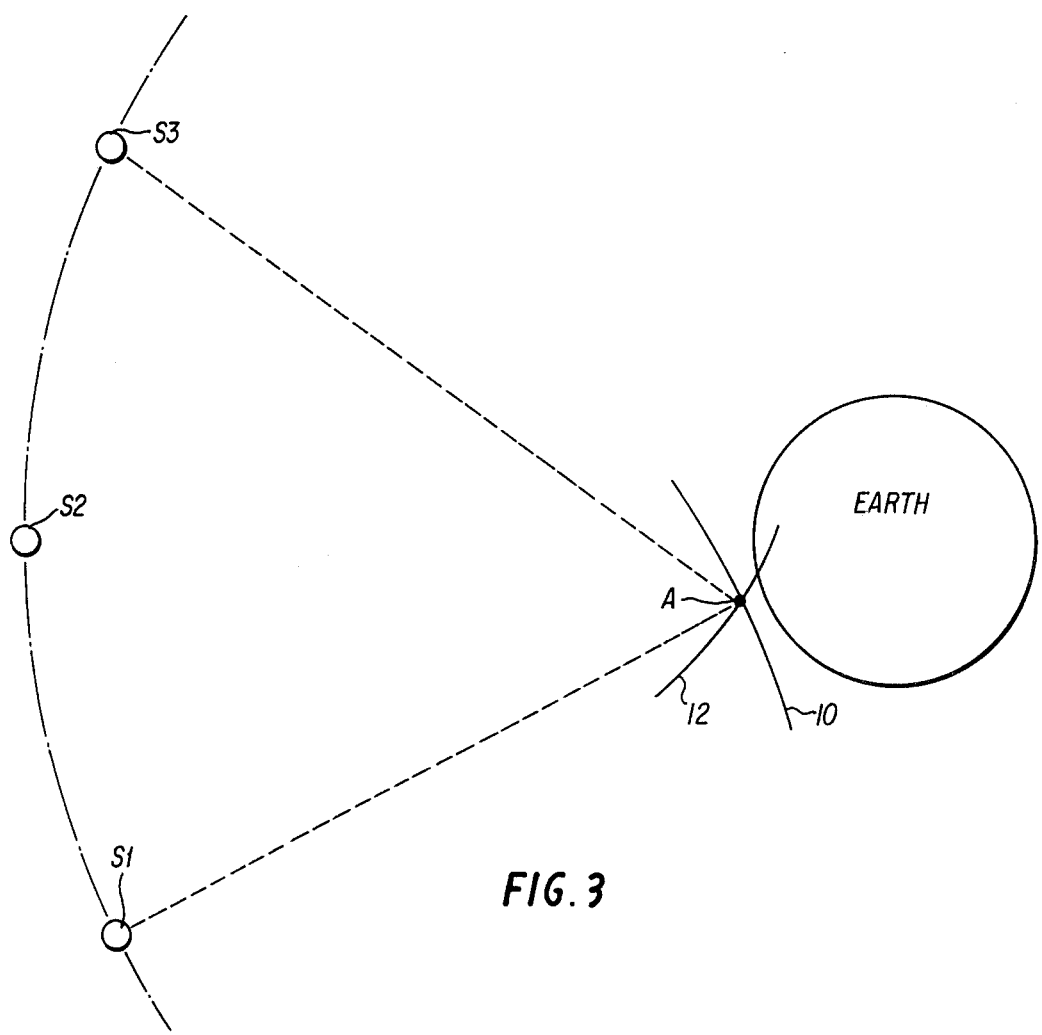

Although the mathematical details of the position calculation will be set forth shortly, an appreciation of the geometrical basis for the calculation may be had with reference to FIGS. 3 and 4. FIG. 3 is a view along the polar axis of the Earth, which may be assumed to be taken from the North Pole, showing the aircraft A and the three geosynchronous satellites S1, S2 and S3 orbiting in the equatorial plane. FIG. 4 is a view along the Earth's equatorial plane EP (seen edge-on), with the North Pole assumed to be at the top and satellites S1 and S3 appearing to overlap due to their equal angular displacements from satellite S2. By comparing FIGS. 3 and 4, the aircraft A will be seen to be located in the northern latitudes and at a longitude which places it in a line-of-sight relationship with all three satellites.

The return signal arrival times $t_1$, $t_2$ and $t_3$ from the respective satellites S1, S2 and S3 will be displaced from the original interrogation signal transmission time $t_0$ by time intervals which depend not only on the distance of the aircraft A from each of the satellites, but also on the intersatellite distances separating S1 from S2 and S3 from S2, and on the ground-link distance between the satellite S2 and the ground station GS (not shown in FIGS. 3 and 4). It should be noted at this point that the subscripts assigned to the arrival times $t_1$, $t_2$ and $t_3$ refer merely to the satellites from which the return signals originate, not to the order in which the signals are received. In fact, as will be demonstrated hereinafter, $t_2$ will always occur first, the order as between $t_1$ and $t_3$ being determined by the aircraft location.

Since the coordinates of the ground station and of the satellites are assumed to be known, it is possible to correct the arrival times $t_1$, $t_2$ and $t_3$ to obtain three new values $t_1'$, $t_2'$ and $t_3'$ which are the arrival times of the beacon signal at each of the respective satellites S1, S2 and S3 based on a new reference time $t_0'$ representing the transmission time of the beacon signal from the aircraft (in reality this cannot be done directly, since the displacement of $t_0'$ from $t_0$ itself depends on the unknown distance of the aircraft from the ground link satellite S2, but this is automatically accounted for during the actual solution of the set of simultaneous equations which govern the position calculation). The differences $(t_1' - t_0')$, $(t_2' - t_0')$ and $(t_3' - t_0')$ may then be formed and may each be multiplied by the signal propagation velocity (nominally the speed of light, c) to yield the signal path lengths between the aircraft A and each of the satellites S1, S2 and S3.

With reference to FIG. 3, the known distances from satellites S2 and S3 place the aircraft A somewhere on the line of intersection between two spheres, sections of which are shown edge-on at 10 and 12, centered at the respective satellites S1 and S3. This line of intersection, which is nearly normal to the page in FIG. 3, is shown as the line 16 in the equatorial view of FIG. 4. The known distance of the aircraft from satellite S2 defines a sphere, a section of which is shown edge-on at 18 in FIG. 4, centered at S2. The point of intersection of the line 16 with the sphere 18 locates the position of the aircraft A.

For air traffic control, collision avoidance and crash location, an air traffic control center (ATC) must be able to determine precisely the direction, speed, and rate of climb of every aircraft in addition to its instantaneous position. This is readily accomplished in the ground station computer of the present system by its keeping track of the most recent two or more sets of position coordinates for each aircraft and the time elapsed between successive position calculations for that aircraft. It should be noted at this point that the term "ground station" is used in a functional sense herein and does not necessarily refer to one discrete physical location. It is quite possible, for example, for the signal transmission and reception functions of the ground station to be carried out at one geographical location and the computational functions of the ground station to be carried out at an entirely different geographical location. Either of these locations may be the same as that of what is usually referred to as the air traffic control center, where specially trained personnel monitor the positions of a plurality of aircraft and carry on voice communication with the aircraft crews. Alternatively, all of the functions of the ground station may be carried out at a location or locations remote from the air traffic control center, with the necessary information being relayed to the ATC by a suitable communication link. It is even possible that some of the functions attributed herein to the ground station could be carried out aboard one or more of the satellites, but it will ordinarily be desirable to place as much of the system hardware as possible on the earth where access can readily be had to it for maintenance purposes.

Once position, direction, speed, and rate of climb information has been calculated for a given aircraft, it is made available to an air traffic control center for use in generally the same manner as that in which conventional radarderived information is used in present-day systems. For this it has been necessary to provide the aircraft with an ABT and nothing more, and in fact the purposes of the present invention are substantially accomplished at this point. The system provided by the present invention is capable of a natural extension, however, and it is to this extension that attention will now be directed.

In the case of some aircraft, it may be desirable for the particular aircraft in question to have direct access to the accurate position, direction and speed information which has been calculated at the ground station. In the aircraft, such information could supplement, or even replace, the navigational information normally provided by cockpit instruments and specialized airborne radio equipment. To this end, the ground station of the present invention may include additional equipment for encoding the calculated position, direction and speed information onto a navigational signal for transmission back to the particular aircraft to which it relates. The navigation signal may assume any desired form but will ordinarily be a group of digital pulses in which the coded navigational information is represented as a series of bits of binary information. For this reason, the navigational signal will occasionally be referred to hereinafter as a navigational pulse group, or NPG. Transmission of this signal back to the correct aircraft is accomplished by including in the coded information carried by the NPG an address uniquely identifying the aircraft for which it is intended, which address may or may not be the same as the identification code generated by the aircraft's ABT. The navigational signal is transmitted by the ground station on a carrier frequency $f_3$ to the satellite S2, which is provided with additional repeater circuitry operable at the frequency $f_3$, and thereby relayed to the aircraft A in the same manner as illustrated for the general interrogation signal in FIG. 1 (unlike the navigational signal, however, the interrogation signal is not encoded for one particular aircraft). Transmission of the navigational signal at a frequency $f_3$ different from the interrogation and beacon signal carrier frequencies $f_1$ and $f_2$, respectively, prevents confusion among these signals. Receiver circuitry operable at the frequence $f_3$ may then be carried aboard the aircraft for receiving the navigational signal and for detecting equivalence between the coded address carried by the navigational signal and the unique address assigned to that aircraft. If address equivalence is detected, the navigational information carried by the NPG is decoded and displayed by a digital readout device, such as a light-emitting diode (LED) array or a liquid crystal display (LCD). The information displayed would include, at a minimum, the aircraft's complete position in terms of latitude, longitude and altitude, and preferably also its true course, ground speed and rate of climb. Optionally, the information carried by all received NPG signals may be decoded by correspondingly equipped aircraft, thereby enabling such aircraft to generate cockpit displays not only of their own positions, but of the positions of all nearby aircraft as well.

To the extent that certain required information is not explicitly provided in the NPG, it may be calculated by airborne computational equipment from the raw data already available from the NPG. Thus, for example, if the NPG were to contain only position information, it would be possible for airborne equipment to calculate the aircraft's true course, ground speed, and rate of climb based on the positions reported by two or more successive NPGs and the time elapsed between them. Ordinarily, however, in the interest of minimizing the airborne equipment requirement, and since complete position, course ground speed, and rate of climb information must in any event be calculated on the ground for use by the ATC, all such information will be included in the NPG that is transmitted to the aircraft.

Other natural extensions of the present system made possible by the NPG concept, such as efficient pilot-to-ground communications and fully automated flight, will be described hereinafter.

It should be observed that the aircraft circuitry necessary for receiving and decoding the NPG can and preferably does function entirely independently of the aircraft's ABT circuitry. Consequently, light aircraft typically used for training or sport, whose pilots do not require navigational information beyond that provided by ordinary cockpit instrumentation, need only be provided with an ABT, at minimum expense, while airline, military and business aircraft may be further equipped, at the owner's discretion, with the full complement of equipment necessary for processing the navigational signal. By virtue of their ABTs, however, all aircraft may be tracked with equal accuracy by the air traffic control center. To the extent that the precise position, direction and speed information available at the air traffic control center is periodically required by aircraft not equipped with navigational signal receiving circuitry, such information can be provided verbally by air traffic control personnel using normal voice communication channels.

The arrangement of three synchronous satellites spaced at 45° longitudinal intervals in the equatorial plane of the Earth, as illustrated in FIGS. 1-4, is theoretically capable of covering a sector of the Earth's surface having a width approximately equal to that of the entire continent of North America (clearly, the size of the sector covered is defined simply by the requirement that the aircraft be in line-of-sight relationship will all three satellites at the same time). Worldwide coverage is obtained by providing further satellites at other longitudinal locations above the Equator, (and, optionally, by adding further ground stations, although it would be possible to relay all signals to and from a single ground station) so that the Earth's surface is in effect divided into a number of adjacent sectors. For a 45° spacing between successive satellites, a total of eight satellites are required for worldwise coverage. It will be readily apprehended, however, that a different angular spacing can be chosen and a greater or lesser number of satellites provided. Thus, for example, twelve satellites could be provided with a 30° spacing from one to the next. It should also be appreciated that the angular spacing between successive satellites need not be the same for all the satellites, as long as the position of each satellite is accurately known or ascertainable.

Given the large number of aircraft that are likely to be operating at any given time in an earth sector of the size contemplated here, the possibility of return signal overlap at the ground station exists. In practice, the following two types of signal overlap may occur: (1) overlap between two different return signals originating from the same aircraft, and (2) overlap between two different return signals originating from two different aircraft.

Same-aircraft return signal overlap (type 1) is not a serious problem. With reference to FIG. 2, this might occur, for example, when the aircraft A is in or very near the plane which includes the satellite S2 and the ground station GS and which is normal to the line connecting satellites S1 and S3. This problem is handled at the ground station simply by rejecting the overlapping return signals that occur during this time and extrapolating the course of the aircraft based on the information provided by the most recent non-overlapping return signals. Because the duration of the beacon signals produced by the aircraft's ABT is typically quite short, return signal overlap will usually occur only during a very brief period as the aircraft crosses through the plane defined above. During this interval, the course extrapolation procedure is more than adequate for providing the air traffic control center with the information it requires.

Different-aircraft return signal overlap (type 2) is handled at two levels by the system of the present invention. At the level of the ground station, return signals from different aircraft which do in fact overlap are simply rejected in the same manner as overlapping return signals from the same aircraft are rejected. In accordance with an important feature of the present invention, however, means are provided at the level of the aircraft to render it unlikely at the outset that return signals from different aircraft will overlap at the ground station. In particular, the ABT carried by each aircraft includes an inhibiting circuit for suppressing the generation of a beacon signal by the ABT for a predetermined time interval following the receipt of, and response to, an interrogation signal produced by the ground station. Thus, by way of illustration, the ABT's response to a given interrogation signal will initiate a lack of response by that particular ABT to the next "n" interrogation signals, the number "n" being dependent upon the relationship between the interrogation rate and the time interval during which the ABT inhibiting circuitry is effective.

In principle, the inhibit interval of each aircraft ABT could be different from that of every other aircraft ABT in the system, so that an overlap on one ABT response could not recur on the next. In practice, however, it is not necessary to assign a different inhibit interval to each and every aircraft using the system. It is enough if a sufficient number of different inhibit intervals are distributed among the various aircraft ABTs to reduce the chance of an overlap to an acceptably low value, because the arrival time of a return signal from a given aircraft will in any event depend upon the location of the aircraft as well as the inhibit interval of its ABT. Thus aircraft with nominally equal ABT inhibit intervals will not produce overlapping return signals at the ground station unless they are very close to the same position or are at mirror image positions relative to a plane of symmetry of the satellite pattern, and are coincidentally synchronized in the sense of responding to the same interrogation signal time after time. Even if this were to occur, the overlap would be only momentary and would disappear as the courses of the two aircraft diverged. There will be no recurring overlap of return signals from two different aircraft unless those aircraft both have the same ABT inhibit intervals, the same synchronization as to which of the interrogation signals is responded to, and substantially the same position, course and speed. This would require a five-fold coincidence, and is therefore quite unlikely.

Position Computation and System Resolution

Referring now to FIGS. 1 and 2, a method will be described for calculating the position coordinates of the aircraft A based on the measured arrival times $t_1$, $t_2$ and $t_3$ of the return signals produced in response to an interrogation signal generated by the ground station at time $t_0$. For convenience, the calculation is carried out in terms of spherical coordinates of the usual form (r, $\theta$, $\phi$), wherein r is measured from the earth's center, $\theta$ represents 90° minus latitude, and $\phi$ represents longitude from the Greenwich Prime Meridian. Therefore the respective coordinates of the ground station GS, satellites S1, S2, and S3, and aircraft A may be expressed as follows:

Ground station: $(r_{GS}, \theta_{GS}, \phi_{GS})$
Satellite S1: $(r_{S1}, \theta_{S1}, \phi_{S1})$
Satellite S2: $(r_{S2}, \theta_{S2}, \phi_{S2})$
Satellite S3: $(r_{S3}, \theta_{S3}, \phi_{S3})$
Aircraft: $(r_A, \theta_A, \phi_A)$ All sets of coordinates other than those for the aircraft A are known. Other necessary quantities which are known or measurable are the interrogation signal transmission time $t_0$, the response delay $T_A$ of the aircraft ABT, and the response delay $T_S$ of the satellite repeaters, which is assumed to be the same for all satellites at both of the frequencies ($f_1$ and $f_2$) which are involved in the position calculations. It is further assumed that all signals travel uniformly at the speed of light (c). To the extent that either of these assumptions is inaccurate in a particular case, it is a routine matter to make the appropriate corrections in the equations that follow.

In general, the straight-line distance between two points $(r_0, \theta_0, \phi_0)$ and $(r_i, \theta_i, \phi_i)$ is expressed as follows:

$$d = [(r_i \sin\theta_i \cos\phi_i - r_0 \sin\theta_0 \cos\phi_0)^2 + (r_i \sin\theta_i \sin\phi_i - r_0 \sin\theta_0 \sin\phi_0)^2 + (r_i \cos\theta_i - r_0 \cos\theta_0)^2]^{\frac{1}{2}} \quad (1)$$

Therefore the transit time of a signal traversing this distance at the speed of light (c) would be expressed as:

$$T = (1/c)[(r_i \sin\theta_i \cos\phi_i - r_0 \sin\theta_0 \cos\phi_0)^2 + (r_i \sin\theta_i \sin\phi_i - r_0 \sin\theta_0 \sin\phi_0)^2 + (r_i \cos\theta_i - r_0 \cos\theta_0)^2]^{\frac{1}{2}} \quad (2)$$

As a convenience, the right side of equation (2) may be expressed in functional notation as follows:

$$T = f[(r_0, \theta_0, \phi_0), (r_i, \theta_i, \phi_i)] \quad (3)$$

This notation will be employed consistently hereinafter, keeping in mind that the function "f" is merely a shorthand for the complete, albeit much longer, expression on the right side of equation (2).

It should be readily apparent that the distance measurement, and hence the transit time, will be the same if the coordinates of the two points $(r_0, \theta_0, \phi_0)$ and $(r_i, \theta_i, \phi_i)$ are interchanged in equations (1) and (2). In terms of the shorthand functional notation defined above, this means that:

$$f[(r_0, \theta_0, \phi_0), (r_i, \theta_i, \phi_i)] = f[(r_i, \theta_i, \phi_i), (r_0, \theta_0, \phi_0)] \quad (4)$$

With reference to FIGS. 1 and 2, it will be seen that the difference between the transmission time $t_0$ of the interrogation signal from the ground and the time of arrival $t_2$ at the ground station of the return signal associated with the satellite S2 will be:

$$t_2 - t_0 = f[(r_{S2}, \theta_{S2}, \phi_{S2}), (r_{GS}, \theta_{GS}, \phi_{GS})] + T_S + f[(r_A, \theta_A, \phi_A), (r_{S2}, \theta_{S2}, \phi_{S2})] + T_A + f[(r_{S2}, \theta_{S2}, \phi_{S2}), (r_A, \theta_A, \phi_A)] + T_S + f[(r_{GS}, \theta_{GS}, \phi_{GS}), (r_{S2}, \theta_{S2}, \phi_{S2})] \quad (5)$$

Applying equation (4) and combining terms yields:

$$t_2 - t_0 = 2f[(r_{S2}, \theta_{S2}, \phi_{S2}), (r_{GS}, \theta_{GS}, \phi_{GS})] + 2T_S + T_A + 2f[(r_{S2}, \theta_{S2}, \phi_{S2}), (r_A, \theta_A, \phi_A)] \quad (6)$$

The equations for the return signals from the satellites S1 and S3 are somewhat longer, since these signals are relayed through the middle satellite S2 before being returned to the ground station. Thus, for satellite S1:

$$t_1 - t_0 = f[(r_{S2}, \theta_{S2}, \phi_{S2}), (r_{GS}, \theta_{GS}, \phi_{GS})] + T_S + f[(r_A, \theta_A, \phi_A), (r_{S2}, \theta_{S2}, \phi_{S2})] + T_A + f[(r_{S1}, \theta_{S1}, \phi_{S1}), (r_A, \theta_A, \phi_A)] + T_S + f[(r_{S2}, \theta_{S2}, \phi_{S2}), (r_{S1}, \theta_{S1}, \phi_{S1})] + T_S + f[(r_{GS}, \theta_{GS}, \phi_{GS}), (r_{S2}, \theta_{S2}, \phi_{S2})] \quad (7)$$

Applying equation (4) and combining terms yields:

$$t_1 - t_0 = 2f[(r_{S2}, \theta_{S2}, \phi_{S2}), (r_{GS}, \theta_{GS}, \phi_{GS})] + 3T_S + T_A + f[(r_A, \theta_A, \phi_A), (r_{S2}, \theta_{S2}, \phi_{S2})] + f[(r_{S1}, \theta_{S1}, \phi_{S1}), (r_A, \theta_A, \phi_A)] + f[(r_{S2}, \theta_{S2}, \phi_{S2}), (r_{S1}, \theta_{S1}, \phi_{S1})] \quad (8)$$

Applying a similar procedure for satellite S3 yields, after some simplification:

$$t_3 - t_0 = 2f[(r_{S2}, \theta_{S2}, \phi_{S2}), (r_{GS}, \theta_{GS}, \phi_{GS})] + 3T_S + T_A + f[(r_A, \theta_A, \phi_A), (r_{S2}, \theta_{S2}, \phi_{S2})] + f[(r_{S3}, \theta_{S3}, \phi_{S3}), (r_A, \theta_A, \phi_A)] + f[(r_{S2}, \theta_{S2}, \phi_{S2}), (r_{S3}, \theta_{S3}, \phi_{S3})] \quad (9)$$

Equations (6), (8) and (9) form a set of three equations in which the aircraft coordinates ($r_A$, $\theta_A$, $\phi_A$) are the only unknowns, the remaining quantities being known or directly measurable. These equations may be solved for the coordinates ($r_A$, $\theta_A$, $\phi_A$) using standard matrix methods. See, for example, Korn and Korn, *Mathematical Handbook for Scientists and Engineers* (McGraw-Hill, New York, 1961), chapter 13. When the solution is completed, the coordinate $r_A$ is converted to the aircraft's altitude above mean sea level (MSL) by subtracting the radius of the earth $r_E$, and the coordinate $\theta_A$ is converted to the aircraft's latitude by forming the difference ($90° - \theta_A$). The coordinate $\phi_A$ is equal to the aircraft's longitude directly.

As noted previously, the present system may operate in an optional mode (not shown in FIG. 1) in which the ground station GS also detects the interrogation signal from S2. If the arrival time of the retransmitted interrogation signal back at the ground station is taken as the reference time $t_0$, the effect is to subtract the quantity $$2f[(r_{S2}, \theta_{S2}, \phi_{S2}), (r_{GS}, \theta_{GS}, \phi_{GS})] + T_S$$

from the right side of each of the equations (6), (8) and (9), thereby simplifying these equations somewhat. Mathematically, however, the calculation method is essentially equivalent to that described previously, although this optional mode of operation may be advantageous in terms of deriving information on changing ionospheric delays that affect the interrogation signal and the other signals relied on by the system.

With further reference to equations (6), (8) and (9) it may be observed that, from the standpoint of the ground station computer, the coordinates ($r_{S1}$, $\theta_{S1}$, $\phi_{S1}$), ($r_{S2}$, $\theta_{S2}$, $\phi_{S2}$) and ($r_{S3}$, $\theta_{S3}$, $\phi_{S3}$) may be treated as fixed constants since they are associated with geosynchronous or "stationary" satellites. While this is approximately true, minor perturbations will normally occur in the orbital position of a geosynchronous satellite due to the gravitational influences of the sun and moon. For this reason, the satellite coordinates are preferably left as variables in equations (6), (8) and (9), and inserted by the ground station computer during the course of each aircraft position calculation. The coordinates thus inserted may then be continually updated based upon known satellite position schedules stored in the ground station computer memory, or upon periodic direct measurements of the satellite positions. As will be described hereinafter, the latter measurements can in fact be made using the system of the present invention (see section on "Benchmarks", infra).

If the satellites S1, S2 and S3 are nonsynchronous, rather than synchronous as has been assumed thus far, continual updating of their coordinates as described above is necessary, rather than optional. Similarly, if the ground station is movable rather than fixed (as, for example, if it is carried aboard a seagoing vessel), the ground station coordinates ($r_{GS}$, $\theta_{GS}$, $\phi_{GS}$) must be left as variables in the equations (6), (8) and (9) and updated and inserted prior to each aircraft position calculation.

Geographically, the solution of equations (6), (8) and (9) will actually give rise to two possible mirror-image positions for the aircraft A, one in the Northern Hemisphere and one in the Southern Hemisphere. This ambiguity follows intuitively from the fact that the earth's equatorial plane includes all three satellites S1, S2, and S3, and thus defines a plane of symmetry for the system. This may be visualized by noting that an interrogation signal produced by an equatorial ground station GS at a time $t_0$ would give rise to the same set of return signal arrival times $t_1$, $t_2$ and $t_3$ for an aircraft located at a given latitude, longitude and altitude north of the equator and for an aircraft located at an equal latitude, longitude and altitude south of the equator. In reality, however, this ambiguity causes little problem and can easily be resolved in the system software. Thus, it is merely necessary to provide the ground station computer with the starting location of the aircraft, which can be inferred from the identity of the airport from which the aircraft originates or last touched down. Unless the aircraft later crosses the equator, this provides all the information necessary for unambiguously calculating the subsequent position of the aircraft at each point during its flight. As will be described in more detail hereinafter, the system software can in fact be designed to reliably detect and account for equatorial crossings by the aircraft being monitored, so that the equatorial ambiguity is for all intents and purposes eliminated.

It remains to establish the precision with which the system is capable of measuring the three aircraft coordinates. Of particular interest is the sensitivity of the time differences defined in equations (6), (8) and (9) to changes in one of the three aircraft coordinates. This may be determined mathematically by forming the partial derivatives of each of the time-difference equations (6), (8) and (9) with respect to the coordinate of interest to produce a sensitivity equation, and then substituting various aircraft position values into the sensitivity equation to yield the sensitivity of the time difference measurement to changes in the coordinate of interest at each of a number of different aircraft positions. The inverse of that sensitivity is the system resolution for the coordinate of interest, that is, the change in that coordinate per unit of measured time difference.

The results of such a calculation are presented in Tables 1 and 2. The case chosen is that in which the three satellites S1, S2 and S3 are exactly equatorial and are separated by 45° intervals in longitude, as represented in FIGS. 1 and 2. Tables for other situations show numbers in the same general range, so one example is sufficient. For convenience, it is further assumed that the aircraft A is at the same longitude as the middle satellite S2, so that the system resolution per unit time difference is the same for both ($t_1 - t_0$) and ($t_3 - t_0$).

In Table 1, the resolution of the system to changes in aircraft altitude is given for various representative values of latitude in the Northern Hemisphere. The same resolution would be obtained, of course, for corresponding latitudes in the Southern Hemisphere. For each latitude selected, resolution data is given in feet of altitude per nanosecond change in the measured values of both $(t_2-t_0)$ and $(t_1-t_0)$ or $(t_3-t_0)$.

TABLE 1

Altitude Resolution as a Function of Latitude

| Aircraft Latitude (degrees) | Geographic Location | Resolution, ft./nanosecond | |
|---|---|---|---|
| | | $(t_2-t_0)$ | $(t_1-t_0)$ or $(t_3-t_0)$ |
| 0 | Equator | .6 | .7 |
| 20° | | .62 | .76 |
| 30° | Southern U.S. | .7 | .8 |
| 50° | Approx. Northern Limit of Continental U.S. | 1.0 | 1.2 |
| 60° | Northern Canada | 1.4 | 1.75 |
| 70° | North of Arctic Circle | 2.5 | 3.3 |
| 80° | | 16 | 79 |
| 82° | | −177 | −22 |
| 85° | | −9 | −7 |
| 90° | | −3.5 | −3.5 |

There is a small latitude region well beyond the Arctic Circle where the $r_A$ vector of the aircraft is approximately at right angles to the lines between the aircraft and each of the satellites, and in this zone the altitude resolution of the system is poorest (although still comparable to the typical accuracies of barometric altimeters). Significantly, however, the zero points of the $(t_2-t_0)$ and $(t_{1,3}-t_0)$ sensitivities (i.e., the zero-resolution points of the system with respect to each of these time differences) do not occur at the same latitude, so the system is usable even in these extreme Northern (or Southern) latitude zones. Altitude resolution at the Poles is good, and in general it is good everywhere between the Arctic and Antarctic Circles. Of particular interest is the altitude resolution of the system over the continental U.S., which Table 1 indicates as being approximately one foot per nanosecond or better.

Due to the spaced longitudinal placement of the satellites S1, S2 and S3 in the earth's equatorial plane, the longitude resolution of the system is fairly constant with latitude. As long as the aircraft remains in a line of sight relationship will all three satellites, its longitude can be determined with a resolution of about 0.5 feet per nanosecond of measured time difference.

The last remaining figure of merit, latitude resolution, is presented in Table 2. The case is the same as that considered in connection with Table 1, but resolution data is given only with respect to the measured time difference $(t_2-t_0)$, the values for $(t_1-t_0)$ and $(t_3-t_0)$ being similar.

TABLE 2

Latitude Resolution as a Function of Latitude

| Aircraft Latitude (degrees) | Geographic Location | Resolution, ft./nanosecond $(t_2-t_0)$ |
|---|---|---|
| 1 | Near equator | 19 |
| 2 | | 14 |
| 3 | | 10 |
| 5 | | 6 |
| 10 | Latitude of Panama | 3 |
| 20 | Central America | 1.5 |
| 25 | Southern Limit of U.S. | 1.2 |
| 30 | | 1.0 |
| 50 | Northern Limit U.S. | 0.7 |
| | 48 contiguous states | |

As Table 2 indicates, there is only a thin equatorial band below the latitude of Panama where the latitude resolution of the system is reduced. From the latitude of Panama north, however, latitude resolution is about three feet per nanosecond or better.

Considering Tables 1 and 2 together, it will be appreciated that the per-nanosecond resolution of the system described is quite good except for a small region near the Poles (where altitude resolution is reduced) and a small region around the equator (where latitude resolution is reduced). It is possible to "fill in" these areas of reduced resolution by adding additional satellites in non-equatorial orbits, but from a practical standpoint the preferred system of three geosynchronous satellites in equatorial orbit (or a total of eight satellites for worldwide coverage, assuming a 45° separation as described) will be more than adequate. This is because the equatorial and near-polar regions in which the resolution of the three-satellite system is reduced are in fact regions of very little air traffic, which consequently require only minimal air traffic control supervision. Moreover, the air traffic that does occur in these regions consists mainly of military and large commercial aircraft, which will normally be equipped with sufficient supplementary equipment to meet their navigational requirements in these areas. An important advantage of the present system, then, is that the zones of reduced resolution that inevitably result from using a minimum number of satellites in this case are in the geographical areas where reduced resolution can best be tolerated. In this way, the capability for high-resolution position monitoring in high traffic density areas is achieved without unduly increasing the number of satellites required for implementing the system.

Benchmarks

The present system can be used in reverse, in order to precisely locate each of the satellites S1, S2 and S3, by providing three benchmark ABTs (similar in most respects to the aircraft ABTs) at three known, widely-separated locations on the earth's surface. In response to an interrogation signal relayed to the three benchmark ABTs by satellite S2, each benchmark ABT produces a beacon signal having the same format as the aircraft-produced beacon signal depicted in FIG. 5. In the case of the beacon signals produced by the benchmark ABTs, however, the 22-bit identification code (bits 3 through 24 in FIG. 5) identifies a ground station computer memory location where the precise location of the particular benchmark ABT is stored. For each interrogation signal produced by the ground station and responded to by the three benchmark ABTs, a total of nine return signals are received: three from satellite S2 directly, three from satellite S1 (relayed to the ground station by satellite S2), and three from satellite S3 (also relayed to the ground station by satellite S2). Due to the large distances separating the outer satellites S1 and S3 from the ground-link satellite S2, the first three return signals received at the ground station will be those which were relayed from the benchmark ABTs to the ground station directly via satellite S2. Using equations analogous to those discussed in the preceding section, the ground station computer now calculates the location of satellite S2 based on the transmission time of the interrogation signal, the arrival time of the return signals relayed by satellite S2 from each of the three benchmark ABTs to the ground station, and the known geographic locations of the three benchmark ABTs. A similar procedure is carried out for the three return signals received from satellite S1, and for the three return signals received from satellite S3 (in the case of these satellites, the signal delay times consequent from relaying all interrogation and return signals through the ground-link satellite S2 do enter into the computations, but these delay times are readily calculated once the location of satellite S2 is known). By repeating this procedure periodically, the ground station computer can continuously monitor the positions of the three satellites, thereby ensuring the accuracy of subsequent aircraft position computations in which the satellite locations are used as program constants.

In cases where the three satellites S1, S2 and S3 are all in geosynchronous equatorial orbit about the earth, as in the preferred embodiment of the present invention, the satellite locations will change only slowly and within small limits. As a result, the satellite positions need not be updated very frequently and the benchmark ABTs may be made to respond relatively infrequently to ground station interrogation signals (e.g., once every ten seconds) by providing them with suitably long inhibit intervals. If, on the other hand, the satellites S1, S2 and S3 are in nonsynchronous orbits, their positions will change rapidly and will therefore require much more frequent updating (e.g., on every interrogation).

As a further application of the benchmark concept, fixed or movable ABTs may be placed at particular locations on the earth's surface in order to precisely fix the locations of certain critical reference points within the system's computer memory. Thus, for example, portable ABTs may be hand-carried to the beginning and end points of certain airport runways in order to permit these points to be precisely located and stored by the ground station computer for use in enabling precision approaches or in carrying out automated (i.e., NPG-controlled) landings. In a similar manner, elevated terrain features, such as mountains and high towers, may be pinpointed in the ground station computer memory by placing a temporary or permanent benchmark ABT at the location in question. In the case of permanent ABT's, this would permit tracking ground shifts due to earthquakes. With or without this addition, topographic information in computer memory would permit automatic generation of a terrain alert by the ground station if an aircraft were found to be on a collision course with dangerous terrain.

Beacon Signal Format and Aircraft ABT Circuitry

As noted previously, the present system requires only that the individual aircraft carry a simple transponder capable of producing, in response to a general interrogation signal sent to all aircraft within range of the system, a reply beacon signal coded with information uniquely identifying the particular aircraft with which the transponder is associated. Preferably, the beacon signal will take the form of a group of digital pulses, successive pulses being representative of successive bits of binary information.

Figure 5:
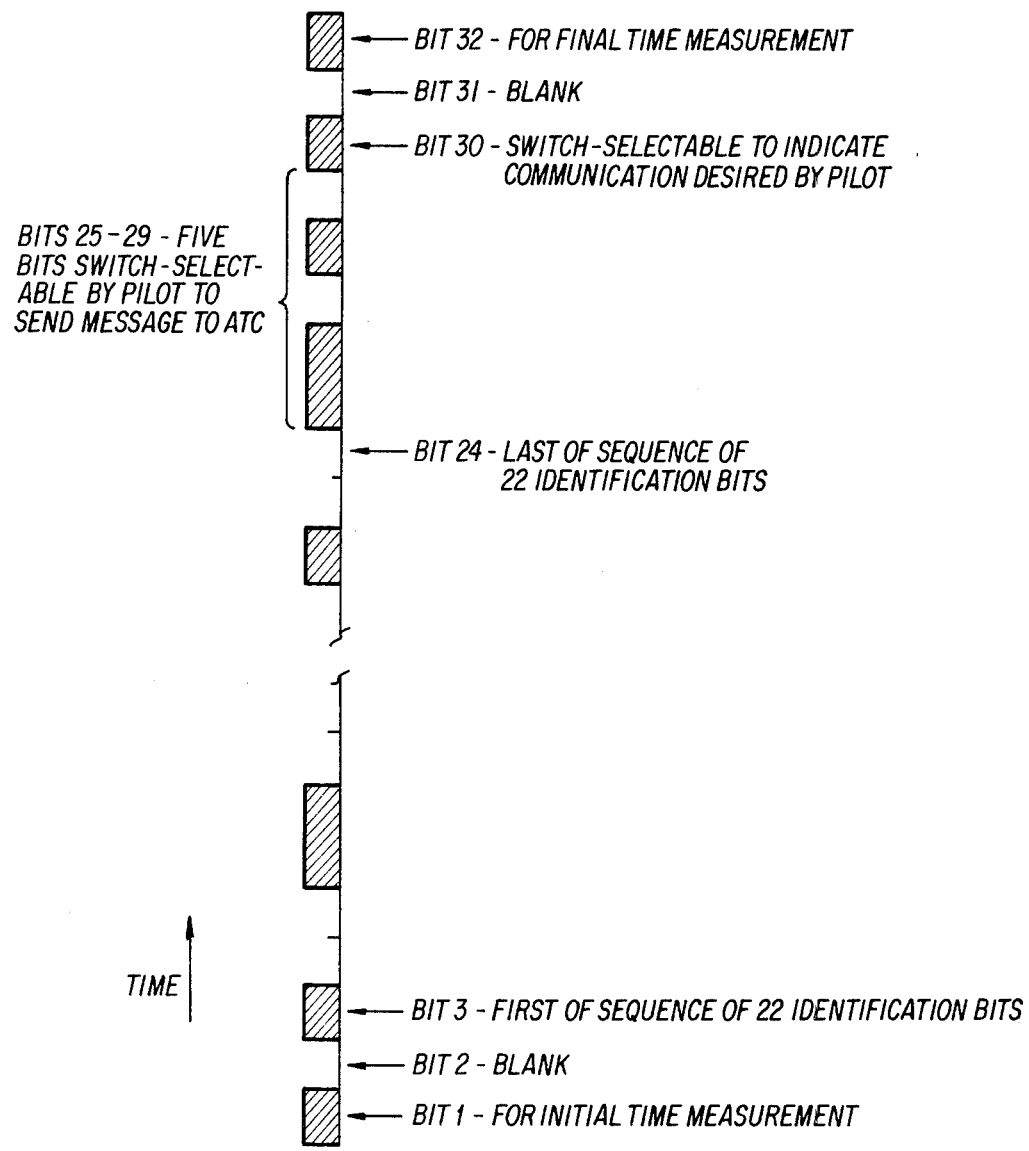
FIG. 5 depicts an exemplary format for the beacon signal produced by the aircraft-carried transponders.

An exemplary (although in no sense required) format for the beacon signal pulse group is shown in FIG. 5. In conformance with the definition of a binary bit, each bit in the pulse group can have only one of two possible states: "High" (binary one) or "Low" (binary zero). Proceeding in order of time sequence, the initial bit of the pulse group is a binary one which is used by the ground station for marking the arrival time of the leading edge of the pulse group. This is followed by a blank (zero) bit and then by a sequence of 22 bits which carry the identification code for the particular aircraft producing the beacon signal. The 22 bits shown are sufficient to uniquely identify over four million different aircraft, which is about one hundred times the total number of aircraft now in existence. Should a greater number of aircraft eventually use the system, however, it is merely necessary to increase the number of identification bits accordingly.

Following the 22 identification bits is a series of 5 bits whose states are switch-selectable by the pilot for sending certain designated messages to the air traffic control center. Since 5 bits are reserved for this purpose, 32 different messages are possible. Among these might be an indication that a hijacking is in progress, an indication that an emergency has been declared, a request for priority handling due to low fuel, an indication that the aircraft is unable to maintain its assigned altitude, and so on. Following these bits is another switch-selectable bit which, when set to the binary one state, indicates that the aircraft crew desires voice communication with ATC. Thus the aircrew can request voice communication and simultaneously send any one of 32 different messages to the air traffic control center. This communication-request bit is followed by a blank bit and a final binary one bit which is used by the ground station to mark the arrival time of the trailing edge of the pulse group.

Typically, the width of a single bit in the pulse group will be about 4 nanoseconds. Accordingly, the duration of the entire 32-bit beacon signal pulse group will be about 128 nanoseconds.

Figure 6:
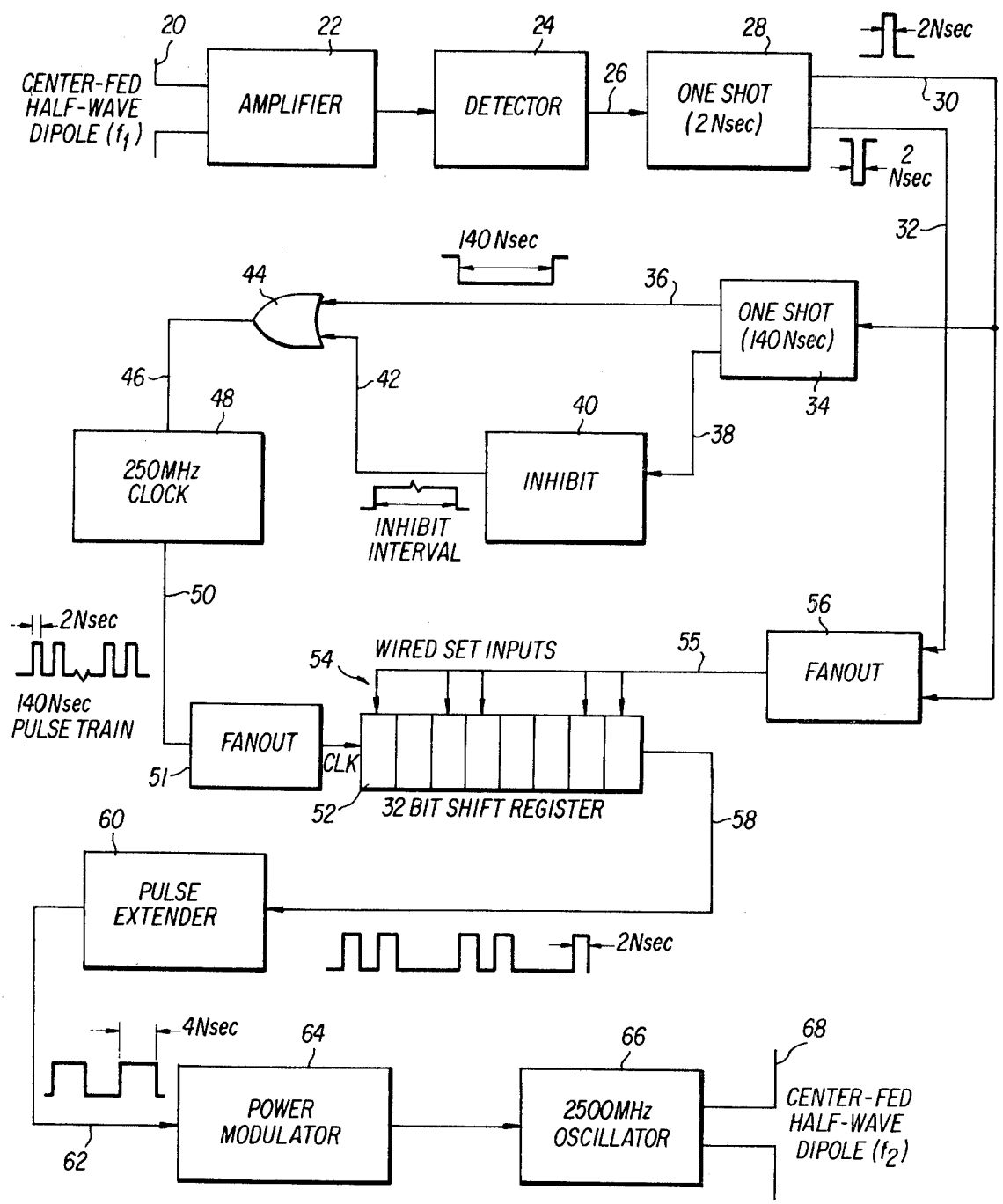
FIGS. 6–12 illustrate the various internal components of the aircraft-carried transponders.

A block diagram for the airborne ABT circuitry which is capable of generating a beacon signal having the format just described is shown in FIG. 6. It is to be understood that, although the block diagram of FIG. 6 represents a particularly preferred circuit arrangement, other circuits may be used depending on the type of beacon signal that is to be generated and on the requirements of particular applications. In this and all subsequent block diagrams, moreover, the specification of particular circuits or circuit components is illustrative only and is intended to embrace other circuits or circuit components which are substantially equivalent in function. Where particular discrete integrated-circuits are listed, it is also understood that in mass-production of the ABT (or other system component) all or most of the circuits may be combined in a single large-scale integrated-circuit (LSI) package. Specific listings of performance parameters are intended to indicate that an identifiable commercially-available circuit or element exists for each function, meeting or exceeding the requirements of the present system. For the most part, however, specified bit duration times, frequencies and pulse rates are merely nominal or illustrative, no particular choice being critical to the practice of the present invention.

In FIG. 6, all circuit elements from the 250 MHz clock 48 through the pulse extender 60 may be Motorola MECL III integrated circuits (in the subsequent figures depicting specific circuit elements, termination resistors have in some cases been omitted for clarity). The fundamental parameters of that I.C. family are as follows:

| | |
|---|---|
| Input capacitance | 3.3 picofarad |
| Rise/Fall time (edge) | 1 ns |
| Propagation delay | 1 ns |
| Toggle rate | 500 MHz typical, 260 MHz min. |
| Output driver impedance | 5Ω |
| Output current | 22 ma |
| Logic HI/LOW | −0.88 v/−1.75 v |

The MECL III family is designed to drive 50Ω transmission lines for any long runs. The Fairchild F100K ECL Logic family is faster than MECL III, and could be used as an alternative. The terms MECL, MECL III and MECL 10,000 are trademarks of Motorola, Inc.

Figure 7:
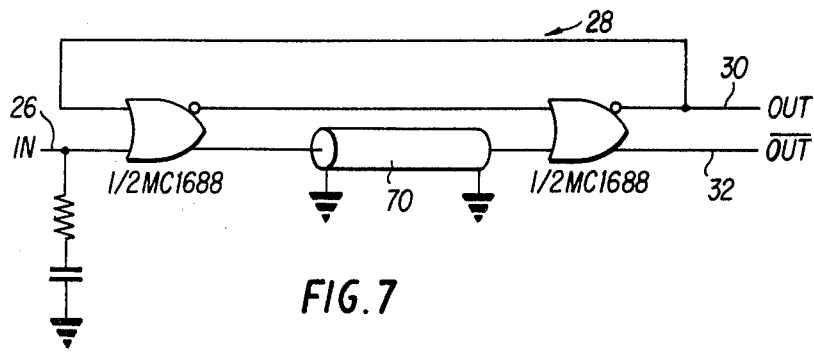

The operation of the ABT circuitry illustrated in FIG. 6 will now be described. It will be assumed that a short interrogation pulse (typically 4 nanoseconds in duration) has been produced at the ground station at a carrier frequency $f_1$ and relayed by satellite S2 to the aircraft, as illustrated in FIG. 1. The aircraft ABT includes a receiving antenna 20, which may be a center-fed half-wave dipole as indicated, for receiving the interrogation signal. The interrogation signal is applied to amplifier 22 and detector 24 to yield the pulse envelope on line 26. The signal envelope is applied to a one-shot univibrator 28, which responds by producing a positive-going 2-nanosecond output pulse on line 30 and a negative-going output pulse of the same duration on line 32. A schematic diagram for the one-shot univibrator 28 is shown in FIG. 7. It is built from an MC 1688 Dual 4-5 Input OR/NOR gate, following a circuit recommended by Motorola (see *MECL System Design Handbook*, 1972 edition, p. 203, FIG. 8-47). The pulse width of this univibrator is 2 nanoseconds, set by the delay cable 70 (which may alternatively be a stripline or microstrip).

Line 30 is connected to the input of a second one-shot univibrator 34, which responds to the positive transition of the pulse on line 30 by producing a negative-going 140-nanosecond output pulse on line 36 and a simultaneous positive-going pulse of the same duration on line 38. One-shot 34 may also be constructed according to the schematic diagram of FIG. 7 in order to obtain a fast output pulse risetime (thereby starting the clock 48 promptly, as will be described shortly), but the 140-nanosecond output pulse interval of one-shot 34 need not be of high precision and therefore may be set by an RC circuit rather than by a precision delay line as shown in FIG. 7. For reasons which will become clear as the description proceeds, the output pulse duration of one-shot 34 need merely be somewhat longer than the 128-nanosecond duration of the beacon signal pulse group which is to be generated by the ABT circuitry of FIG. 6, but its precise value is not critical.

The negative-going 140-nanosecond pulse on line 36 is applied to one input of an OR gate 44. The positive-going pulse on line 38 is applied to the input of an inhibit circuit 40, which will establish the time interval following the interrogation pulse during which the ABT is to be inhibited from responding to further interrogation pulses. The details of the inhibit circuit 40 will be described hereinafter. For present purposes, it will suffice to point out that, in response to the negative transition that occurs at the end of the 140-nanosecond pulse on line 38, the inhibit circuit 40 produces a positive logic level on line 42. The duration of the positive logic level on line 42 defines the inhibited interval of the ABT as a whole. It should be noted that the duration of the positive output of the inhibit circuit 40 is not a function of either the 2-nanosecond or the 140-nanosecond one-shot intervals, but will typically be several orders of magnitude greater than these.

Figure 8:
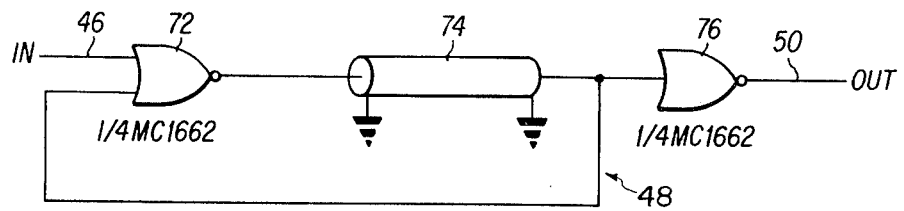

With further reference to FIG. 6, the output of OR gate 44 is connected to the input of a 250 MHz clock 48, which responds to a low input on line 46 by producing a series of 2-nanosecond pulses on its output line 50. A schematic diagram for the 250 MHz clock is shown in FIG. 8. It consists of a NOR gate 72 (¼ of an MC 1662) with its output fed back to one of the inputs through a delay line 74. A second NOR gate 76 (also ¼ of an MC 1662) provides output buffering. As long as the input line 46 is at a low MECL logic level, the output level of the NOR gate 72 will continuously alternate between high and low at a rate determined by the delay line 74. If the line 46 is brought high, however, the output of the NOR gate 72 is held low and further transitions are prevented, stopping the clock. The clock can be built alternatively from an MC 1688 or from ½ of an MC 1690 UHF prescaler (type D Flip-Flop). As will shortly become apparent, the 250 MHz clock rate of the clock 48 establishes the nominal bit transmission rate of the ABT circuitry of FIG. 6, but the clock rate need not be set to, or maintained at, a very high precision. In general, a precision of ±1% will be sufficient to make it unnecessary for the ground station circuitry to correct for ABT bit transmission rate differences. If the tolerance is relaxed to ±5% or more, the ground station receiving and decoding circuitry must automatically adjust for the clock rate of the particular ABT (one way in which this may be accomplished will be described hereinafter in connection with FIG. 18).

With further reference to FIG. 6, it will be noticed that normally, in the absence of a received interrogation signal, at least input 36 of the OR gate 44 is high, so that the output 46 of the OR gate 44 is also high and the clock 48 is therefore stopped. In response to a received interrogation signal, however, the OR gate input 36 will go low for a period of 140 nanoseconds. Assuming that the inhibit circuit 40 has not been triggered by a recent previous interrogation pulse, the OR gate input 42 is also low and therefore the OR gate output on line 46 is low as well. This starts the 250 MHz clock 48, which produces a series of 2-nanosecond wide pulses until the level on line 36 goes high 140 nanoseconds later. During the 140-nanosecond interval for which the clock 48 is enabled, a pulse train consisting of somewhat more than 32 clock pulses is produced on line 50. As will be demonstrated shortly, this assures that all 32 bits of the 128-nanosecond beacon signal pulse train are reliably generated and transmitted by the ABT prior to the onset of the inhibit interval.

At the completion of the 140-nanosecond interval, the level on line 38 goes low, thereby triggering the inhibit circuit 40 for the chosen inhibit interval. During this interval, the logic level on line 42 is high and therefore the output of OR gate 44 remains high regardless of what may occur on line 36. Accordingly, the 250 MHz clock 48 remains stopped and the generation and transmission of the beacon signal pulse group is consequently prevented during this interval, despite the occurrence of subsequent interrogation signals. By virtue of the 140-nanosecond delay interval attributable to one-shot 34, however, the ABT has been able to respond to the first-occurring interrogation signal without interference from the inhibit circuit 40.

Figure 9:
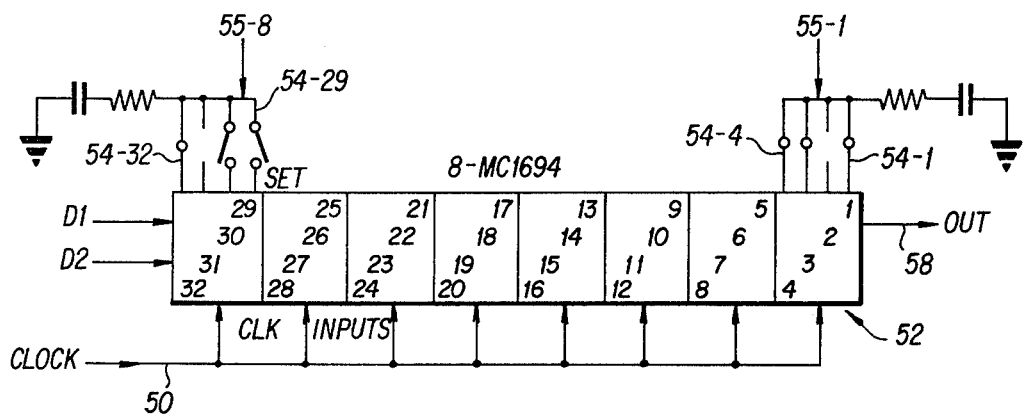
Figure 11:
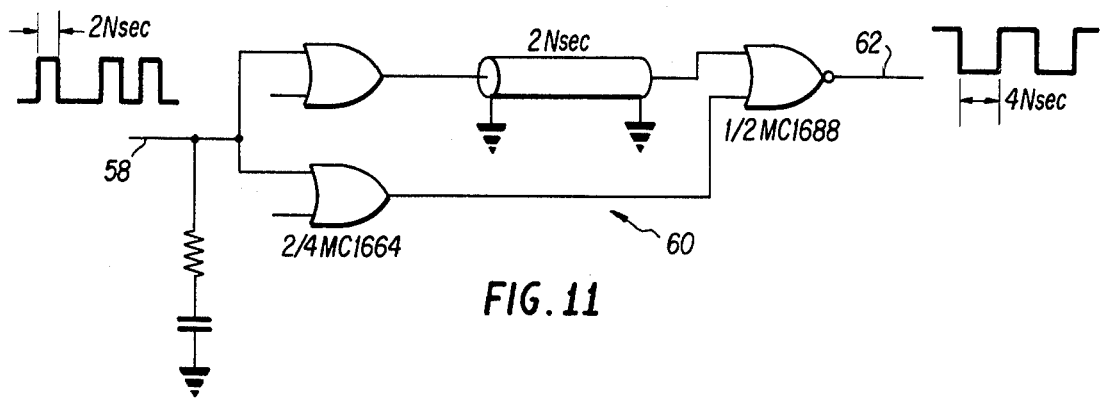

Assuming now that an interrogation signal has been received and that the inhibit circuit 40 has not already been triggered by a recent prior interrogation signal (i.e., the logic level in line 42 is low), generation and transmission of the beacon signal pulse group will take place as will now be described. The positive-going output pulse on line 30 from the one-shot univibrator 28 is applied to a fan-out circuit 56 in order to drive the SET inputs (indicated generally at 54) of a 32-bit shift register 52. As illustrated in FIG. 9, the 32-bit shift register 52 is formed by eight serially connected MC 1694 shift registers of 4 bits each (these devices have a specified minimum shift rate of 275 MHz at 25° C.). The fan-out circuit 56, illustrated schematically in FIG. 10, consists essentially of a parallel group of 4 OR gates and a similar parallel group of 4 NOR gates which are connected, respectively, to the positive-going output (line 30) and the inverted output (line 32) of the one-shot 28. In this way, 8 positive outputs are produced by the fan-out circuit on the lines 55-1 through 55-8 (represented collectively by the line 55 in FIG. 6). Each of these 8 lines has the full 22 mA output drive capability of the MECL III logic family.

Referring again to FIG. 9, each of the lines 55-1 through 55-8 drives 4 of the 32 individual set inputs of the shift register 52. Thus line 55-1 drives set inputs 54-1 through 54-4, and line 55-8 drives set inputs 54-29 through 54-32 as shown. The intervening lines 55-2 through 55-7 and set inputs 54-5 through 54-28 have been omitted from FIG. 9 for clarity, but these will be understood to be connected in an analogous manner. As indicated by the relevant specifications (Motorola "MECL High-Speed Integrated Circuits", Series B, 2nd Printing, 1978, pp. 4-43), the SET loading factor is 1.0, and the RC risetime contributed by four set loads is $4 \times 50 \text{ ohm} \times 3.3 \text{ pf} = 0.66$ nanoseconds.

As depicted schematically in FIG. 9, some of the set inputs 54-1 through 54-32 are connected to their respective lines 55-1 through 55-8 and others are not. With reference to FIG. 5, the connected set inputs will generate the binary-one bits of the beacon signal pulse train and the unconnected (open) set inputs will generate the binary-zero bits of the beacon signal pulse train. Thus set inputs 54-1 and 54-32 are connected, since these will generate the leading bit 1 and trailing bit 32 that are used for ascertaining the arrival time and duration of the 32-bit beacon signal pulse train at the ground station. Similarly, set inputs 54-2 and 54-31 correspond to the "blank" (zero) bits 2 and 31 in FIG. 5 and are therefore left open. Set input 30 corresponds to the optional "Communication Desired" bit 30 in FIG. 5, and is therefore selectively connected to line 55-8 through a highbandpass switch which may be controlled from the aircraft cockpit. Similar switches are provided for set inputs 54-25 through 54-29, which represent the reserved bits 25 through 29 of the beacon signal pulse group that may optionally be used to send one of 32 different coded messages to the air traffic control center as described earlier. Printed-circuit connections from the lines 55 to the remaining set inputs 54-3 to 54-24 are either left in place or are removed when the ABT is manufactured to form the 22-bit identifying code (bits 3 through 24 in FIG. 5) that is unique to the particular aircraft. As noted earlier, this is sufficient to distinguish more than 4 million aircraft operating on the same carrier frequency $f_2$.

Figure 10:
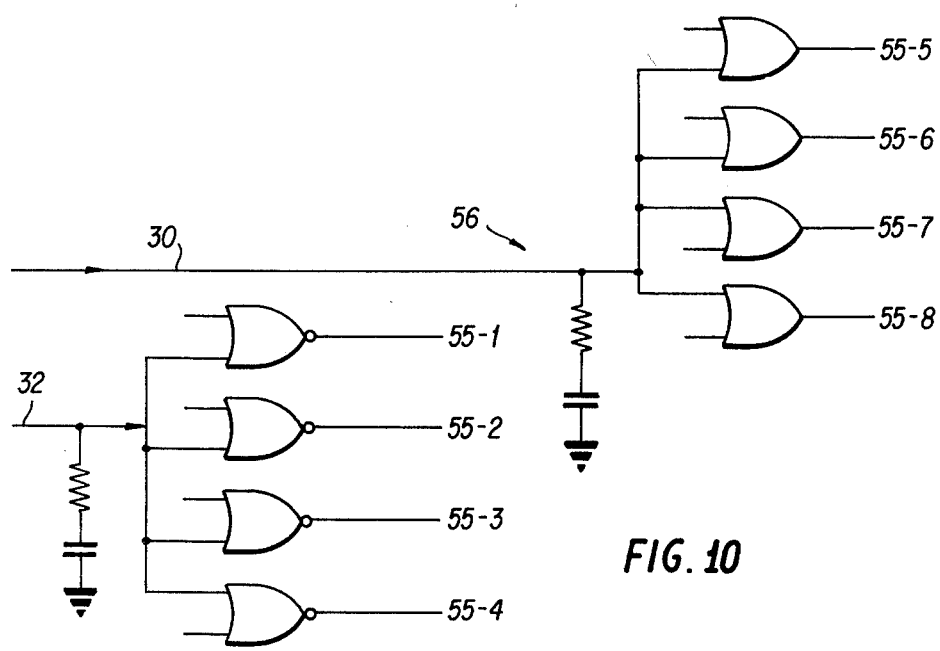

With further reference to FIG. 9, the inputs D1 and D2 of the left-most shift register are unused (as are all RESET lines) and these inputs are tied to MECL low. The line 50 from the 250 MHz clock 48 (FIG. 6) feeds all shift-register clock inputs (CLK) simultaneously through a fan-out circuit. The fan-out circuit, represented by block 51 in FIG. 6, has been omitted from FIG. 9 for clarity but is similar to the fan-out circuit 56 that is illustrated in FIG. 10.

Referring once again to FIG. 6, it will now be appreciated that a received interrogation signal, producing as it does a positive-going pulse on line 30, serves to load simultaneously all stages of the shift register 52 through lines 55 and 54 with binary ones and zeros in accordance with the pattern established by the hard-wired (i.e., permanently connected or unconnected, as the case may be) and switch-selected set inputs of the individual shift register stages. When the first of the clock pulses of the 140-nanosecond pulse train from the 250 MHz clock 48 arrives at the clock inputs of the series-connected shift register stages (which will be a transition to MECL low), the contents of the shift register are shifted one place to the right. This process is repeated for the successive clock pulses of the 140-nanosecond pulse train until the entire 32-bit contents of the shift register 52, occupying 128 nanoseconds, have been output on line 58. In practice, a factory-preset delay (not shown) may be interposed in line 50 relative to line 30 to ensure correct synchronization of the SET and CLK inputs. At the expiration of the 140-nanosecond interval, the inhibit circuit 40 becomes effective and further clocking of the shift register 52 cannot occur.

The pulse train appearing on line 58 consists of pulses 2 nanoseconds wide. These are widened by the pulse extender 60 to form pulses 4 nanoseconds in width on line 62. This is the desired width of the pulses that are to form the beacon signal pulse train. The pulse extender 60 is built using 2/4 MC 1664 OR gates, a ½ MC 1688 NOR gate, and a 2-nanosecond delay line connected in the configuration shown in FIG. 11. The final NOR gate supplies a negative going (inverted) signal for the power modulator circuit 64. Thus the input line 58 of the pulse extender sees a 32-bit serial code consisting of positive-going 2-nanosecond pulses. On the output line 62 of the pulse extender there appears a 32-bit serial code consisting of negative-going pulses 4-nanoseconds in width.

Figure 12:
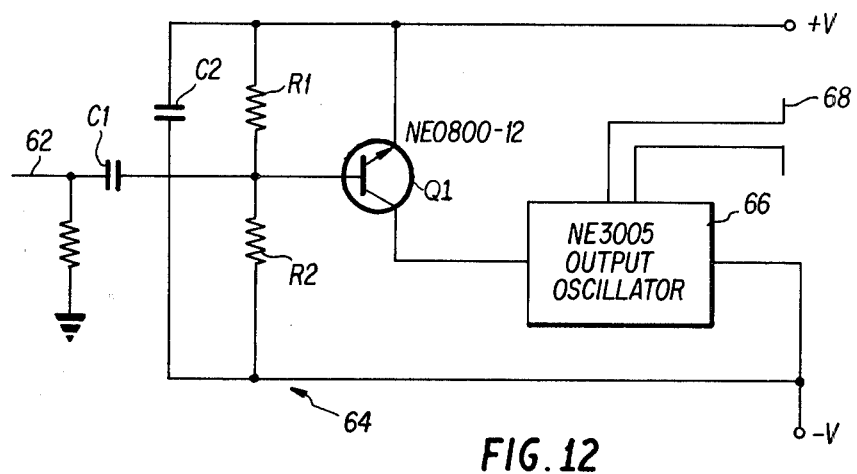

From the pulse extender 60, the widened pulses are carried by line 62 to the input of a power modulator circuit 64, and thence to a 2500 MHz output oscillator 66. The details of the power modulator circuit 64, and its connection to the output oscillator 66, are illustrated in FIG. 12. The power modulator is required to take a MECL signal output (0.9 volts into 50 ohms, or 1.8 volts into 100 ohms if both OR and NOR outputs are used) and switch higher power (5 to10 watt pulsed) into the 2500 MHz output oscillator 66, with rise and fall times of the order of one nanosecond. This is accomplished by the VHF/UHF power transistor Q1. A satisfactory power transistor for this purpose is the Nippon Electric Company type NEO-800-12 transistor, which is designed for a supply voltage of 10 to 13.5 volts, matching aircraft electrical systems. That transistor has a typical current gain of 60, a collector current of 0.5 amperes (pulsed), and a typical pulse output power of over 10 watts, rated at a frequency of 860 MHz. Resistors R1 and R2 provide DC bias to hold the power transistor Q1 nonconducting, so that in the steady state no power is available for the output oscillator 66. Capacitor C1 isolates the base voltage of Q1 from the MECL DC logic levels on line 62. The serially-coded pulse train on line 62 gates the power transistor Q1 on, thereby modulating the output oscillator 66 in successive 4-nanosecond intervals according to the binary code impressed on the pulse train. Capacitor C2 provides the high-current pulses required during oscillation, recharging from the low-current supply +V/−V during the intervals between successive beacon signal pulse groups.

The output oscillator 66 may be the Nippon Electric Company type NE-3005, designed for a typical output power of 5 watts pulsed when operating as a class C amplifier or oscillator at a frequency of up to 3000 MHz. In the present case, an oscillator frequency of 2500 MHz is chosen, which defines the carrier frequency $f_2$ of the beacon signals produced by the ABT in the illustrative embodiment.

An antenna 68 is connected to the output of the oscillator 66 so that the beacon signal pulse group, now impressed on a 2500 MHz carrier frequency, may be radiated outward from the aircraft A to the ground link satellite S2 in the manner depicted in FIG. 2. Preferably, the antenna 68 is operable at the interrogation signal carrier frequency $f_1$ as well as at the beacon signal carrier frequency $f_2$. In this way, with suitable splitter circuitry, the antenna 68 can be used for receiving the interrogation signals as well as transmitting the responsive beacon (reply) signals, and the separate interrogation signal receiving antenna 20 shown in FIG. 6 is not required.

A center-fed dipole configuration is preferred for the antenna 68, with the dipole aligned with the longitudinal axis of the aircraft and located at its lateral midline, at the top of the fuselage, preferably above the main wheels of the aircraft. This insures a broad radiation pattern that is substantially insensitive to roll, pitch and yaw. During landing approaches, such placement of the antenna also enables the position of the aircraft main wheels to be located by the system relative to the guideslope, in a manner relatively insensitive to pitch as well as to roll and yaw.

In physical layout, the ABT may be manufactured most simply as a single, small self-contained unit complete with its antenna (at 2500 MHz, one-half wavelength is only 5 centimeters). The only necessary external connections to the ABT are then the power supply leads (from the master electrical bus of the aircraft) and, optionally, the lines carrying switch-selected signals from the cockpit for transmission to air traffic control on bits 25 through 30 of the beacon signal pulse group.

ABT Inhibit Circuit

Figure 13:
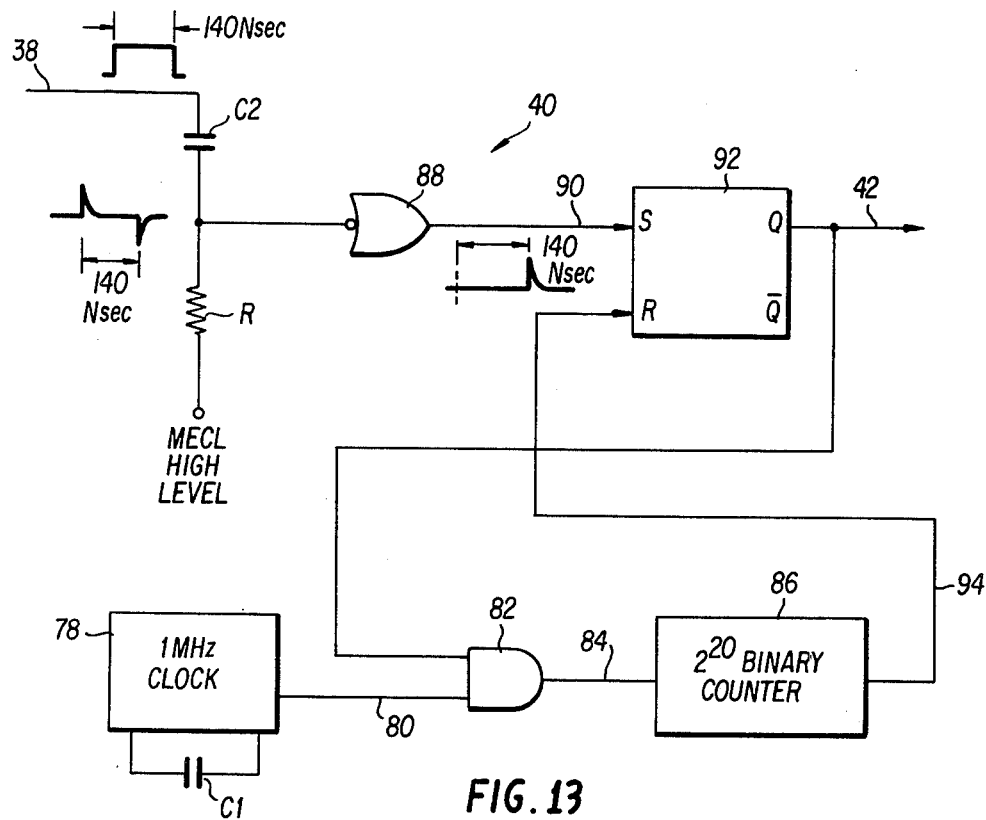
FIGS. 13 and 14 illustrate the details of different embodiments of the inhibit circuit contained in each of the aircraft-carried transponders.

As pointed out earlier, an important feature of the present invention is the inclusion in the aircraft ABT circuitry of an inhibit circuit 40 (FIG. 6) for inhibiting the response of the ABT to all interrogation signals occurring within a predetermined interval following the last responded-to interrogation signal. An exemplary inhibit circuit for accomplishing this result is shown in FIG. 13. All components of the inhibit circuit can be slow, non-precision types (such as the MECL 10,000 series). Particular circuitry corresponding to the blocks in FIG. 13 can be found, for example, in the Motorola *MECL Design Handbook*, or the equivalent, but the particular circuitry chosen is noncritical. Accordingly, a description of the block diagram of FIG. 13 will suffice for an understanding of the inhibit circuit.

With specific reference now to FIG. 13, the inhibit circuit 40 includes a free-running, nonprecision clock 78, the frequency of which is established by a conventional resonant or relaxation circuit including the nonprecision capacitor C1. The clock runs at a relatively slow rate, typically 1 MHz, set by the value of the capacitor C1. The output of the clock on line 80 is connected to one input of an AND gate 82, the output 84 of which is applied to a binary counter 86. A scale of $2^{20}$ (two raised to the twentieth power) for the binary counter would be a typical value. Normally, with the clock 78 periodically triggering only one input of the AND gate 82, the output 84 of the AND gate remains low and no counting takes place at the binary counter 86.

This situation changes in response to a 140-nanosecond positive-going pulse on line 38 from the one-shot univibrator 34 of FIG. 6. This pulse is differentiated by the capacitor C2 to produce two spikes (one positive and the other negative) 140 nanoseconds apart. Inverter 88 isolates and inverts the negative-going spike, which is then applied to the SET input of a latch (i.e., flip-flop) 92 over line 90. The set condition of the flip-flop 92 causes its noninverted output Q to go high, producing a positive logic level on line 42 which is the output of the inhibit circuit (the inverted output $\overline{Q}$ of the flip-flop is not used). The occurrence of the positive logic level on line 42 defines the beginning of the inhibit interval.

Line 42 is also connected to the second input of the AND gate 82. As a result, the AND gate is now enabled in response to each positive transition of the clock pulse train on line 80, so that the clock pulse train is reproduced at the output of the AND gate on line 84. This causes the binary counter 86 to begin counting. When the counter has counted up to its full capacity, which has been indicated as $2^{20}$ (two raised to the twentieth power) for purposes of example, and returns to its original state, it produces a pulse at its output which is applied over line 94 to the RESET input of the flip-flop 92. With the flip-flop 92 now in a reset condition, its Q output goes low, thereby disabling the AND gate 82 and preventing further counting by the binary counter. The low condition of the Q output of the flip-flop 92 produces a low logic level on the output line 42 of the inhibit circuit, thereby ending the inhibit interval.

As noted previously, the inhibit interval of a particular aircraft's ABT will determine how often it will respond to interrogation signals produced at the ground station, and therefore how often its position will be updated by the ground station computer. For reasons to be discussed hereinafter, a preferred repetition frequency for the interrogation signal is approximately 25 Hz, which would therefore define the maximum rate at which the position of any given aircraft can be updated. In order to reduce the probability of return signal overlap and to avoid overburdening the computational equipment at the ground station, however, it is desirable to have at least some of the aircraft respond less frequently than this by increasing their inhibit intervals. Further, it is desirable to provide for a substantial range of variation in the inhibit intervals of different aircraft ABTs (although it is not necessary that a unique interval be assigned to each and every aircraft) so that the chances of return signal overlap from two nearby aircraft are reduced to acceptable levels.

All of the foregoing requirements are easily met in the inhibit circuit of FIG. 13 by appropriate choice of the capacitor C1, which determines the clocking pulse rate of the nonprecision clock 78. For a binary counter 86 of given capacity, this clock rate will control the inhibit interval of the ABT and hence the frequency with which it will respond to interrogation signals from the ground station. For slow, piston aircraft, one response per second (i.e., one response for every 25 interrogations in the present example) will normally be more than adequate. For high speed turbine aircraft, a response frequency on the order of 8 responses per second might be appropriate. If the aircraft is to be equipped for fully automated flight based on the position information derived from its return signals, an even higher response frequency may be required. In each case the required response frequency can be set by choosing the value of capacitor C1 appropriately. This will normally be done at the factory during initial assembly of the ABT, but the capacitor C1 is preferably left external to the clock 78 so that it may be conveniently replaced in the event that a change in the ABT's response frequency becomes necessary or desirable. The expense involved in such replacement is minimal, since C1 need not be a high precision capacitor and in fact should not be, to preserve some degree of randomness among nominally identical ABTs.

An important feature of the foregoing arrangement is that each aircraft using the system may have its position updated at a rate suited to its own particular needs without resorting a discrete addressing of the aircraft from the ground, and without modifying the interrogation signal repetition rate at the ground station. This represents a vast improvement in terms of simplicity over previously known systems employing discrete addressing and/or variable interrogation rates. Moreover, by keying the onset of the inhibit interval to the interrogation signal itself rather than to some separately-provided signal, the inhibit function is confined solely to the individual aircraft transponders and the complexity of the system as a whole is minimized. A further advantage of the present system is that it allows the effective response frequency of any given aircraft to be easily changed, merely by the replacement of one nonprecision circuit element in its transponder.

Figure 14:
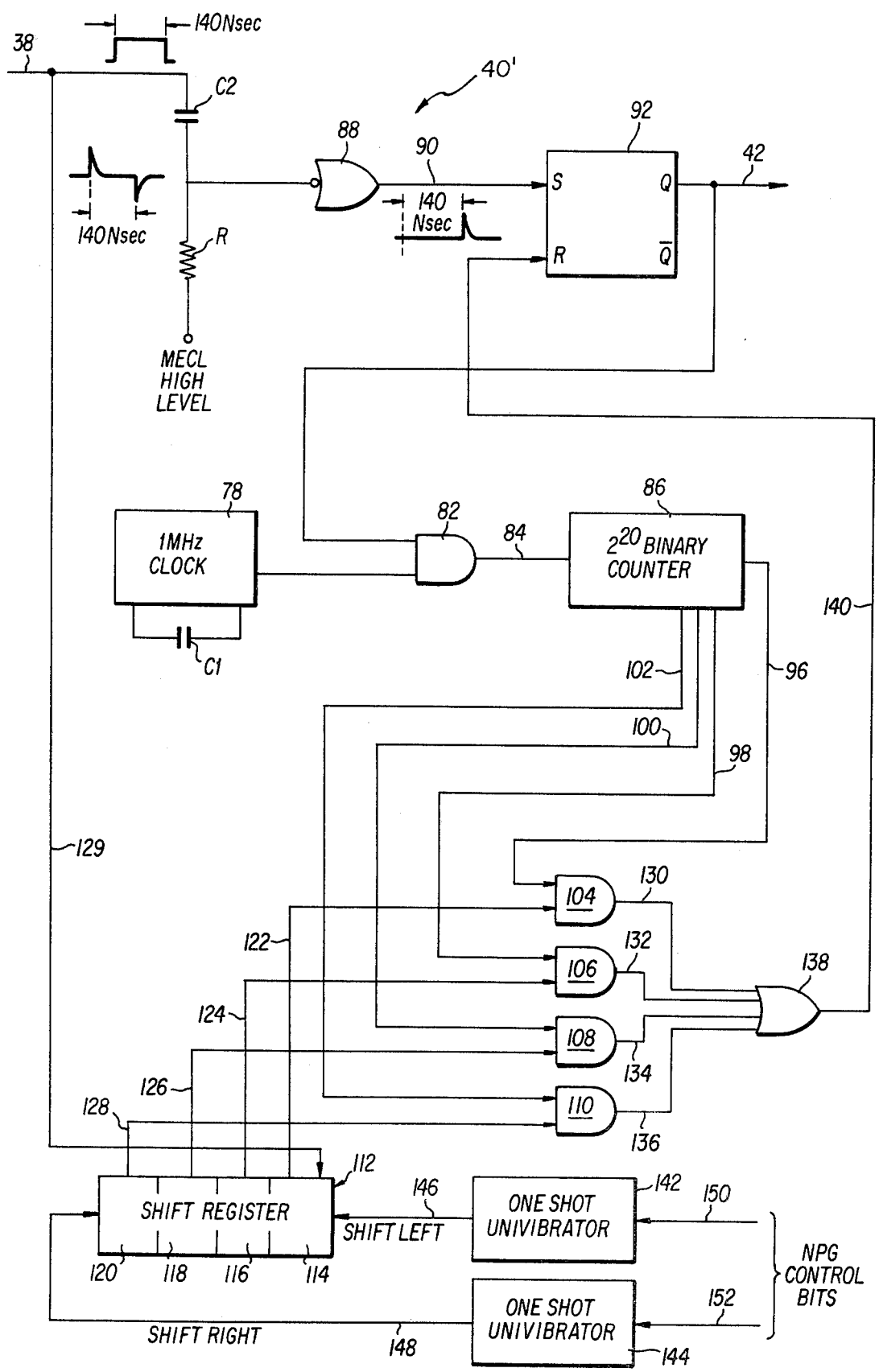

A modified version of the inhibit circuit 40 is illustrated in FIG. 14. In this version, the inhibit interval of the circuit may be selectively varied in order to increase or decrease the ABT response frequency of a particular aircraft as desired. The advantage of this capability will be readily appreciated. For example, although high-speed turbine aircraft may require very frequent position updating in and around high-density air traffic zones such as major airports, the same aircraft will not require such frequent position updating when they are in straight and level flight far from other aircraft, as for example during high-altitude flight along major cross-country air routes. In such instances it is desirable to decrease the response frequency of the aircraft, since this will reduce the number of return signals received at the ground station and will therefore reduce both the computational burden on the ground station equipment and the probability of return signal overlap from different aircraft at the ground station. At the same time, it is desirable to retain the aircraft's potential for a higher response frequency when this is needed.

The foregoing objectives are met by the modified inhibit circuit 40' of FIG. 14. The upper portion of this circuit, down to the binary counter 86, is similar to that of FIG. 13 and corresponding reference numerals have been used for these components. As before, all components of the FIG. 14 circuit are relatively slow, nonprecision types such as the MECL-10,000 series, and the particular choice of hardware is noncritical. In the modified circuit of FIG. 14, outputs 96 through 102 are taken from a number of the later stages of the binary counter 86. Each of these is applied to one input of a corresponding number of AND gates 104 through 110. The second inputs 122-128 of the AND gates 104-110 are taken from the individual stages 114-120 of a shift register 112. The number of shift register stages required is equal to the number of higher-order stages of the binary counter 86 that have been tapped (four in the illustrated embodiment), and will determine the range of variation of the inhibit interval as will shortly become apparent.

With continued reference to FIG. 14, the outputs 130-136 of the respective AND gates 104-110 are applied to the inputs of an OR gate 138. The output 140 of the OR gate 138 is applied to the RESET input of the flip-flop 92. The input line 38 of the inhibit circuit is also applied as an input to the rightmost stage 114 of the shift register 112 through line 129. The "shift left" and "shift right" inputs of the shift register 112 are controlled by the respective outputs 146 and 148 of two one-shot univibrators 142 and 144. The inputs to the one-shots 142 and 144 are derived from a command signal transmitted to the aircraft by the ground station and are applied on lines 150 and 152. As will be described in more detail hereinafter, the command signal may conveniently be implemented by means of reserved control bits in the navigational signal (NPG) that is used to transmit position, speed and course information from the ground station to the particular aircraft to which it relates.

In operation, the 140-nanosecond pulse that occurs on line 38 in response to each interrogation signal is also applied by line 129 to the rightmost stage 114 of the shift register 112 to place a binary one therein (this is done primarily to establish correct operation of the ABT on initial startup). The upper portion of the inhibit circuit 40' of FIG. 14 now functions in substantially the same manner as described with reference to FIG. 13, with the binary counter 86 counting clock pulses from the 1 MHz clock 78 to measure off the inhibit interval. When the binary counter 86 has counted up to its full capacity, a high logic level is produced on the output line 96 of its final stage and applied to one input of the AND gate 104. The second input 122 of this AND gate is also high, due to the binary one in the rightmost stage 114 of the shift register 112. Consequently, the AND gate 104 is enabled, causing its output 130 to go high and thereby enabling the OR gate 138. This in turn produces a high logic level on line 140, thereby resetting the flip-flop 92 and ending the inhibit interval by causing the output line 42 of the inhibit circuit to go low.

Assuming now that a ground-transmitted NPG signal had generated one or more pulses on the input line 150, the binary one in the rightmost stage 114 of the shift register 112 would have been shifted one or more places to the left. It will be assumed, for purposes of illustration, that two control pulses had occurred on line 150 and that the binary one in stage 114 had consequently been shifted two places to the left, into stage 118. This results in a high logic level on the lower input 126 of AND gate 108. Some time later, when the binary counter 86 has reached a point where a positive logic level occurs on line 100, the AND gate 108 is enabled, thereby enabling the OR gate 138 and terminating the inhibit interval. It will be observed that, since the line 100 is connected to the second-from-final stage of the binary counter 86, the inhibit interval was terminated when the counter had reached only one-quarter of its full capacity count. Thus, the inhibit interval was shortened by a factor of four, and the response rate of the aircraft ABT was effectively quadrupled.

It should also be noted that, once the binary one in stage 114 of the shift register 112 has been shifted left into stage 118 in response to NPG control bits, it will remain there for all subsequent interrogation signals unless and until further "shift left" or "shift right" commands occur (each subsequent interrogation signal does restore a binary one to stage 114, but this is immaterial since it is only the leftmost stage of the shift register containing a binary one that determines the duration of the inhibit interval). Accordingly, the inhibit interval remains shortened until it is again modified by the ground station or until power is removed from the ABT unit. When the ABT is restarted after having been turned off, the first interrogation signal restores a binary one to stage 114 of the shift register 112, thereby setting the inhibit circuit for the maximum inhibit interval. In effect, therefore, the inhibit circuit 40' automatically defaults to the maximum inhibit interval (i.e., to the minimum response rate) each time that the ABT is turned on, thereby minimizing the chances of return signal overlap at the ground station and reducing the computational burden on the ground station computer until such time as a higher ABT response rate is affirmatively selected.

Since the last four stages of the $2^{20}$ binary counter 86 are tapped in FIG. 14, the inhibit interval produced by the circuit 40' may be varied by a factor of eight ($2^3$). When the clock 78 has a frequency of 1 NHz as in the illustrated embodiment, this corresponds to a maximum inhibit interval of about 1.05 second (allowing approximately 1 response per second at a 25 Hz interrogation signal repetition rate) and a minimum inhibit interval of about 0.13 second (allowing approximately 8 responses per second at a 25 Hz interrogation signal repetition rate).

A number of modifications to the inhibit circuit of FIG. 14 are possible. For example, although only the last four stages of the binary counter 86 are tapped in FIG. 14, it may be desirable to take outputs from a greater number of stages (and to provide a correspondingly greater number of stages in the shift register 112) in order to provide a greater range of variation in the inhibit interval of the aircraft ABTs. In particular, it may be desirable to provide an inhibit interval short enough to allow the aircraft ABT to respond to every interrogation signal, thereby allowing the aircraft's position to be updated at the maximum rate. This interval might be used, for example, during the last seconds of flare and touchdown to allow precision approaches by aircraft equipped with NPG receiving equipment, or to allow precision automated landings by aircraft equipped with an NPG-controlled three-axis autopilot. Thus in FIG. 14, tapping the final six (rather than four) stages of the binary counter 86 would provide a minimum inhibit interval short enough to allow the ABT to respond to every interrogation signal at a 25 Hz interrogation signal repetition rate. At the other extreme, the maximum inhibit interval may be made as long as desired merely by adding additional stages to the binary counter 86. Thus, for example, a $2^{27}$ binary counter would provide a maximum inhibit interval of about 134 seconds (corresponding to a response frequency of about 0.0075 Hz) when used with the 1 MHz clock 78.

As a further possible modification to the inhibit circuit of FIG. 14, the inhibit interval could be varied directly by the pilot rather than in response to ground-transmitted NPG signals. This could be accomplished by controlling the input lines 150 and 152 with momentary pushbuttons located in the aircraft cockpit. A digital readout might then be provided to indicate to the pilot the inhibit interval (or, inversely, the ABT response frequency) currently in effect. Such an arrangement would have the advantage of allowing precision monitoring of light aircraft that are not provided with NPG receiving equipment. The appropriate inhibit interval (or response frequency) setting would then be radioed to the aircraft pilot over normal voice communication channels as the aircraft approached an airport or other region of high air traffic density. For aircraft equipped with the full complement of NPG receiving and processing circuitry, including the circuitry necessary for automatic control of the ABT inhibit interval, parallel manual control of the inhibit interval may still be desirable in order to allow the crew to temporarily obtain more frequently updated position information even when this may not be necessary from the standpoint of the air traffic control center.

Satellite Electronics

In accordance with an important object of the present invention, the complexity of the satellite-carried electronics, like that of the aircraft-carried ABT, is kept to a minimum. For the most part, the satellites required by the present system need merely contain receiving and transmitting circuitry for relaying interrogation, reply beacon, and (optionally) NPG signals between ground station and aircraft. All critical time-measurement circuitry used for aircraft position determination is placed at the ground station, so that this circuitry can be improved and upgraded as the electronic art advances without the necessity of revisiting any of the satellites.

The only additional circuitry requirement, beyond relay receivers and transmitters, is that which derives from the need to identify, at the ground station, the particular satellite with which each return signal is associated. Thus, with reference to FIG. 2, the ground station GS will receive three time-spaced return signals (all at the same frequency $f_2$) for each beacon signal originating from the aircraft A. In practice, the return signal from satellite S2 (by which is meant the signal which traverses the direct path from A to S2 to GS) will always arrive at the ground station before the return signals from satellites S1 and S3 (which must be relayed to the ground station through S2), regardless of the aircraft location. This is due to the fact that the signal relay distance separating S2 from S1 or S3 will be much greater than the differences in the distances separating the aircraft from each of the three satellites. Thus it is always possible to identify the return signal from satellite S2. The order of the return signals from satellites S1 and S3, however, depends on the aircraft location which is by assumption unknown. It is therefore desirable to "tag" at least one of the signals from these satellites in some way, so that each signal may be properly associated by the ground station with the particular satellite that produced it. This may be done in several different ways. Regardless of the particular technique chosen, however, it will shortly become apparent that the selection of one satellite (satellite S2 in the present example) as the ground link allows all the necessary "tagging" circuitry to be confined entirely to that satellite.

Figure 15:
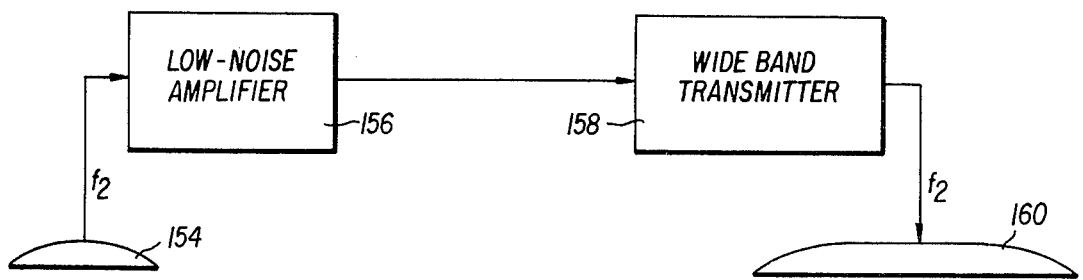
FIG. 15 illustrates the internal components of the two outer satellites S1 and S3 shown in FIGS. 1 and 2.

Since the circuitry of the outer satellites S1 and S3 is the simplest, it will be convenient to describe these satellites first. Satellites S1 and S3 are required merely to receive beacon signals from the interrogated aircraft and to relay these signals to the ground link satellite S2. FIG. 15 illustrates the components necessary for accomplishing this, these components being the same for both satellites S1 and S3. Each of these satellites carries a wide beam receiving antenna 154 for receiving beacon signals from the aircraft to be tracked by the system. This antenna, which is operable at the carrier frequency $f_2$ of the aircraft ABTs (2500 MHz in the present example), will typically be in the form of a parabolic dish but may assume other configurations if desired. The signals received by antenna 154 are passed through a low-noise amplifier 156, which produces a signal level boost suitable to the input sensitivity of the wideband transmitter 158. Transmitter 158 provides the further amplification necessary for retransmitting the beacon signal to the ground link satellite S2. This retransmission takes place at the same frequency $f_2$ over the narrow-beam transmitting antenna 160 (also shown as a parabolic dish), which is positioned on satellites S1 and S3 so that its radiation pattern is directed toward a similar antenna mounted on the middle satellite S2. All of the aforementioned components are conventional in design and can be fabricated from readily available parts. Thus, for example, the first stage of the low-noise amplifier could use the field-effect transistor chip NE-244, which has a 20 db gain and a tuned noise figure of 1.2 db at a frequency of 2500 Hz.

Figure 16A:
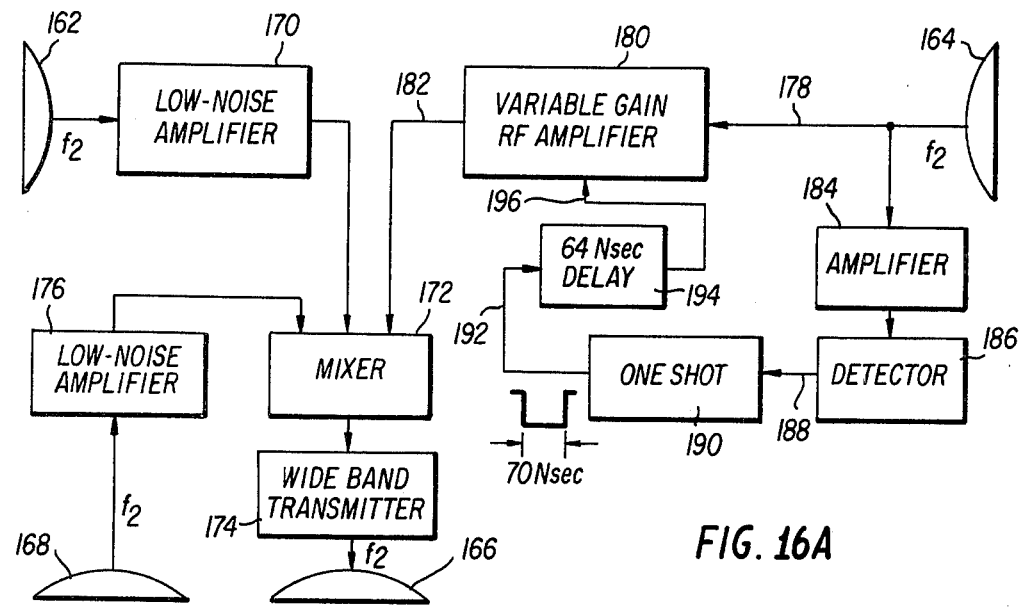
FIGS. 16A–16C illustrate the internal components of the ground-link satellite S2 shown in FIGS. 1 and 2.
Figure 16B:
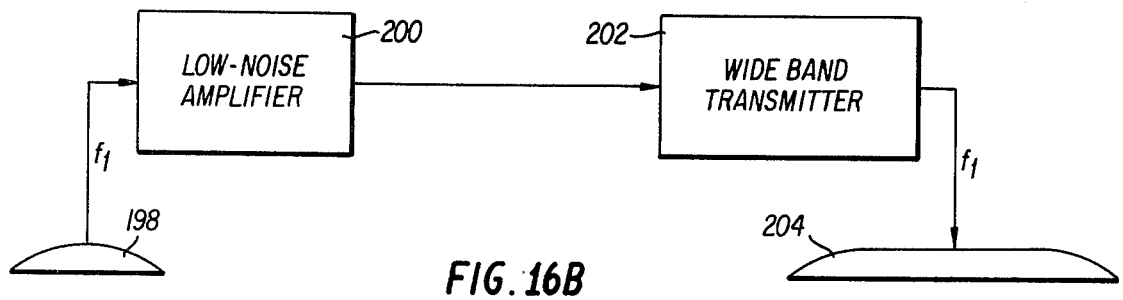
Figure 16C:
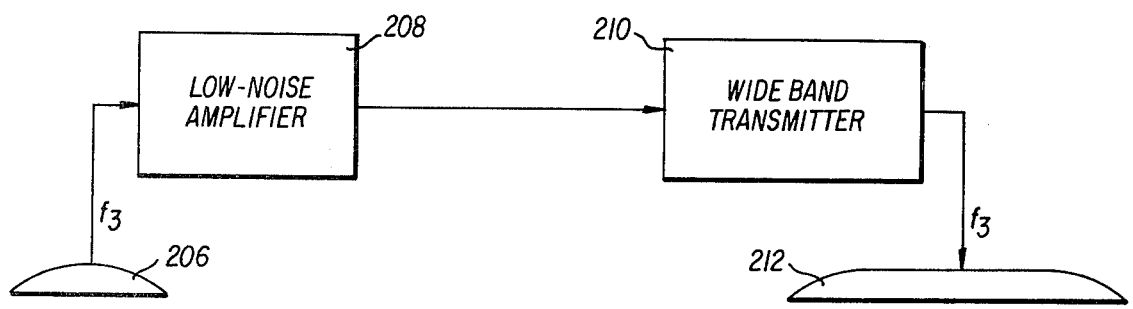

The transmitting and receiving circuitry of the ground-link satellite S2 consists of a number of subsystems which are illustrated in FIGS. 16A, 16B and 16C. It will be recalled that satellite S2 has a number of different functions: (1) to relay interrogation signals from the ground station to all aircraft within range of the system; (2) to retransmit beacon signals received directly from the responding aircraft to the ground station; (3) to relay to the ground station beacon signals received and retransmitted by the outer satellites S1 and S3; and, optionally, (4) to relay NPG signals produced by the ground station to the aircraft. Each of these functions will be described in turn with reference to FIGS. 16A–16C.

Functions (2) and (3) above are carried out by the circuitry depicted in the block diagram of FIG. 16A. As before, all the components shown are conventional in design and can be fabricated from readily available parts; accordingly, a description of the specific circuit elements making up the blocks of FIG. 16A will not be necessary. Satellite S2 includes two narrow-beam receiving antennas 162 and 164, shown as parabolic dish-type antennas, which are physically mounted on satellite S2 so as to face the narrow-beam transmitting antennas 160 (FIG. 15) of the outer satellites S1 and S3, respectively. The function of the antennas 162 and 164 is to receive the beacon signals retransmitted from the outer satellites S1 and S3 at the ABT carrier frequency $f_2$ and to relay these signals at the same carrier frequency $f_2$ to the ground station. The radio link with the ground station is provided by a narrow-beam transmitting antenna 166, also shown as a parabolic dish, which is physically mounted on the satellite S2 so as to face a narrow-beam receiving antenna located at the ground station. Satellite S2 is also provided with a broad-beam receiving antenna 168, which may also be a parabolic dish, for receiving beacon signals directly from the aircraft ABTs. These signals are likewise retransmitted to the ground station by means of the narrow-beam transmitting antenna 166.

The signals received from satellite S1 by narrow-beam antenna 162 and the signals received directly from the aircraft ABTs are relayed to the ground station through antenna 166 essentially without modification, other than amplification. Thus the signals received by antenna 162 are passed sequentially through a low-noise amplifier 170, a mixer 172, and a wideband transmitter 174 for transmission to the ground station via antenna 166. Similarly, the signals received by antenna 168 are passed through a second low-noise amplifier 176, and then through the mixer 172 and wideband transmitter 174 for transmission to the ground station through antenna 166. Low-noise amplifiers 170 and 176 and wideband transmitter 174 may be similar to those of FIG. 15; the mixer 172 is conventional.

The signals received from satellite S3 by narrow-beam antenna 164, however, are "tagged" before being relayed to the ground station so that they will be distinguishable at the ground station from the ABT signals received and retransmitted by satellite S1. This is accomplished by applying the signals received by antenna 164 to the signal input 178 of a variable-gain RF amplifier 180, the output 182 of the amplifier 180 being connected to one of the inputs of the mixer 172. The output of antenna 164 is also applied to an amplifier 184 and a detector 186, yielding the beacon signal pulse envelope on the input line 188 of one-shot univibrator 190. The one-shot 190 responds to the leading edge of the beacon signal pulse envelope by producing a negative-going 70-nanosecond pulse on line 192. This pulse is delayed 64 nanoseconds by the delay line 194 and then applied to the control input 196 of the variable-gain RF amplifier 180. Typically, the gain of such an amplifier is a function of the potential applied to a control input. In the present case, the negative-going pulse applied to the control input 196 of the amplifier 180 will be assumed to cause a reduction in the gain of this amplifier. As a result, the gain of amplifier 180 will remain at a first value for the first 64 nanoseconds (set by the delay line 194) following the occurrence of the leading edge of the beacon signal pulse train, and then will be reduced to a lower value for the next 70 nanoseconds (set by the one-shot 190). Recalling now that the beacon signal pulse train contains 32 bits and has a duration of about 128 nanoseconds, it will be appreciated that the amplified beacon signal pulse train appearing on the output line 182 of the amplifier 180 will have a first amplitude for approximately half of its duration (i.e., for the first 16 bits), and a lower amplitude for the remaining half of its duration (i.e., for the last 16 bits). This amplitude shift is preserved as the pulse train passes through mixer 172, transmitter 174 and antenna 166, and it provides the "tag" by which the ground station is able to distinguish the beacon signals retransmitted by satellite S3 from other return signals.

As will be described in more detail hereinafter, the ground station circuitry makes this determination by comparing the amplitudes of the first and last bits of the received pulse train (as indicated in FIG. 5, these bits are always high logic level bits). If the amplitudes of these two bits differ by more than a prescribed tolerance, the ground station associates the return signal with satellite S3 (as opposed to satellite S1) and the aircraft position calculation is carried out accordingly. Since only the amplitudes of the first and last bits of the beacon signal pulse train are of interest, there is no need for precision in the time durations of one-shot 190 and delay line 194. In the example given, the 64-nanosecond delay time of delay line 194 was chosen merely to place the amplitude shift approximately at the center of the beacon signal pulse train. The 70-nanosecond output pulse duration of the one-shot 190 then assures that the amplitude shift remains effective for the entire remaining portion of the pulse train. It should also be apparent that the amplitude shift need not necessarily be a shift from a high amplitude to a lower amplitude as described above, but may equally well be a shift from a low amplitude to a higher amplitude. All that is necessary is that the difference in amplitude be significant enough to be unambiguously detected by the ground station. Normally, an increase or decrease in amplitude by a factor of two will be more than adequate for this purpose.

It is to be understood that the signal-tagging procedure described above is but one of many different ways in which the return signals received at the ground station may be paired with the appropriate satellites. For example, as an alternative to the amplitude shifting method described above, a tag bit may be added to the beacon signal pulse train to indicate to the ground station that the beacon signal was received from satellite S3. Regardless of which method is chosen, it will also be apparent that the signal tagging circuitry may be placed aboard the satellite S3, where the signal to be tagged is produced, rather than aboard the ground-link satellite S2. It is also possible to tag the signals from both of the outer satellites S1 and S3 (i.e., in a mutually exclusive manner), rather than the signals from only one of these satellites. Thus, for example, a low-to-high amplitude shift might be imposed on the beacon signals retransmitted by satellite S1, and a high-to-low amplitude shift on the signals from satellite S3; alternatively, a 01 tag bit sequence might designate satellite S1 and a 10 tag bit sequence might designate satellite S3. In practice, however, the fact that the signal from satellite S2 will always be the first to arrive at the ground station following the transmission of the interrogation signal means that it is only necessary to resolve the order of the signals from satellites S1 and S3. This requires only one bit of information, which is provided by tagging the signals from only one of the satellites S1 and S3.

It is even possible, by appropriate design of the ground station computer software, to dispense with signal tagging altogether. Thus, for example, if the starting location of an aircraft is known to be at a point between the longitudes of satellites S1 and S2, return signals will necessarily be received at the ground station in the order S2-S1-S3. This sequence can be assumed for all subsequent groups of return signals from that aircraft unless and until the aircraft crosses the longitude of satellite S2, at which point the order becomes S2-S3-S1. The crossing of this longitude would be indicated to the ground station computer by the convergence of the arrival times of the return signals from satellites S1 and S3; during the brief period of overlap between these return signals, the aircraft would be tracked by extrapolating from the position, speed and course data calculated for that aircraft from the most recent non-overlapping return signals.

Returning now to the drawing figures, FIGS. 16B and 16C illustrate the circuitry carried by satellite S2 for relaying the interrogation and (optionally) the NPG signals, respectively, from the ground station to the aircraft. Except for the carrier frequencies involved, this circuitry is in each case substantially the same as the beacon signal relay circuitry carried by the outer satellites S1 and S3. Thus in FIG. 16B, a downwardly-aimed narrow beam receiving antenna 198 receives interrogation signals at the carrier frequency $f_1$ from a similar antenna at the ground station. These signals are passed through a low-noise amplifier 200 and a wideband transmitter 202 and are then sent to all aircraft within range of the system at the same frequency $f_1$ by means of the broad-beam antenna 204. In FIG. 16C, a downwardly-directed narrow beam receiving antenna 206 receives NPG signals at the carrier frequency $f_3$ from a similar antenna at the ground station. These signals are likewise passed through a low-noise amplifier 208 and a wideband transmitter 210 and are relayed to all aircraft within range of the system by means of the broad-beam antenna 212 (unlike the interrogation signals, however, the NPG signals are coded with the addresses of the particular aircraft for which they are intended). As before, the antennas 198, 204, 206 and 212 are preferably parabolic dish-type antennas, although they may assume other configurations if desired.

In practice, assuming that the carrier frequencies $f_1$, $f_2$ and $f_3$ are not too far apart, a single down-link antenna may be substituted for the three separate down-link transmitting and receiving antennas 166, 198, and 206 of FIGS. 16A, 16B and 16C if suitable splitter circuitry is employed. In a like manner, the three separate broad-beam transmitting and receiving antennas 168, 204 and 212 may be replaced by a single broad-beam antenna for relaying signals at all of the involved frequencies to and from the aircraft. In this way, the number of antennas that must be carried by satellite S2 could be reduced from eight to four.

Ground Station

The ground station of the present invention includes a number of different subsystems for carrying out the following functions: (1) generation and transmission of interrogation signals, (2) arrival time measurement and decoding of return signals (i.e., retransmitted beacon signals), (3) computation of aircraft position, course, speed, and rate of climb/descent based on return signal arrival times, and (4) encoding and transmission of navigational signals (NPGs) for returning navigational information to particular aircraft. Each of these functions will be described in turn with reference to FIGS. 17–21.

Figure 17:
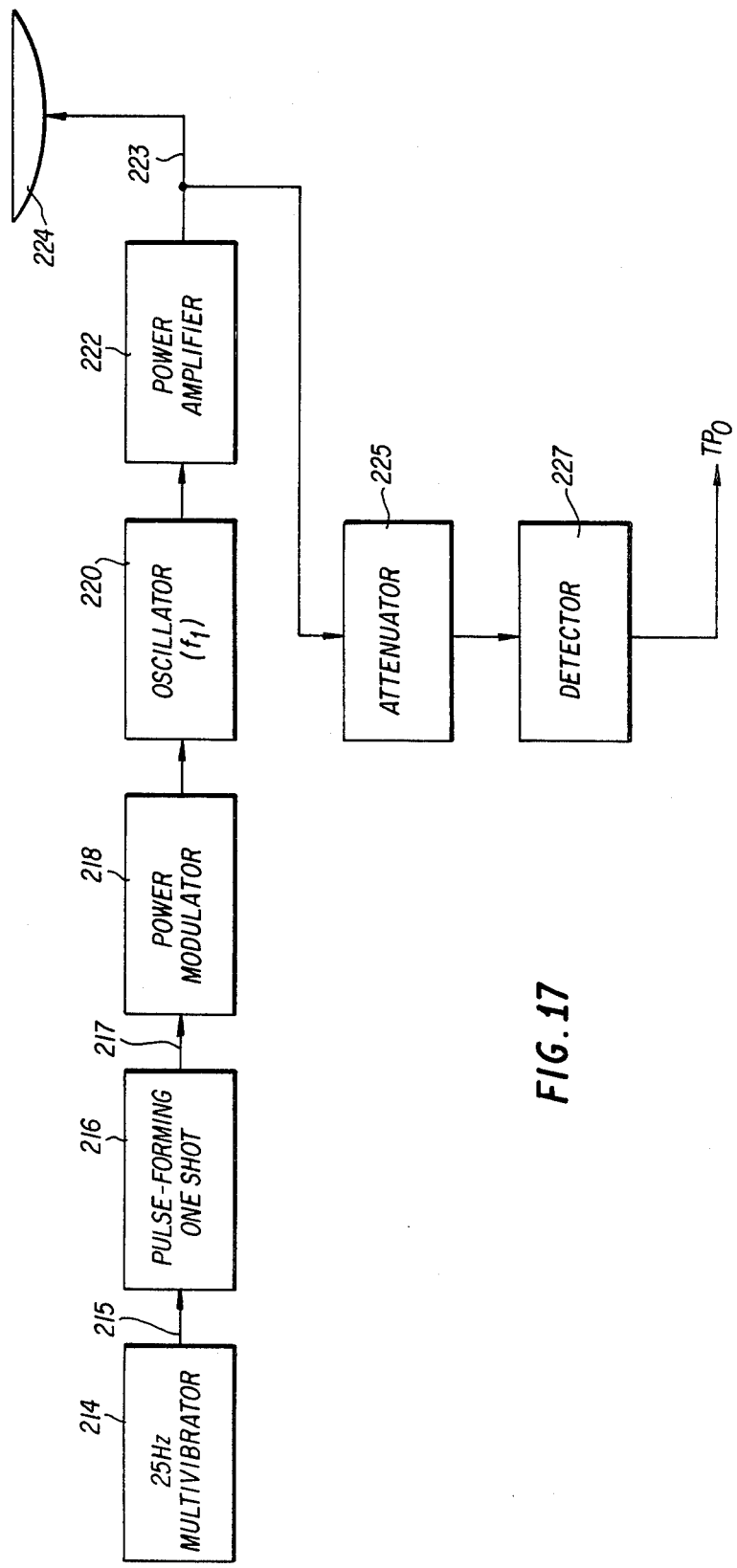
FIG. 17 depicts an exemplary circuit for generating interrogation signals at the ground station.

FIG. 17 illustrates an exemplary circuit for generating interrogation signals at the ground station. As before, all of the components of this circuit are conventional in design and no particular choice of components is critical. The interrogation rate is set by a nonprecision multivibrator 214 operating at a nominal frequency of 25 Hz. Alternatively, multivibrator 214 could be replaced by a higher-frequency multivibrator followed by a count-down scaler, whose output would be a succession of pulses at the 25 Hz rate. In either case, the 25 Hz. rate, which will normally be fixed, establishes the maximum frequency with which the position of a given aircraft can be updated (i.e., assuming the aircraft responded to every interrogation signal). The output of the multivibrator 214 on line 215 is applied to the input of a pulse-forming one-shot univibrator 216, which produces short (e.g., a few nanoseconds), fast-rising pulses on its output line 217. The periodic pulse output of the one-shot 216 on line 217 is applied to a power modulator 218, which translates the logic-level output of the one-shot to a higher power level suitable for the input of the oscillator 220.

The power modulator 218 and oscillator 220 may be similar to those described in connection with FIG. 12, except that the oscillator 220 operates at a frequency $f_1$ which is different from the ABT carrier frequency $f_2$. The output of the oscillator 220 is applied to the input of a power amplifier 222 for further amplification, and the amplified signal is then transmitted to the ground-link satellite S2 by means of a suitable narrow-beam antenna 224. From satellite S2, the interrogation signal is relayed to all aircraft within range of the system as described previously.

The output 223 of the power amplifier 222 is also applied to attenuator 225 and detector 227 to provide a logic-level input (labeled $TP_0$) to the time measurement and decoding circuitry of FIG. 18, which will be described shortly, for ascertaining the time of transmission of each interrogation signal. It is possible to dispense with the attenuator 225 and detector 227 by obtaining the output $TP_0$ at a prior stage of the circuit where a logic-level signal is already available, as for example at the output 217 of the one-shot 216. However, due to varying startup lag in the remaining components of the circuit (particularly in the oscillator 220), this could result in the signal $TP_0$ having a time-jitter relative to the high-power pulse on line 223, thereby introducing some inaccuracy into the subsequent position calculations. It is preferable, therefore, to obtain the signal $TP_0$ from the output 223 of the power amplifier 222 as shown in FIG. 17.

The precise form of the interrogation signal is unimportant, so long as it has a sufficiently fast-rising leading edge to elicit a prompt response from the aircraft ABT (FIG. 6). For the circuit of FIG. 17, the interrogation signal envelope will be a fast-rising pulse having a width of a few nanoseconds, and recurring at a frequency of 25 Hz. The choice of 25 Hz as the interrogation signal repetition rate derives from geographical considerations. In particular, this provides a sufficiently long interval (0.04 second) between successive interrogation signals to ensure that the earliest return signal (i.e., from an aircraft over the equator) produced in response to one interrogation signal and relayed through a particular satellite will not arrive back at the ground station before the latest return signal (i.e., from an aircraft over a pole) produced in response to the previous interrogation signal. In effect then, limiting the interrogation rate to 25 Hz places all return signals produced in response to a given interrogation signal in an identifiable time window 0.04 second in length. This prevents the ground station from erroneously measuring the arrival time of a given return signal against the transmission time of an interrogation signal previous to the one that actually gave rise to that return signal. It should be observed in this connection that the internal inhibit intervals of the individual aircraft ABTs do not give rise to any difficulty in associating return signals with the proper interrogation signal for position calculation purposes. If the ABT of a given aircraft is internally inhibited when the interrogation signal is received, the ground station will simply receive no return signals from that aircraft within the defined time window. If, on the other hand, the aircraft ABT is not internally inhibited when the interrogation signal is received, its return signals will all be received at the ground station within the defined time window and will be properly associated with the interrogation signal that produced them.

Figure 18:
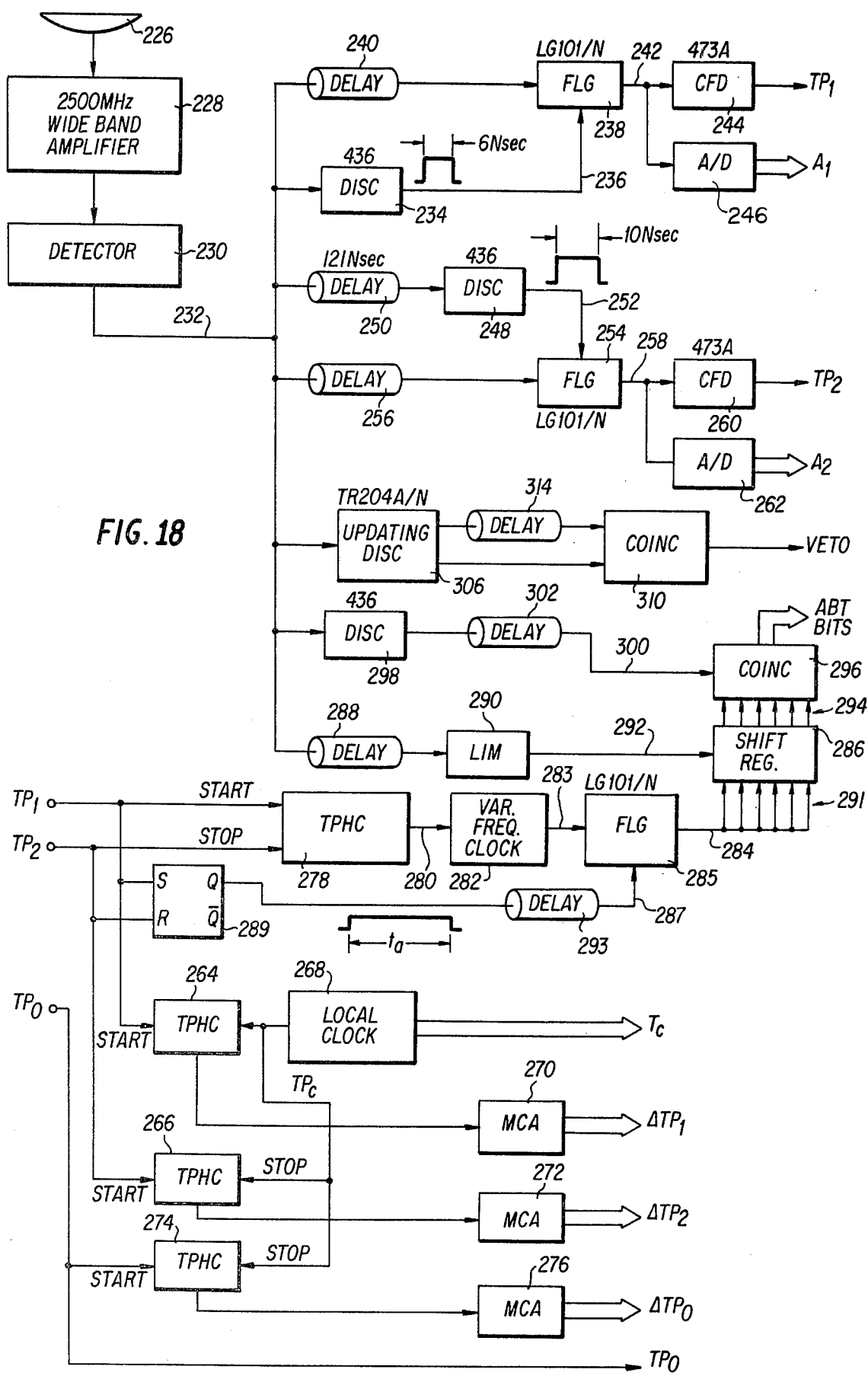
FIG. 18 depicts the ground station circuitry for decoding the return signals from the aircraft-carried transponders and for measuring the arrival times of these signals.

With reference to FIG. 18, the ground station circuitry for decoding the return signals from the aircraft ABTs and for measuring their arrival time will now be described. The ground station includes an upwardly-directed narrow beam receiving antenna 226 operable at the ABT carrier frequency $f_2$ (2500 Hz. in the present example) for receiving return signals relayed by the ground-link satellite S2. The antenna 226, which could be an upwardly-facing parabolic dish as shown, may be the same as the interrogation signal transmitting antenna 224 in FIG. 17 if suitable splitter circuitry is employed. In any case, the signals received by antenna 226 are passed through a 2500 MHz. wide-band amplifier 228 (which may be similar to the amplifier 156 of FIG. 15) and then through a diode detector 230 to recover the beacon signal pulse code envelope on line 232. The detector 230 may employ Schottky or other diodes for fast response. The signal on line 232 is used in three ways: (1) for accurate measurement of the arrival times of the leading bit 1 and trailing bit 32 of the beacon signal pulse group (FIG. 5), from which a best-value arrival time of the return signal as a whole can be obtained; (2) to recover the aircraft-identifying bits 3 through 24 of the beacon signal pulse group, as well as the optional message contained in bits 25 through 30; and (3) to veto (reject) overlapping return signals from the same or different aircraft. Optionally, the circuit of FIG. 18 can also be used to measure the arrival time of the retransmitted interrogation signal from satellite S2, if this mode of operation is chosen, although in the subsequent description it will be assumed that this is not the case.

The foregoing functions may be carried out by MECL III chips, the characteristics of which have been described previously, and/or by ORTEC modules. The device numbers given in FIG. 18 refer to ORTEC fast-logic modules in the NIM series.

To resolve the leading bit of the beacon signal pulse group, the signal on line 232 is applied to the input of a fast discriminator 234 (ORTEC type 436 modified for extended output pulse length). The leading edge of the beacon signal pulse group on line 232 causes fast discriminator 234 to produce a 6-nanosecond output pulse on line 236, which is applied to the control input (gate) of a fast linear gate 238 (ORTEC type LG 101/N). The signal on line 232 is also passed through a delay line 240 and is then applied to the signal input of the fast linear gate 238. Since the gate 238 is enabled for 6 nanoseconds following the occurrence of the leading edge of the beacon signal pulse group on line 232, the entire 4-nanosecond leading timing bit 1 of the beacon signal pulse group (FIG. 5) appears on the output line 242 of the gate 238. Delay line 240 introduces a short delay interval sufficient to insure that the gate 238 is enabled before the leading bit 1 reaches its input.

The output line 242 of the gate 238 is applied to the input of a constant fraction discriminator 244, which produces an output timing pulse $TP_1$ at a standard NIM logic level which is substantially independent of the strength of the return signal received by the antenna 226. The constant fraction discriminator 244 is preferably an ORTEC type 473A, which is listed as having a timing resolution of 0.3 nanoseconds full-width at half-maximum for pulses ranging over a factor of 100 in amplitude. The occurrence of the timing pulse $TP_1$ represents the arrival time of the leading bit 1 of the beacon signal pulse group of FIG. 5.

The output line 242 of the gate 238 is also applied to the input of an analog-to-digital converter 246, which digitizes the amplitude of the leading bit 1 for purposes of comparison with the amplitude of the trailing bit 32 (as will be described hereinafter, this enables the ground station to associate the return signal with the appropriate one of the satellites). The digitized amplitude of bit 1 is a multi-bit binary value indicated as $A_1$ in FIG. 18.

In a parallel path, the line 232 is applied to the input of a second fast discriminator 248 (also ORTEC type 436 modified for extended output pulse length) through a 121-nanosecond delay line 250. Fast discriminator 248 produces a 10-nanosecond output pulse on line 252 which begins, as a result of delay line 250, some 121 nanoseconds after the occurrence of the leading edge of bit 1 of the beacon signal pulse group on line 232. The 10-nanosecond output pulse on line 252 is applied to the control input (gate) of a fast linear gate 254 (ORTEC type LG 101/N). The beacon signal pulse group on line 232 is applied to the signal input of the gate 254 through a delay line 256. Since gate 254 is enabled for 10 nanoseconds beginning 121 nanoseconds after the leading edge of bit 1 of the beacon signal pulse group, the trailing bit 32 of the beacon signal pulse group (nominally beginning after 124 nanoseconds and ending after 128 nanoseconds) will appear on the output line 258 of the gate 254. The 10-nanosecond output pulse duration of the fast discriminator 248 provides ±3 nanosecond error margin for the trailing bit 32 of the pulse group, thereby allowing for some inaccuracy in the ABT clocks. Delay line 256 introduces a short delay interval (equal to that of delay line 240) to insure that the gate 254 is enabled before the trailing bit 32 reaches its input.

The output line 258 of the gate 254 is applied to the input of a constant fraction discriminator 260 (ORTEC type 473 A), which produces an output timing pulse $TP_2$ at a standard NIM logic level which is substantially independent of the strength of the return signal received by the antenna 226. The occurrence of the timing pulse $TP_2$ represents the arrival time of the trailing bit 32 of the beacon signal pulse group of FIG. 5. The output line 258 of the gate 254 is also applied to the input of an analog-to-digital converter 262, which digitizes the amplitude of the trailing bit 32 for purposes of comparison with the amplitude of the leading bit 1, as will be described hereinafter. The digitized amplitude of the trailing bit 32 is a multi-bit binary value indicated as $A_2$ in FIG. 18.

Referring now to the lower part of FIG. 18, the timing pulses $TP_1$ and $TP_2$ provide the START inputs for two time-to-pulse-height converters (TPHC) 264 and 266, respectively, of the type ORTEC 467 (see 1976 ORTEC catalog, page 8). The STOP signals for the TPHCs are provided by timing pulses $TP_C$ generated (e.g., once every 128 nanoseconds) by a moderately good local clock 268 having an accuracy and stability of roughly 1 nanosecond over an interval of 0.1 second. The local clock 268 also provides a multi-bit digital output $T_C$ which is indicative of the absolute times of occurrence of the pulses $TP_C$, this being used as the absolute time base for the calculations carried out by the ground station computer. The analog voltage outputs of the TPHCs 264 and 266 are applied, respectively, to the inputs of multi-channel analyzers (MCAs) 270 and 272 of the type ORTEC 800, which digitize the time intervals between the timing pulses $TP_1$ and $TP_2$ and the next clock pulse $TP_C$ to form the multi-bit outputs $\Delta TP_1$ and $\Delta TP_2$. In a similar manner, the timing pulse $TP_0$ (produced by the interrogation-signal generating circuitry of FIG. 17) is applied to the START input of a third TPHC 274, which may also be of the type ORTEC 467. The STOP signals for the TPHC 274 are also provided by the timing pulses $TP_C$ produced by the local clock 268. The output of the TPHC 274 is applied to the input of a third MCA 276, also of the type ORTEC 800, which digitizes the time interval between the timing pulse $TP_0$ and the next clock pulse $TP_C$ to form the multi-bit output $\Delta TP_0$. As will shortly be described, the difference values $\Delta TP_0$, $\Delta TP_1$ and $\Delta TP_2$ may be arithmetically combined with the digital clock pulse time $T_C$ to yield the absolute times of occurrence of the respective timing pulses $TP_0$, $TP_1$ and $TP_2$.

In a parallel path, the timing pulses $TP_1$ and $TP_2$ furnish the START and STOP signals, respectively, for a fourth TPHC 278, which produces an analog voltage output on line 280 which is proportional to the time interval occurring between $TP_1$ and $TP_2$. Since the times of occurrence of $TP_1$ and $TP_2$ correspond, respectively, to the arrival times of bits 1 and 32 of the beacon signal pulse group at the ground station, it will be appreciated that the analog voltage output of the TPHC 278 will be related to the clock frequency of the aircraft ABT whose signal is currently being received. The analog voltage on line 280 is applied to the control input of a variable-frequency clock 282 having a nominal frequency of 250 MHz, which is the nominal pulse rate of the aircraft ABT of FIG. 6. The variable-frequency clock 282 is conventional in design and may, for example, be based on the MECL III type MC 1658 voltage-controlled multivibrator, operating at a nominal 40 MHz in the linear range of the MC 1658. The variable 40 MHz (±) frequency is heterodyned with a 210 MHz fixed-frequency local oscillator to produce a variable 250 MHz (±) frequency on line 283 which closely matches the clock rate of the aircraft ABT that produced the beacon signal pulse group currently being received.

The corrected clock frequency on line 283 is applied to the signal input of a fast linear gate 285 (ORTEC type LG 101/N). The control input (gate) 287 of the fast linear gate 285 is controlled (through delay line 293) by the Q output of a flip-flop 289 which is set and reset, respectively, by the timing pulses $TP_1$ and $TP_2$. Since $TP_1$ and $TP_2$ represent the arrival times of the leading and trailing pulses, respectively, of the 32-bit beacon signal pulse group, there appears on the Q output of the flip-flop 289 a square pulse of variable length $t_a$ equal to the duration of the 32-bit beacon signal pulse group produced by the particular aircraft ABT whose signal is currently being received. Consequently, the fast linear gate 285 is gated by the square pulse $t_a$ for a length of time sufficient to allow just 32 pulses at the corrected clock frequency to pass from the output 283 of the variable frequency clock 282 to the output 284 of the fast linear gate 285. Delay line 293 is interposed between the Q output of the flip-flop 289 and the control input 287 of the fast linear gate 285 since the clock 282 does not begin to run at the correct rate until both $TP_1$ and $TP_2$ have occurred. Accordingly, the delay interval introduced by the delay line 293 will be an empirically-determined value somewhat in excess of the duration of the beacon signal pulse group.

The 32 clock pulses appearing at the output 284 of the fast linear gate 285 are applied to the clock inputs 291 (only a few of which are shown in the interest of simplicity) of a 32-bit shift register 286 which is provided for receiving the 32 bits of the ABT pulse group. The ABT pulse group on line 232 is delayed by delay line 288, limited by Schottky or other diodes in limiter 290 to yield standard-height pulses on line 292, and applied to the input of the leftmost stage of the shift register 286. Delay line 288 is required since the beacon signal pulse group cannot be clocked into the shift register 286 until the corrected clock rate is determined, which cannot be done until both $TP_1$ and $TP_2$ have occurred. Accordingly, the delay interval introduced by the delay line 288 will be an empirically-determined value somewhat in excess of the duration of the beacon signal pulse group.

Once the beacon signal pulse group emerges from the delay line 288 and limiter 290, it is clocked at the corrected clock rate into the 32-bit shift register 286. The 32 individual bit outputs 294 (only a few of which are shown in FIG. 18) of the shift register 286 are sampled by 32 parallel coincidence circuits 296 shortly after the 32-bit ABT pulse group has completely filled the shift register. This moment is determined by the arrival of a 3-nanosecond strobe pulse from the fast discriminator 298 (ORTEC type 436) at the coincidence input 300 of the coincidence circuit. The 3-nanosecond strobe pulse is produced by the fast discriminator 298 in response to the leading edge of the beacon signal pulse envelope on line 232, and is delayed by delay line 302 by an empirically determined time interval that is sufficient to allow the entire 32-bit ABT pulse group to be clocked into the shift register 286. When the 3-nanosecond strobe pulse does reach the coincidence input 300, the 32 bits of the ABT pulse group now stored in the shift register 286 will appear in parallel at the coincidence circuit outputs 304 for use by the ground station computer as will be described hereinafter.

Suitably buffered, the coincidence units 296 may be ORTEC type C314/NL or C315/NL. The C315/NL is quoted as having a resolution of better than 0.05 nanoseconds for standard-height input pulses (1976 ORTEC catalog, p. 166).

It remains to describe the manner in which the time measurement and decoding circuitry of FIG. 18 detects overlapping return signals from the same or different aircraft. The operation of this circuit is such that two overlapped return signals will in fact fill the shift register 286 with what appears to be a legitimate series of digital bits, although these bits will in reality represent the intermixed bits from two distinct pulse groups and will therefore be meaningless. Rather than suppress the loading of such overlapped pulse groups into the shift register 286, it is a simpler matter in such instances to allow the circuit to operate in the normal fashion, but to produce a signal to indicate to the ground station computer that the information currently presented at the circuit outputs has resulted from overlapped return signals and is therefore not usable for aircraft position calculations. To this end, a fast, non-saturating discriminator 306 generates a signal of approximately 128-nanosecond width for each transition from logic-zero to logic-one applied to it from line 232. A typical choice for this discriminator is the ORTEC Model TR 204 A/N Dual Updating Discriminator. One of its outputs is delayed by delay line 314, of nominal length approximately 256 nsec., and the two outputs are then compared by coincidence circuit 310. When an isolated ABT signal is received, the updating discriminator 306 generates a signal of approximately 252-nanosecond length (i.e., 128 nanoseconds beyond the leading edge of bit 32 of the beacon signal pulse group, which occurs 124 nanoseconds after the leading edge of bit 1). Compared with a version of itself delayed by 256 nanoseconds, this signal does not cause a coincidence in coincidence circuit 310. However, if the signal received is significantly longer than 128 nonoseconds (which will be the case if it consists in fact of two ABT signals which overlap), the output of updating discriminator 306 will be longer than 256 nanoseconds, which will produce a VETO signal at the output of the coincidence circuit 310. This causes the ground station computer to reject the other output information provided by the circuit of FIG. 18 for aircraft position computation purposes. As will be apparent from the foregoing description, beacon signal pulse group durations of up to 131 nanoseconds (3 nanoseconds in excess of the nominal 128-nanosecond beacon signal duration) are tolerated without giving rise to a VETO signal; this allows for some variation in the clocking rates of the individual aircraft ABTs. Further tolerance can be provided, if desired, by increasing the delay interval of delay line 314 and the output pulse length of the discriminator 306.

FIG. 19 illustrates an exemplary configuration for the ground station computer that is used to process the output information provided by the time measurement and decoding circuitry of FIG. 18 in order to generate position, course, speed and rate-of-climb information for the various aircraft being tracked by the system. At the outset, it is to be emphasized that no particular computer architecture is critical to the implementation of the present invention. Given the relatively few essential input parameters that must be processed and the straightforward manner in which the necessary calculations are carried out, it will be apparent that any number of available general-purpose data processing systems may be used. The selection of suitable hardware components, including input devices, interfacing, central processor, random access memory, output devices, and so on, will be a matter of routine design choice.

Referring particularly to FIG. 19, the primary components of the ground station computer will be seen to include an input data buffer 318, a central processing unit (CPU) 320, a memory unit 322, and an output data buffer 324. These components are conventional and the manner in which they interact is well known to those knowledgeable in the data processing art. In general, data accumulated on the input buffer 318 is periodically gated into the memory unit 322 by the central processing unit 320 and then processed by the CPU in accordance with software instructions stored in memory. The memory unit 322 will typically comprise a number of different types of memory devices, such as random access memory (RAM), magnetic disk or drum units, magnetic tape units, and so on. As a rule, memory devices that have a large data storage capacity also tend to be characterized by relatively long access times, so it is generally the practice to use a number of different types of units, reserving the fastest units for the data or instructions that are required most frequently. The CPU 320 contains the arithmetical logic circuitry that is required for carrying out the stored software instructions, and will also contain a number of internal storage locations (registers) for storing operands, intermediate results and the like. The CPU may either be "hard-wired" to carry out the proper sequence of operations in response to a given software instruction, or may alternatively contain its own internal programming (microprogramming) in a read-only memory (ROM) for carrying out each software instruction as a series of elementary program steps. The latter type of system is usually preferred since it is somewhat more versatile, although hard-wired systems possesses advantages in terms of speed that sometimes render them preferable when versatility is not as important.

For the purposes of the present invention, the input data buffer 318 receives the following input information, all of which is provided by the time measurement and decoding circuitry of FIG. 18: (1) the amplitude $A_1$ of the leading bit 1 of the beacon signal pulse group; (2) the amplitude $A_2$ of the trailing bit 32 of the beacon signal pulse group; (3) the overlap-indicating VETO signal; (4) the 32 bits of the beacon signal pulse group produced by the aircraft ABT; (5) the digitized time of occurrence $T_C$ of the next clock pulse $TP_C$; (6) the difference value $\Delta TP_1$ representing the time elapsed between the occurrence of the timing pulse $TP_1$ (i.e., the arrival of the leading bit 1 of the beacon signal pulse group) and the next clock pulse $TP_C$ occurring at time $T_C$; (7) the difference value $\Delta TP_2$ representing the time elapsed between the occurrence of the timing pulse $TP_2$ (i.e., the arrival of the trailing bit 32 of the beacon signal pulse group) and the next clock pulse $TP_C$ occurring at time $T_C$; (8) the difference value $\Delta TP_0$ representing the time elapsed between the occurrence of the timing pulse $TP_0$ (i.e., the production of an interrogation signal by the circuit of FIG. 17) and the next clock pulse $TP_C$ occurring at time $T_C$; and (9) the interrogation signal timing pulse $TP_0$. All of these inputs are multiple-bit digital values with the exceptions of the VETO signal input, which is a single-bit input that is either at a high logic level (to indicate return signal overlap) or a low logic level (to indicate an absence of overlap), and the interrogation signal timing pulse $TP_0$, which is a single-bit input that is at a high logic level during transmission of the interrogation signal and at a low logic level at all other times.

The foregoing quantities are stored in the memory unit 322 at reserved locations corresponding to the particular aircraft identified by the identification bits in the beacon signal pulse group, until three successive return signals (from the three satellites S1, S2 and S3) identifying the same aircraft have been received at the ground station and their information stored. After the third return signal has been received, the ground station computer calculates the position of the identified aircraft in terms of latitude, longitude and altitude using the stored information derived from the three associated return signals together with certain stored constants or externally provided parameters, such as the positions of the various satellites and of the ground station, the response time of the aircraft ABT, and the orbital turnaround time of the satellite repeaters. When this has been accomplished, the ground station computer uses the result of the current position calculation to calculate the course, speed, and rate of climb (or descent) of the aircraft using the stored results of one or more of the most recent previous position calculations for that aircraft and the time elapsed since they were made. In addition, the computer decodes any message which may have been inserted into the beacon signal pulse group by the aircraft crew at bits 25-29 (to indicate one of up to 31 standard messages) or bit 30 (to indicate that voice communication is desired). The calculated position, course, speed and rate of climb information, together with any decoded messages from the aircraft, are transferred to the output data buffer 324, which provides interfacing for the output terminals located at the air traffic control center (and, optionally, for the encoding equipment used to generate the navigational pulse group, or NPG, for return of the navigational information to the identified aircraft). The ATC terminals may include printers, cathode-ray tube (CRT) display terminals, or other numerical or graphic displays adapted to indicate the relative positions of the various aircraft that are being tracked by the system. Although these terminals have been described as output devices, in practice they may be provided with some input capability as well. Thus, for example, the ATC terminals may be provided with keyboard inputs to handle display-controlling instructions from ATC personnel (e.g., to restrict the display to aircraft climbing or descending, or aircraft below a predetermined altitude, or to broaden or narrow the geographic area covered by the display).

FIGS. 20A-20D comprise a flowchart which illustrates generally the sequence of operations that is carried out by the ground station computer of FIG. 19 using the information provided by the timing and decoding circuit of FIG. 18. Transformation of the functional program description provided by the flowchart of FIGS. 20A-20D into specific programming steps will be a routine matter to those of ordinary skill in the computer programming art, and may be accomplished using machine language or any one of a number of available higher-level programming languages.

Figure 20A:
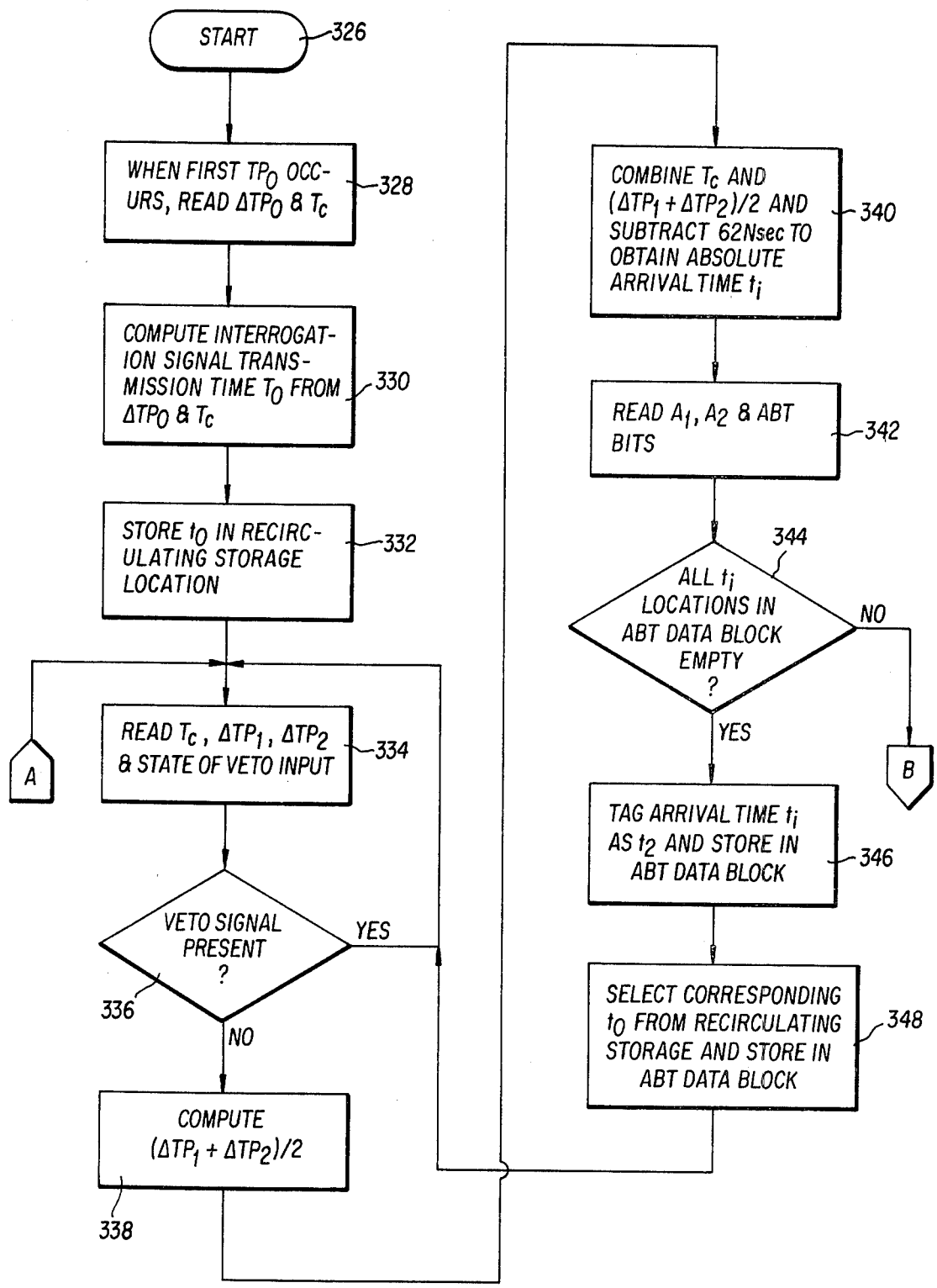

Referring first to FIG. 20A, the program commences at START block 326 and awaits the occurrence of the first signal $TP_0$, which occurs concurrently with the transmission of the first interrogation signal by the ground station. When the $TP_0$ signal appears, the program immediately proceeds to block 328, where the computer reads the difference value $\Delta TP_0$ and the current clock pulse time $T_C$ derived from the local clock 268 in FIG. 18. The program next proceeds to block 330, where the interrogation signal transmission time $t_0$ is computed by arithmetically combining the difference value $\Delta TP_0$ with the digital clock pulse time $T_C$. In block 332, the computed value of the interrogation signal transmission time $t_0$ is stored in one of a number of recirculating memory locations so that it will be available for use in subsequent aircraft position calculations. For reasons which will become apparent as the description proceeds, the sequence of program steps represented in blocks 326-332 of FIG. 20A is required only at the initial startup of the interrogation signals.

The function of the recirculating storage referred to in block 332 of FIG. 20A will be readily appreciated when one considers the relative time sequence of the various interrogation and return signals during the actual operation of the system. Recalling that the orbital height of the geosynchronous satellites S1, S2 and S3 is roughly 22,000 miles, it can be demonstrated that no return signals from aircraft at reasonable altitudes (i.e., several orders of magnitude less than 22,000 miles) can be expected to arrive at the ground station until approximately 0.47 second after the interrogation signal is transmitted from the ground station. This value, which corresponds to the S2 return signal from an aircraft A located on the same longitude as the ground-link satellite S2, is obtained by multiplying the signal transit time between ground station GS and the satellite S2 by four (i.e., to account for the propagation of the interrogation signal over the path GS-S2-A and the propagation of the responsive return signal over the path A-S2-GS). Due to the intersatellite distances separating S1 and S3 from the ground-link satellite S2, the return signals from S1 and S3 will arrive at the ground station with an additional delay of 0.11 second (assuming a 45° separation between satellites), for a total delay of 0.58 second in the earliest-arriving signals from these satellites. Due to the geometry of the satellite pattern, moreover, it can be demonstrated that the S2 return signals from all aircraft responding to a given interrogation signal, regardless of the aircraft locations, will arrive during a known 0.04 second interval following the expiration of the 0.47-second interval. Similarly, the S1 and S3 return signals from all aircraft responding to that interrogation signal will arrive within a 0.04-second interval following the expiration of the 0.58-second interval. Therefore, a total delay interval of 0.62 second (measured from the interrogation signal transmission time) may elapse before all three return signals from all responding aircraft are received at the ground station in response to any given interrogation signal. During the pendency of the 0.62-second interval, however, groups of return signals responsive to prior interrogation signals will also be arriving at the ground station, these groups having been generated every 0.04 second as a result of the assumed 25 Hz. repetition rate of the interrogation signals produced by the ground station. Consequently, the system cannot simply associate each group of return signals with the most recently transmitted interrogation signal, but must instead store the transmission times of a number of the most recent interrogation signals (16 in the present example) and correlate each newly arriving group of return signals with the appropriate one of the stored values. A conventional recirculating storage arrangement is a convenient means for accomplishing this result.

Having now resolved the transmission time of the first interrogation signal, the computer enters a program loop (beginning at block 334) where the return signals produced by the individual aircraft transponders in response to the interrogation signal are processed. At any time during the execution of this program loop, however, the program may be interrupted by the appearance of a new $TP_0$ signal, indicating that a new interrogation signal has been transmitted by the ground station. This causes the computer to divert unconditionally to an interrupt routine (FIG. 20D), where the recirculating storage is updated to reflect the occurrence of the new interrogation signal. The interruption routine commences with block 366, where the difference value $\Delta TP_0$ and the current clock pulse time $T_C$ are read. In block 368, the transmission time $t_0$ of the new interrogation signal is computed by arithmetically combining the difference value $\Delta TP_0$ with the current clock pulse time $T_C$. Block 370 of the interrogation routine causes the newly obtained $t_0$ value to be stored in the recirculating storage, displacing any previously-stored value of $t_0$ earlier than 0.64 second before it (i.e., any $t_0$ value that is more than sixteen 0.04-second cycles old). At this point the interruption routine is completed, and the computer resumes execution of the main program at the point where the interruption originally occurred. The foregoing sequence of operations will be repeated, however, each time that a new $TP_0$ signal occurs. During normal steady-state operation, therefore, the recirculating storage locations will contain the transmission times of the 16 most recently generated interrogation signals.

Referring now to the commencement of the main program loop in FIG. 20A, block 334 causes the ground station computer to read the difference values $\Delta TP_1$ and $\Delta TP_2$ which have been generated by the timing and decoding circuit of FIG. 18 in response to the return signal currently being received at the ground station. The computer also reads the current clock pulse time $T_C$ and the state of the single-bit VETO input produced at the output of the coincidence-detecting circuit 310 in FIG. 18. Following this, a determination is made at decision block 336 of whether a high logic level was produced at the VETO input, which would indicate overlap between two different return signals. As noted previously, such overlap renders useless the remaining information presented at the outputs of the timing and decoding circuitry of FIG. 18. Accordingly, if a VETO signal is found to be present, the program loops back to the READ block 334 in order to begin processing the timing information generated in response to the next return signal received at the ground station, which may originate from the same or a different aircraft.

Assuming now that a VETO signal had not been detected at the decision block 336, the computer proceeds to block 338 where the difference values $\Delta TP_1$ and $\Delta TP_2$ (corresponding to the arrival times of the leading and trailing bits, respectively, of the beacon signal pulse group) are averaged to obtain a mean arrival time difference value for the beacon signal pulse group as a whole. The computer next proceeds to block 340, where the absolute arrival time $t_i$ (i=1, 2 or 3, as subsequently determined) of the leading edge of the beacon signal pulse group is computed by arithmetically combining the mean difference value $(\Delta TP_1 + \Delta TP_2)/2$ with the absolute clock pulse time $T_C$ that was read in block 334, and then substracting 62 nanoseconds (i.e., half the nominal 124-nanosecond duration of the beacon signal pulse group between the positive edges of the first and last bits). Alternatively, the leading-edge arrival time $t_i$ can be computed using $\Delta TP_1$ alone, rather than the average value $(\Delta TP_1 + \Delta TP_2)/2$. The latter technique, however, is somewhat more susceptible to error due to noise and other instabilities in the received beacon signal waveform since it is based on only one time measurement ($\Delta TP_1$) rather than two different time measurements (i.e., $\Delta TP_1$ and $\Delta TP_2$). It is preferable, therefore, to base the arrival time calculation on the mean value $(\Delta TP_1 + \Delta TP_2)/2$, at least where the clocks in the aircraft ABTs are sufficiently precise to allow the leading-edge arrival time of the beacon signal pulse group to be accurately extrapolated from this value by the substraction of a fixed 62-nanosecond offset as described above.

When this operation has been completed, the computer proceeds to block 342, where the digitized amplitudes $A_1$ and $A_2$ of the leading and trailing bits of the beacon signal pulse group are read. At the same time, the 22 aircraft-identifying bits of the beacon signal pulse group (bits 3 through 24 in FIG. 5, hereinafter referred to as the ABT bits for convenience) are read. Besides identifying the particular aircraft that produced the beacon signal pulse group currently being processed, the ABT bits designate a reserved data block within the computer memory unit 322 of FIG. 19 which is used to store position, course, and signal transmission and arrival time data for that particular aircraft. One such data block, containing a number of discrete memory locations, is reserved for each aircraft using the system. Among the various memory locations contained in each data block are three locations for storing the arrival times $t_1$, $t_2$ and $t_3$ of the three return signals from satellites S1, S2 and S3 that result from each beacon signal transmitted by a given aircraft, and one location for storing the transmission time $t_0$ of the interrogation signal which gave rise to those return signals. As will shortly become apparent, these reserved locations permit return signal arrival time data to be organized and stored by the ground station computer for each of the different aircraft using the system regardless of the intermixed manner in which these signals arrive at the ground station. Each time that a complete set of three return signal arrival times has been calculated and stored for a given aircraft, the ground station computer has all the information necessary to calculate the instantaneous position of that aircraft for air traffic control purposes. As will be explained hereinafter, additional memory locations are reserved in each data block for storing the information needed to carry out speed, rate-of-climb and course calculations.

Returning to the program description in FIG. 20A, and assuming that the responding aircraft has now been identified in block 342 by virtue of the ABT bits contained in its beacon signal pulse group, the ground station computer addresses the reserved memory data block identified by the received ABT bits. In decision block 344, a test is made to determine whether the three memory locations for the return signal arrival times $t_1$, $t_2$ and $t_3$ in the addressed data block are all empty. If they are, one of the following two possible situations exists: (1) the arrival time $t_i$ that has just been computed in block 340 in fact corresponds to the first in the set of three return signals originating from a responding aircraft, or (2) the arrival time $t_i$ that has just been computed in block 340 actually corresponds to the second or third in the set of three return signals originating from a responding aircraft, but one or more previous return signals from that aircraft had overlapped with other return signals at the ground station, thereby giving rise to a VETO signal and preventing the computation of its arrival time $t_1$ at block 340. At this point, however, the ground station computer does not attempt to distinguish between these two situations and merely assumes, correctly or incorrectly, that the computed arrival time $t_i$ does in fact correspond to the first in the set of three return signals from the identified aircraft. It will be recalled that, as a result of the large distances separating the outer satellites S1 and S3 from the ground-link satellite S2, the first return signal received at the ground station from a given aircraft will always be the S2 return signal, that is, the return signal which has been relayed from the aircraft to the ground station directly via satellite S2. Accordingly, the computer proceeds in block 346 to tag the arrival time $t_i$ as $t_2$ (the subscript 2 being used to designate satellite S2) by storing this arrival time in the particular memory location reserved for $t_2$ in the overall data block that has been identified by the received ABT bits. When that has been done, the computer proceeds to block 348, where the corresponding interrogation signal transmission time $t_0$ is obtained from the various $t_0$ values presently stored in the recirculating storage. This is done by selecting the particular stored $t_0$ value which falls within a 0.04-second window beginning 0.47 second earlier than the arrival time $t_i$ that was just tagged as $t_2$ in block 346. Once the proper value of $t_0$ has been obtained, it is stored in the particular memory location reserved for $t_0$ in the overall data block that has been identified by the received ABT bits. The computer now returns to the READ block 334 in order to begin processing the timing information generated in response to the next return signal received at the ground station, which may originate from the same aircraft or from a different aircraft.

Figure 20B:
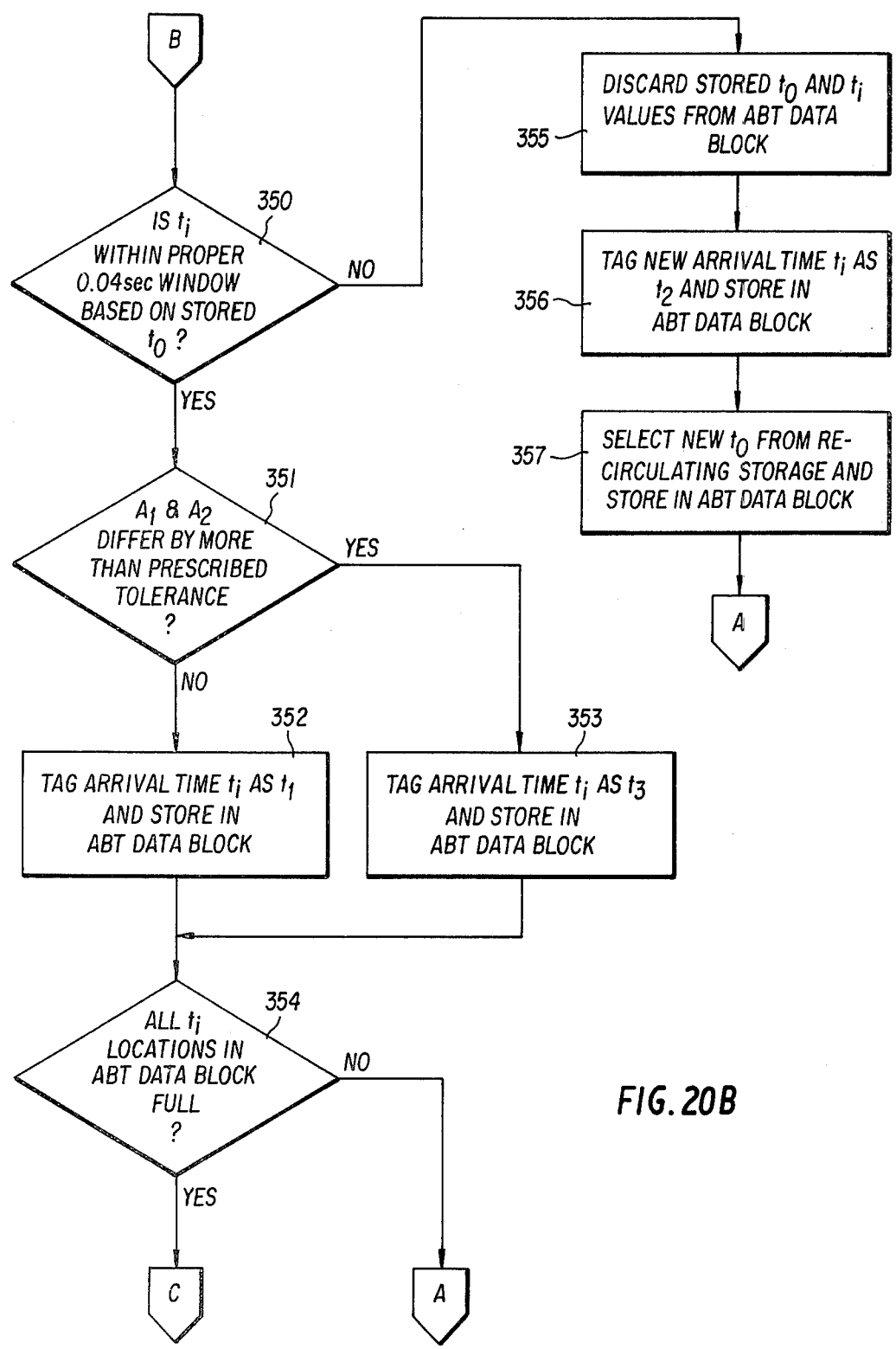
Figure 20C:
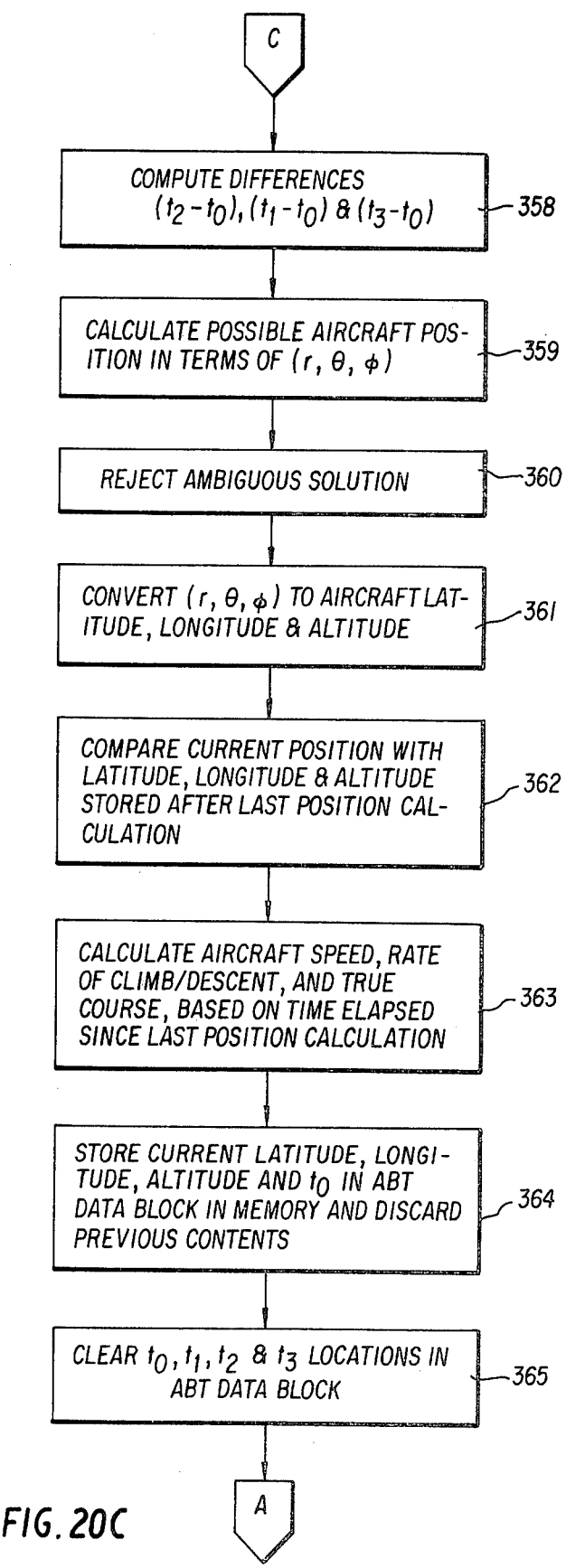
Figure 20D:
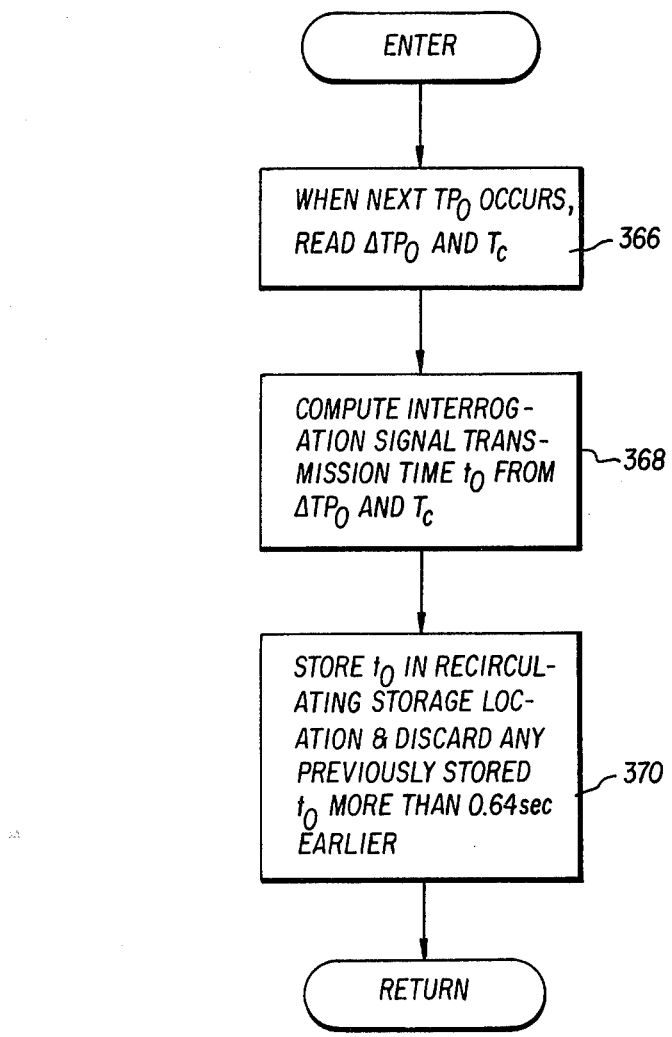

Assuming now that the determination made in decision block 344 had produced a negative result, meaning that one or more of the arrival time locations in the reserved data block had been filled during previous passes through the program loop, the computer proceeds to a decision block 350 (FIG. 20B). Here, a test is made to determine whether the arrival time $t_i$ that has just been calculated in block 340 is within a 0.04-second time window commencing 0.58 second after the interrogation signal transmission time $t_0$ that was previously stored in the reserved data block. This is equivalent to determining whether the currently received return signal is an S1 or S3 return signal that is a product of the same interrogation signal which produced the return signal (or signals) already stored in the reserved data block. If this test produces a negative result, as might happen as a result of the loss of one or more intervening return signals from the same aircraft due to an overlap, the computer proceeds on the assumption that the newly calculated arrival time $t_i$ indicates an S2 return signal corresponding to the first in a new set of three return signals. Thus in block 355 of the program, all previously stored $t_0$ and $t_i$ values are discarded from the reserved data block, and in block 356 the new arrival time $t_i$ is tagged as $t_2$ by storing it in the location reserved for $t_2$ in the data block. In block 357 of the program, a new value of $t_0$ is selected from the recirculating storage based on the newly obtained arrival time $t_i$, using the same method that was employed in block 348. After storing the new $t_0$ value at the location reserved for $t_0$ in the data block identified by the received ABT bits, the computer returns to the READ block 334 in order to begin processing the timing information generated in response to the next return signal received at the ground station, which may originate from the same aircraft or from a different aircraft.

Referring again briefly to block 356, it is entirely possible that the tagging of the new arrival time $t_i$ as $t_2$ (i.e., as the first return signal in a new set) was itself erroneous as a result, for example, of a further overlap of return signals at the ground station. Such a situation would, however, be detected and automatically accounted for in exactly the same manner as previously described during subsequent passes through the program.

Assuming now that the determination mode in block 350 had produced a positive result, it follows that the arrival time $t_i$ that has just been calculated in block 340 is either $t_1$ (i.e., the arrival time of the return signal from satellite S1) or $t_3$ (i.e., the arrival time of the return signal from satellite S3). The determination as between $t_1$ and $t_3$ is made in decision block 351 of the program (FIG. 20B) by comparing the digitized amplitudes $A_1$ and $A_2$ of the leading and trailing bits, respectively, of the beacon signal pulse group. As described earlier in connection with the satellite electronics, a difference in the pulse amplitudes of these two bits by more than a prescribed tolerance functions as a "tag" to indicate that the return signal is one which was relayed to the ground station by satellite S3 (as opposed to satellite S1). Accordingly, if such an amplitude difference is detected, the computer proceeds in block 353 to tag arrival time $t_i$ as $t_3$ by storing this arrival time in the particular memory location reserved for $t_3$ in the overall data block that has been identified by the received ABT bits. If no significant amplitude difference is detected, however, the computer instead proceeds in block 352 to tag the arrival time $t_i$ as $t_1$ by storing this arrival time in the memory location reserved for $t_1$ in the identified data block. In either case, the computer then proceeds to the decision block 354, where a test is made to determine whether all the memory locations reserved for the arrival times $t_1$, $t_2$ and $t_3$ in the identified data block have been filled. If one or more of these locations is empty, this test produces a negative result and the computer reverts back to the READ block 334 (FIG. 20A) in order to process the timing information derived from the next return signal, which may or may not originate from the same aircraft.

If, on the other hand, the test carried out in decision block 354 produces a positive result, indicating that all the memory locations for the arrival times $t_1$, $t_2$ and $t_3$ are full, a valid set of return signal arrival times is now available for aircraft position computation purposes. The computer therefore proceeds to block 358 (FIG. 20C) where the differences $(t_2-t_0)$, $(t_1-t_0)$ and $(t_3-t_0)$ are formed. The computer then proceeds to block 359, where these differences are inserted into the position computation equations described earlier in order to solve for the possible positions of the identified aircraft in terms of the spherical coordinates $(r, \theta, \phi)$. As noted previously, it is a consequence of the equatorial satellite pattern employed that two different solutions to the position equations occur for each valid set of time differences $(t_2-t_0)$, $(t_1-t_0)$ and $(t_3-t_0)$. One solution is the true position of the aircraft, and the other is an ambiguous solution corresponding to the mirror-image position of the aircraft with respect to the equatorial plane of the earth. In block 360, the ambiguous solution is rejected in order to isolate the true aircraft location. This is easily accomplished in the system software given the fact that most air routes begin and end in the same hemisphere. In most cases, therefore, it will merely be necessary to provide the ground station computer with the starting location of the aircraft, which can be inferred from the identity of the airport from which the aircraft originated or last touched down. It is possible, however, to design the system software in such a manner that equatorial crossings by the monitored aircraft are detected and fully accounted for. Thus, for example, as the latitude of a particular aircraft approaches zero, the ground station computer may be programmed to calculate the sign and approximate magnitude of the time derivative $d\theta/dt$ based on one or more previously stored position calculations for that aircraft and the time elapsed since they were carried out. When the latitude of the aircraft subsequently reaches zero, the results of this calculation may be used to determine whether the aircraft is in fact crossing from the northern hemisphere to the southern hemisphere, or vice-versa. In the ambiguous situation where the time derivative $d\theta/dt$ is itself equal to zero when the aircraft reaches zero latitude, as would be the case if the aircraft were to be flown along the equator, mirror images of the aircraft in both hemispheres may be tracked after the aircraft leaves the equator for collision avoidance purposes. The proper image may then be selected when the aircraft reaches a known reference point, such as the airport where it is to land.

Having now isolated the true aircraft location, the computer next proceeds to block 361 of the program, where the aircraft position in terms of the spherical coordinates $(r, \theta, \phi)$ is converted to the aircraft's latitude, longitude and altitude. This information is then provided to air traffic control personnel by means of CRT displays or other output devices, and may also be routed to suitable NPG-encoding equipment for returning the calculated position data to the particular aircraft to which it relates. The computer next proceeds to block 362, where the position data just calculated is compared with position data that was previously calculated for the same aircraft and stored at a number of reserved locations in the identified memory data block. In block 363, the results of this comparison are used to obtain the speed, rate of climb or descent, and true course of the aircraft based on the time elapsed between successive position calculations. This information is likewise provided to air traffic control personnel by means of CRT display or other output devices, and may also be routed to suitable NPG-encoding equipment for returning the calculated data to the particular aircraft to which it relates. In block 364, the aircraft's currently calculated latitude, longitude and altitude, together with the $t_0$ value on which the calculation was based, are stored at the locations in the identified memory data block which are reserved for prior position data, thereby displacing the earlier latitude, longitude, altitude and $t_0$ values which had been stored there. The computer then proceeds to block 365, where the return signal arrival times $t_1$, $t_2$ and $t_3$ are cleared from their respective memory locations in order to prepare the system to receive and process the next set of return signals from the same aircraft (the $t_0$ location in the data block is also cleared at this time, although its contents has already been preserved in block 364 for use in determining the elapsed time between successive position calculations). When this has been completed, the computer returns to the READ block 334 (FIG. 20A) in order to begin processing the timing information derived from the next return signal that is received at the ground station, which may relate to the same aircraft or to an entirely different aircraft.

As indicated earlier, it may be desirable for aircraft used in cross-country flight to have, optionally, direct access to the accurate position, speed, course and rate of climb information which has been calculated at the ground station for use by the ATC. In those aircraft, such information could supplement, or replace, the navigational information normally provided by cockpit instruments and specialized airborne radio equipment. FIG. 21 depicts an exemplary system for encoding this information onto a navigational pulse group (NPG) for transmission back to the particular aircraft to which it relates. A typical inventory of NPG pulses would be as follows:

TABLE 3

| Number of Bits | Inventory of Pulses in NPG Signal |
|---|---|
| | Purpose |
| 22 | Address code of aircraft (ABT bits) |
| 6 | Elapsed time (to 0.02 second) since ABT signal on which position calculation is based |
| 11 | Groundspeed to 2,000 knots, in units of one knot |
| 10 | Course to 0.5 degree |

TABLE 3-continued

Inventory of Pulses in NPG Signal

| Number of Bits | Purpose |
|---|---|
| 12 | Climb/descent rate to 20,000 feet/minute, in units of 10 feet/minute |
| 51 | Latitude and longitude in degrees/minutes/seconds |
| 17 | Altitude (from MSL) to 100,000 feet in units of one foot |
| 6 | Message bits |
| 2 | ABT rate control bits |
| 30 | Autopilot control bits |
| 169 | Total |

These bits are loaded by the ground station computer into corresponding multi-bit blocks of a shift register 374. In particular, the ABT bits loaded into block 376 of the shift register are the same as the 22 aircraft-identifying bits included in the beacon signal pulse group of FIG. 5. The elapsed time that is loaded into block 378 of the shift register is calculated on the basis of the transmission time $t_0$ of the interrogation signal that initiated the position calculation in question. The speed, course and rate of climb block 380 and the latitude, longitude and altitude block 382 are loaded with the information derived from the computations carried out by the ground station computer in accordance with the flowchart of FIGS. 20A–20C. A total of six message bits are provided for in block 384: one is used to indicate that ATC desires voice communication with the pilot, and the remaining five are used to designate one of 32 standard messages to the pilot (e.g., terrain alert; descending to unsafe altitude; or collision danger from aircraft left/-right, above/below, or oncoming/overtaking). Either one of two bits may be loaded into block 386 of the shift register to alter the ABT signal repetition rate of the addressed aircraft. Finally, a total of 30 bits are loaded into block 388 to control the autopilot functions of suitably equipped aircraft. Among these are bits for controlling the aircraft's turn rate, pitch angle, and yaw angle, as well as additional bits for implementing various discrete action commands (e.g. throttle setting, flap extension, landing gear extension, and ground taxi steering).

When the shift register blocks 376-388 have all been loaded, the ground station computer produces a succession of clock pulses on line 390 for gating the stored bits onto line 392 in serial fashion. The resulting pulse train is applied to pulse amplifier 394, modulator 396, and RF oscillator 398 for transmission as the NPG signal to the ground link satellite S2 by means of a suitable narrow beam antenna 400. This transmission occurs at a carrier frequency $f_3$ which is different from the interrogation signal frequency $f_1$ and the ABT frequency $f_2$. The narrow beam antenna 400 may be the same as the antenna 224 of FIG. 17 if a suitable mixer is employed. From the satellite S2, the NPG signal is relayed to all aircraft within range of the system by means of a suitable broad-beam antenna as described earlier.

Aircraft NPG-Receiving Circuitry

FIG. 22 illustrates an exemplary system for receiving and processing NPG signals aboard the individual aircraft. The NPG signals are received from the ground link satellite S2 by means of a suitable broad-beam antenna 402, and are applied to amplifier 404 and detector 406 to yield the pulse envelope on line 407. The pulse train appearing on line 407 is applied to the input of a serial-to-parallel converter 408, which is provided with parallel multi-bit outputs 410-422 corresponding to the respective blocks 376-388 in the shift register 374 of FIG. 21. All of the outputs of the serial-to-parallel converter 408, with the exception of the output 410 for the 22 aircraft-identifying ABT bits, are applied to corresponding routing gates 430-440 in the routing gate unit 428. The individual routing gates 430-440 in the unit 428 are controlled simultaneously by signals appearing on the control input line 426. Line 426 is connected to the output of an address comparator 424, which tests for equivalence between the ABT bits appearing on the serial-to-parallel converter output 410 and the internally-stored 22-bit identifying code for the particular aircraft in question. Detection of such address equivalence causes the address comparator 424 to produce an output signal on line 426, which in turn causes the digital information on output lines 412-422 of the serial-to-parallel converter 408 to appear on the corresponding output lines 442-452 of the routing gates 430-440. In this way, the only navigational information which is passed to the routing gate outputs 442-452 is that which has been derived from NPG signals identifying that particular aircraft, the NPG signals intended for other aircraft having been rejected due to nonequivalence between their ABT bits and the 22-bit code that has been preprogrammed into the address-comparator 424.

Assuming now that an NPG signal has been received which identifies the particular aircraft in question, that aircraft's latitude, longitude and altitude will appear on line 446 and its speed, course and rate of climb (or descent) will appear on line 444. This information has been calculated by the ground station based on the last beacon signal produced by the aircraft, and therefore may be subject to some inaccuracy depending upon the amount of time that has elapsed since that beacon signal was transmitted. In order to allow the aircraft to correct for any such inaccuracy, the ground station computes this time interval based on the transmission time $t_0$ of the last interrogation signal and the calculated aircraft position, and transmits this information to the aircraft as part of the NPG signal. The computed time interval appears on output line 442 of the routing gate 430 and is applied, together with the information on lines 444 and 446, to a position updating unit 454. This unit, which may be implemented by means of a microprocessor or other suitably programmed data processing equipment, computes the present latitude, longitude and altitude of the aircraft based upon its latitude, longitude and altitude at the time the beacon signal was transmitted, its speed, course and rate of climb (or descent) as calculated at the ground station, and the elapsed time appearing on line 442. This is a routine calculation and need not be described in detail. The updated latitude, longitude and altitude of the aircraft, together with the aircraft's speed, course and rate of climb or descent as calculated at the ground station, are placed in display registers 456, which provide output buffering for the cockpit display devices 458. The cockpit displays may comprise a number of segmented-type display devices, such as light-emitting diodes or liquid crystal displays, or a single CRT-type display on which the aircraft's latitude, longitude, altitude, speed, course and rate of climb or descent are presented in some convenient format.

As indicated earlier, the NPG signal also includes six message bits, one of which is used to indicate that ATC desires voice communication with the pilot, and the remaining five being used to send one of 32 different standard messages to the aircraft crew (e.g., terrain alert, descending to unsafe altitude, and so on). In response to a positive comparison by the address comparator 424, these bits appear at the output 448 of the routing gate 436 and are applied to a decoder 460. The decoder 460 determines which message is intended, and whether the communication bit is present, and provides the appropriate display-controlling information to the display registers 462. The registers 462 provide output buffering for the cockpit message display unit 468, which may comprise a separate set of segmented-type display devices or the single CRT display unit referred to previously.

The output 420 of the serial-to-parallel converter 408 isolates the two reserved NPG bits that are used, in suitably equipped aircraft, for changing the inhibit interval of the aircraft's ABT (or, inversely, its frequency of response to interrogation signals transmitted by the ground station). Referring briefly to the modified inhibit circuit of FIG. 14, it will be recalled that the inhibit interval produced by this circuit may be increased or decreased, as the case may be, by applying one or more pulses to the "SHIFT LEFT" input 150 or to the "SHIFT RIGHT" input 152. These pulses are derived from the two ABT rate bits that appear on the serial-to-parallel converter output 420 in FIG. 22. When address equivalence is detected by the address comparator 424, these bits are passed through routing gate 438 to its output 450, and from there to the input of a decoder 470. Since two ABT rate bits are provided, four discrete outputs from the decoder 470 are possible. Thus, for example, a (01) bit code may be used to produce a "SHIFT LEFT" output from the decoder and a (10) bit code may be used to produce a "SHIFT RIGHT" output. The bit sequence (11) may be used to indicate no change (i.e., that the present ABT rate is to be maintained). Optionally, the remaining bit sequence (00) may be used to cause the ABT to revert to its minimum response rate (i.e., maximum inhibit interval) after a preset time period, maintaining its present rate in the interim. It should be apparent from an inspection of FIGS. 14 and 22 that a given change in the ABT rate may require several successive NPG signals, since each NPG can command only one "SHIFT LEFT" or "SHIFT RIGHT" operation in the shift register 112 of FIG. 14. Thus, for example, an increase by a factor of 8 (or $2^3$) in the ABT rate would require 3 successive "SHIFT LEFT" pulses to be applied to the input line 150 in FIG. 14, which would in turn require 3 successive NPG signals to be received and decoded by the aircraft-carried NPG circuitry of FIG. 22.

The last group of NPG bits that are of interest in FIG. 22 are the autopilot control bits, which appear on output 422 of the serial-to-parallel converter 408. In response to a detection of address equivalence by the address comparator 424, these bits are passed to the output 452 (shown in phantom) of the routing gate 440 for use by suitably equipped aircraft as will be described hereinafter in connection with FIG. 24.

FIG. 23 illustrates a modification of the aircraft-carried NPG receiving circuitry of FIG. 22 that can provide pilots of equipped aircraft with information about other aircraft near them. The pilots of such aircraft may desire to know not only their own positions and courses, but the relative positions and courses of all other aircraft within a given radius, or within a given radius and a certain altitude interval. Accordingly, the position updating unit 454 is arranged to update the latitude, longitude and altitude information contained in every NPG signal received by the serial-to-parallel converter 408, rather than only those NPG signals having ABT bits which match the identification code of the particular aircraft in question. The updated latitude, longitude and altitude of each such aircraft, and the speed, course and rate of climb (or descent) of the aircraft is calculated at the ground station, are applied, respectively, to the routing gates 434 and 432 of the routing gate unit 428. Unlike the corresponding routing gates of FIG. 22, however, the routing gates 434 and 432 of FIG. 23 are each provided with two alternative outputs. In response to a detection of address equivalence by the address comparator 424, the outputs 444 and 446 are enabled and the outputs 443 and 445 are disabled (the outputs 448-452 of the remaining routing gates 436-440 are also enabled as described earlier). This causes the navigational information obtained from the position updating unit 454 to be directed to the display registers 456 and thereby to the cockpit displays 458 as described previously in connection with FIG. 22. In the absence of a positive address comparison at the address comparator 424, however, the routing gate outputs 444 and 446 are disabled (as are the remaining routing gate outputs 436-440) and the alternative outputs 443 and 445 are enabled instead. This causes the navigational information provided by the position updating unit 454 to be directed instead to the position comparison unit 472, where the position of the aircraft to which the received NPG signal relates is compared with the position (still latched on display registers 456) of the aircraft receiving it. If the aircraft to which the NPG signal relates is found to be within a predetermined radius or altitude of the receiving aircraft, the position of the former aircraft is displayed on a situation monitor 474 provided in the cockpit of the receiving aircraft; otherwise it is discarded. The situation monitor 474 may, for example, include a circular CRT screen similar to those used in radar tracking, with the position of the receiving aircraft at the center of the display and the positions of other aircraft designated by appropriate symbols or "blips" at points on the display corresponding to their relative positions with respect to the receiving aircraft. With suitable buffering, the positions of all aircraft within the predetermined radius may be thus displayed, and each "blip" may be tagged on the display with the latitude, longitude, altitude, speed, course, and rate of climb (or descent) of the corresponding aircraft.

FIG. 24 illustrates an exemplary system for implementing automatic (i.e., NPG-controlled) flight in aircraft equipped with a suitable three-axis autopilot. In such aircraft, the bit-frequency precision of the ABT should be made relatively high (i.e., 0.5% or better) in order that the time relation of the final timing pulse (bit 32 in FIG. 5) to the initial timing pulse (bit 1 in FIG. 5) be known accurately. The two pulses can then contribute to a better overall measurement of the arrival times $t_1$, $t_2$ and $t_3$, and thereby to a more accurate determination of aircraft position. Such precision would be called for primarily in the case of automatic landings.

With particular reference now to FIG. 24, the 30-bit output 452 of the routing gate 440 of FIG. 22 or 23 is applied to a 30-bit command register 476. The register 476 is provided with a number of multi-bit stages 478-484 for receiving the digital turn rate, pitch angle, yaw angle, and discrete action commands which have been encoded into the NPG signal by the ground station. The digital turn rate command is applied to a digital-to-analog converter 486 to produce an analog signal which is used to control the aileron effectors 490. Negative feedback is provided by applying an analog signal from a turn rate gyro 492 to the summing device 488. In a similar manner, the pitch angle command is applied to a digital-to-analog converter 494 to produce an analog signal which is used to control the elevator effector 498. Negative feedback is provided by applying an analog signal from a pitch angle sensor 500 to the summing device 496. An input 520 from landing gear ground contact sensors 518 is applied to the command register 476 to override the NPG-derived pitch angle command when the aircraft touches down, thereby allowing the nose of the aircraft to be brought down at the proper moment during landing. The yaw angle command is applied to a digital-to-analog converter 502 to produce an analog signal which is used to control the rudder actuator 506. Negative feedback is provided in this case by applying an analog voltage input from a yaw sensor 508 to the summing device 504. Finally, a number of discrete action commands (e.g., throttle setting increments, flap extension increments, landing gear extension, and ground taxi steering increments) are accumulated in the last section 484 of the command register 476. Each of these commands is applied to an actuator 510 (only one of which has been shown in FIG. 24 for simplicity) for the corresponding aircraft component 512. Completion of the desired action is detected by completion sensor 516, which responds by resetting (i.e., clearing) the section of the register 476 that contained the command.

Operation

Although the manner in which the present system operates has already been described in the course of the general system description set forth earlier, a number of important advantages of the system which adhere to some extent in the specific subsystems and components described in the preceding sections may now be appreciated. These advantages may be summarized as follows:

(1) Simplicity: Because each aircraft need only carry an ABT plus minimal radio communications equipment to operate under air traffic control, all aircraft, regardless of cost and complexity, can be within the air traffic control system and receive anti-collision protection from the system. In addition, since the system of the present invention centralizes all complex time measurement and computational equipment at a single ground station, the system can be upgraded (and additonal levels of redundancy added) without duplicating the expense involved for each aircraft using the system.

(2) Increased precision: Aircraft locations can be determined with high precision and updated rapidly during any changes. For example, if operating frequencies between 2 GHz and 3 GHz are used (corresponding to the radar S-band for which forty years of practical manufacturing experience exists, and for which radio absorption by rain would be minimal), there are roughly 2½ oscillations of the carrier frequency per nanosecond. Using standard techniques such as measurement of the leading and trailing edges of a received signal, a time precision of better than one nanosecond may be obtained in the measurement of return signal arrival times at the ground station. With reference to Tables 1 and 2 above, this corresponds to a calculated position accuracy on the order of a few feet for locations above the continental United States, a precision that is more than adequate for the precision approach and automated flight applications referred to earlier. The value of the present system is not, however, dependent on obtaining one-nanosecond time resolution. Indeed, if its time-difference measurement errors were as great as ten nanoseconds, its precision would still greatly exceed the precision of present-day air traffic radar, even assisted by pressure-altimeter readout from the aircraft.

(3) Resistance to saturation: The present system is inherently capable of expanding, without obsolescence, to accommodate enormous long-term increases in the number of aircraft to be monitored. This is done by conferring on each aircraft, by virtue of the inhibit circuit in its ABT, the ability to ignore most of the interrogation signals produced by the ground station. Thus as the total number of aircraft increases, the effective response rate of the slowest and simplest aircraft (e.g., sailplanes or homebuilt aircraft) may be reduced in order to allow additional aircraft to use the system without exceeding the signal and data processing capabilities of the ground station hardware. As noted previously in connection with the inhibit circuit of FIG. 13, this can be done quite simply and inexpensively, merely by replacing one nonprecision circuit element in the airborne ABT. The possibility of saturation is even further reduced by providing for automatic variation of the inhibit intervals of at least some of the aircraft ABTs by the ground station, as implemented by the modified inhibit circuit of FIG. 14. This permits the effective response rates of high-speed aircraft to be reduced while they are in straight and level flight far from other aircraft, while preserving the aircraft's potential for a higher response frequency in and around zones of high density air traffic. As a result, the overall burden on the ground station signal processing and computational equipment is reduced considerably.

(4) Increased speed of response: Because the present system does not require radar's azimuthal sweep, it is inherently much faster. Whereas conventional radar air traffic control systems are capable of reading out the position of a given aircraft once every six to ten seconds, the present system can report the position of an aircraft several times per second. In addition, since the present system does not rely on scanning over a series of discrete spatial segments, it does not saturate (as does radar due to its poor spatial resolution) if many aircraft occupy a small region of airspace, as is often the case near a major airport.

(5) Location of aircraft on the ground: For all airports except a very few near steep cliffs, all three of the geosynchronous satellites S1, S2 and S3 will have a line-of-sight relationship to any aircraft on the ground. This allows for high-precision monitoring of aircraft taxiing, take-off, and landing without the need for supplementary equipment at the airport location.

(6) Emergency location: The ABT with which each aircraft is provided in the present system can replace (and, in fact, outperform) the so-called Emergency Locator Transmitter (ELT) that is now required by law to be carried aboard all aircraft. The ABT would simply stop operating on crash impact, due to the disruption of the aircraft's electrical system, and the downed aircraft could then be located by noting the point at which the beacon signals from its ABT ceased (i.e., its last calculated position). In contrast, the ELTs presently in use are intended to begin signaling after a crash occurs, which is far more difficult from a technical standpoint, and often go unheard or unlocated until their batteries run down.

Although the present invention has been described with reference to a preferred embodiment, it is to be understood that the invention is not limited to the details thereof. A number of different modifications and substitutions, some of which have been suggested in the foregoing detailed description, may be made therein without departing from the scope of the invention as defined in the appended claims.

What is claimed is:

1. A system for determining the positions of a plurality of vehicles traveling on or above a defined sector of the earth's surface, comprising:
   (a) a transponder carried by each one of said vehicles for transmitting, in response to a general interrogation signal directed to said plurality of vehicles, a beacon signal coded with information uniquely identifying said one vehicle, said transponder including means reponsive to said general interrogation signal for inhibiting the transmission of further beacon signals by said transponder for a predetermined time interval following the response of said transponder to said general interrogation signal;
   (b) three satellites at spaced orbital locations above the earth, each of said satellites carrying repeater means for receiving and retransmitting the beacon signals transmitted by said vehicle transponders, said three satellites thereby collectively producing three retransmitted beacon signals for each beacon signal produced by each one of said vehicle transponders; and
   (c) a ground station for periodically transmitting said general interrogation signal and for receiving and processing said retransmitted beacon signals, said ground station including:
      (1) means for detecting the arrival time of each retransmitted beacon signal at the ground station;
      (2) means for detecting the vehicle identifying information carried by each retransmitted beacon signal; and
      (3) means for calculating the instantaneous position of each one of said vehicles within said sector based upon the time of transmission of the interrogation signal from the ground station and the arrival times of the three retransmitted beacon signals which carry vehicle identifying information identifying said one vehicle.

2. A system for determining the positions of a plurality of vehicles traveling on or above a defined sector of the earth's surface in accordance with claim 1, wherein the inhibiting means of said vehicle transponders include timing means for establishing the duration of said inhibited intervals, said timing means being effective to establish inhibited intervals for at least some of said vehicle transponders which are different in duration from the inhibited intervals of the remainder of said vehicle transponders.

3. A system for determining the positions of a plurality of vehicles traveling on or above a defined sector of the earth's surface in accordance with claim 1, wherein the inhibiting means of at last one of said vehicle transponders includes control means for varying the inhibited interval of said transponder.

4. A system for determining the positions of a plurality of vehicles traveling on or above a defined sector of the earth's surface in accordance with claim 3, wherein:
   (a) the ground station is provided with means for transmitting a command signal to said vehicle transponder, said command signal carrying information for varying the inhibited interval of said transponder;
   (b) said vehicle includes means for receiving said command signal and applying the imformation carried thereby to said control means; and
   (c) said control means is effective to vary the inhibited interval of said transponder in accordance with the information carried by said command signal.

5. A system for determining the positions of a plurality of vehicles traveling on or above a defined sector of the earth's surface in accordance with claim 3, wherein the inhibiting means of said at least one vehicle transponder includes:
   (a) a fixed frequency clock for producing a continuous succession of clock pulses at its output;
   (b) a binary counter for producing an output signal when a predetermined number of clock pulses has been counted, said output signal defining the end of the inhibited interval; and
   (c) means responsive to the receipt of a general interrogation signal by said transponder for causing the binary counter to begin counting the clock pulses produced at the output of the fixed frequency clock;
   and wherein said control means includes means for varying the predetermined pulse count at which the binary counter produces an output signal.

6. A system for determining the positions of a plurality of vehicles traveling on or above a defined sector of the earth's surface in accordance with claim 5, wherein said binary counter includes a plurality of serially connected binary counting stages of different order, and wherein said means for varying the predetermind pulse count at which the binary counter produces an output signal includes means for selecting as the output of said binary counter the output of one of a number of said binary counting stages of different order.

7. A system for determining the positions of a plurality of vehicles traveling on or above a defined sector of the earth's surface in accordance with claim 6, wherein:
   (a) the ground station is provided with means for transmitting a command signal to said vehicle transponder, said command signal carrying information for designating the output of one of said binary counting stages as the output of said binary counter;
   (b) said vehicle includes means for receiving said command signals and applying the information carried thereby to said selecting means; and
   (c) said selecting means is effective to select as the output of said binary counter the output of the binary counting stage designated by the information carried by the command signal.

8. A system for determining the positions of a plurality of vehicles traveling on or above a defined sector of the earth's surface in accordance with claim 5, wherein said binary counter includes a plurality of serially connected binary counting stages of different order, and wherein said control means comprises:
   (a) a number of AND gates equal in number to said number of binary counting stages of different order, the first input of each of said AND gates being connected to the output of one of said number of binary counting stages of different order;
   (b) a shift register having a number of stages equal to the number of said AND gates, the output of each of said shift register stages being connected to the second input of a different one of the AND gates;

(c) an OR gate receiving as inputs the outputs of all of said AND gates, an output signal from said OR gate defining the end of the inhibited interval; and (d) means responsive to a command signal from the ground station for enabling the second input of a selected one of said AND gates by moving a binary bit to the corresponding one of said shift register stages, thereby giving rise to a signal at the output of said OR gate when a selected pulse count has been accumulated in the binary counter.

9. A system for determining the positions of a plurality of vehicles traveling on or above a defined sector of the earth's surface in accordance with claim 8, wherein the inhibiting means of said at least one vehicle transponder further includes a latch having a SET input, a RESET input, and an output, said latch output assuming a first state in response to a signal at its SET input and a second state in response to a signal at its RESET input, the first state of said latch output being effective to inhibit the transmission of beacon signals by said transponder, and further wherein:

(a) said vehicle transponder includes means for applying a signal to the SET input of said latch in response to the receipt of a general interrogation signal by said transponder;

(b) the output of the said OR gate is applied to the RESET input of said latch; and (c) said means for causing the binary counter to begin counting the clock pulses produced at the output of the fixed frequency clock comprises an AND gate having its first input connected to the latch output, its second input connected to the output of the fixed frequency clock, and its output connected to the input of the binary counter.

10. A system for determining the positions of a plurality of vehicles traveling on or above a defined sector of the earth's surface in accordance with claim 9, wherein said means for applying a signal to the SET input of said latch includes means for delaying the appearance of said signal at the SET input with respect to the time that the general interrogation signal is received by the vehicle transponder by a time interval at least as long as the duration of the beacon signal transmitted by the vehicle transponder, thereby enabling said transponder to transmit a complete beacon signal in response to said general interrogation signal prior to the onset of the inhibited interval.

11. A system for determining the positions of a plurality of vehicles traveling on or above a defined sector of the earth's surface in accordance with claim 1, wherein said three satellites are in geosynchronous equatorial orbit about the earth, each of said satellites being located in a different longitudinal position in said orbit, and wherein one of said satellites carries additional repeater means for receiving and retransmitting to the ground station the beacon signals which have been received from the vehicle transponders and retransmitted by the two remaining satellites, whereby said one satellite functions as a fixed communication link with the ground station for relaying to said ground station the retransmitted beacon signals produced by the two remaining satellites.

12. A system for determining the positions of a plurality of vehicles traveling on or above a defined sector of the earth's surface in accordance with claim 11, wherein the satellite which functions as the fixed communication link with the ground station includes means for modifying in a characteristic manner the beacon signals retransmitted by a least one of the two remaining satellites during the relaying of said retransmitted beacon signals to the ground station, and wherein:

(a) the ground station includes means for detecting the characteristic modification, or lack thereof, in each retransmitted beacon signal; and (b) said calculating means is effective to associate said retransmitted beacon signal with the particular one of said satellites which produced it according to the characteristic modification, or lack thereof, which has been detected in said retransmitted beacon signal by said detecting means.

13. A system for determining the positions of a plurality of vehicles traveling on or above a defined sector of the earth's surface in accordance with claim 12, wherein the beacon signal transmitted by each vehicle transponder is a digital pulse group carrying successive bits of digital information, the successive pulses of said pulse group being of substantially equal amplitude, and wherein:

(a) the beacon signal modifying means in the satellite which functions as the fixed communication link with the ground station comprises means for retransmitting said digital pulse group in a manner such that one or more of the leading pulses of the retransmitted pulse group have an amplitude substantially different from that of the remaining pulses of said retransmitted pulse group;

(b) the characteristic modification detecting means at the ground station comprises means for detecting the amplitude of one or more of the leading pulses of a retransmitted beacon signal pulse group and for detecting the amplitude of one or more of the remaining pulses of said pulse group; and (c) said calculating means is effective to compare the amplitude of said one or more leading pulses with the amplitude of said one or more remaining pulses, the result of said comparison enabling the calculating means to associate the retransmitted beacon signal with the particular one of said satellites which produced it.

14. A system for determining the positions of a plurality of vehicles traveling on or above a defined sector of the earth's surface in accordance with claim 1, wherein each vehicle transponder includes serial pulse generating circuitry for generating the beacon signal in the form of a digital pulse group carrying successive bits of digital information, said pulse group comprising a leading pulse for marking the beginning of the beacon signal, a trailing pulse for marking the end of the beacon signal, and a plurality of intermediate pulses between said leading and trailing pulses for digitally carrying the information uniquely identifying said one vehicle.

15. A system for determining the positions of a plurality of vehicles traveling on or above a defined sector of the earth's surface in accordance with claim 14, wherein the beacon signal nominally occupies a predetermined time interval between said leading and trailing pulses, and wherein:

(a) the ground station further includes means for detecting a retransmitted beacon signal which occupies a time interval in excess of said predetermined nominal time interval by more than a prescribed tolerance and for producing a rejection signal in response thereto; and (b) said calculating means is responsive to said rejection signal to suppress the use of said retransmitted beacon signal in the calculation of vehicle position.

16. A system for determining the positions of a plurality of vehicles traveling on or above a defined sector of the earth's surface in accordance with claim 14, wherein said means for detecting the arrival time of each retransmitted beacon signal at the ground station comprises:
(a) a fixed frequency local clock;
(b) means for detecting the leading pulse of said retransmitted beacon signal and for producing a numerical value indicative of the arrival time of said leading pulse as measured against said local clock; and
(c) means for detecting the trailing pulse of said retransmitted beacon signal and for producing a numerical value indicative of the arrival time of said trailing pulse as measured against said local clock.

17. A system for determining the positions of a plurality of vehicles traveling on or above a defined sector of the earth's surface in accordance with claim 16, wherein said means for detecting the vehicle identifying information carried by each retransmitted beacon signal includes:
(a) a shift register having a plurality of stages for receiving the successive incoming bits of digital information carried by each beacon signal pulse group;
(b) a variable frequency clock for clocking the successive incoming bits of digital information carried by each retransmitted beacon signal into successive stages of the shift register, the frequency of said variable frequency clock being varied according to the magnitude of an analog control voltage; and
(c) means for deriving said analog control voltage as a function of the difference between the arrival times of the leading and trailing pulses of each retransmitted beacon signal, said difference being indicative of the bit rate of the digital information carried by said beacon signal, whereby the clocking rate of the shift register is accurately matched to the bit rate of the digital information carried by the beacon signal.

18. A system for determining the positions of a plurality of vehicles traveling on or above a defined sector of the earth's surface in accordance with claim 17, wherein the beacon signal nominally occupies a predetermined time interval between said leading and trailing pulses, and wherein:
(a) the ground station further includes means for detecting a retransmitted beacon signal which occupies a time interval in excess of said predetermined nominal time interval by more than a prescribed tolerance and for producing a rejection signal in response thereto; and
(b) said calculating means is responsive to said rejection signal to suppress the use of said retransmitted beacon signal in the calculation of vehicle position.

19. A system for determining the positions of a plurality of vehicles traveling on or above a defined sector of the earth's surface in accordance with claim 14, wherein:
(a) said means for detecting the arrival time of each retransmitted beacon signal at the ground station comprises:
(1) a fixed frequency local clock;
(2) means for detecting the leading pulse of said retransmitted beacon signal and for producing a numerical value indicative of the arrival time of said leading pulse as measured against said local clock; and
(3) means for detecting the trailing pulse of said retransmitted beacon signal and for producing a numerical value indicative of the arrival time of said trailing pulse as measured against said local clock; and further wherein
(b) said calculating means is effective to average the numerical values indicative of the arrival times of said leading and trailing pulses to obtain an average value indicative of the arrival time of said retransmitted beacon signal at the ground station.

20. A system for determining the positions of a plurality of vehicles traveling on or above a defined sector of the earth's surface in accordance with claim 1, wherein the ground station further includes signal encoder means for generating a navigational signal carrying position information calculated at the ground station for a selected one of said vehicles and a preassigned address uniquely identifying said selected vehicle, and a transmitter for transmitting said navigational signal to said plurality of vehicles, and further wherein said selected vehicle includes:
(a) a receiver for receiving the navigational signal transmitted by the ground station;
(b) means for detecting equivalence between the address carried by the navigational signal and the preassigned address uniquely identifying said selected vehicle; and
(c) means for displaying the position information carried by the navigational signal when said address equivalence is detected.

21. A system for determining the positions of a plurality of vehicles traveling on or above a defined sector of the earth's surface in accordance with claim 20, wherein the inhibiting means of the transponder carried by said selected vehicle includes control means for varying the inhibited interval of said transponder in response to a command signal, and wherein:
(a) said navigational signal is further encoded with control information generated at the ground station for varying the inhibited interval of said selected vehicle transponder; and
(b) said selected vehicle further includes means for deriving the command signal from said control information when said address equivalence is detected.

22. A system for determining the positions of a plurality of vehicles traveling on or above a defined sector of the earth's surface in accordance with claim 20, wherein said navigational signal is also encoded with control information generated at the ground station for controlling the motion of said selected vehicle, and wherein said selected vehicle further includes means for automatically controlling the motion of said vehicle in accordance with said control information when said address equivalence is detected.

23. A system for determining the positions of a plurality of vehicles traveling on or above a defined sector of the earth's surface in accordance with claim 20, wherein said three satellites are in geosynchronous equatorial orbit about the earth, each of said satellites being located in a different longitudinal position in said orbit, and wherein one of said satellites includes additional repeater means for relaying the navigational signal to said plurality of vehicles.

24. A vehicle-carried transponder for use in connection with a system for determining the positions of a plurality of vehicles traveling on or above the earth's surface, said transponder comprising:
(a) means responsive to a general interrogation signal for transmitting a beacon signal coded with information uniquely identifying said vehicle; and (b) means responsive to said general interrogation signal for inhibiting the transmission of further beacon signals by said transmitting means for a predetermined time interval following the response of said transmitting means to said general interrogation signal.

25. A vehicle-carried transponder in accordance with claim 24, wherein said inhibiting means includes control means for varying the inhibited interval of said transponder.

26. A vehicle-carried transponder in accordance with claim 25, wherein:
(a) said transponder further comprises means for receiving a command signal carrying information for varying the inhibited interval of said transponder, and means for applying said information to said control means; and
(b) said control means is effective to vary the inhibited interval of said transponder in accordance with the information carried by said command signal.

27. A vehicle-carried transponder in accordance with claim 25, wherein said inhibiting means includes:
(a) a fixed frequency clock for producing a continuous succession of clock pulses at its output;
(b) a binary counter for producing an output signal when a predetermined number of clock pulses has been counted, said output signal defining the end of the inhibited interval; and
(c) means responsive to the receipt of a general interrogation signal by said transponder for causing the binary counter to begin counting the clock pulses produced at the output of the fixed frequency clock; and wherein said control means includes means for varying the predetermined pulse count at which the binary counter produces an output signal.

28. A vehicle-carried transponder in accordance with claim 27, wherein said binary counter includes a plurality of serially connected binary counting stages of different order, and wherein said means for varying the predetermined pulse count at which the binary counter produces an output signal includes means for selecting as the output of said binary counter the output of one of a number of said binary counting stages of different order.

29. A vehicle-carried transponder in accordance with claim 28, wherein:
(a) said transponder further comprises means for receiving a command signal carrying information for designating the output of one of said binary counting stages as the output of said binary counter, and means for applying said information to said selecting means; and
(b) said selecting means is effective to select as the output of said binary counter the output of the binary counting stage designated by the information carried by the command signal.

30. A vehicle-carried transponder in accordance with claim 27, wherein said binary counter includes a plurality of serially connected binary counting stages of different order, and wherein said control means comprises:
(a) a number of AND gates equal in number to said number of binary counting stages of different order, the first input of each of said AND gates being connected to the output of one of said number of binary counting stages of different order;
(b) a shift register having a number of stages equal to the number of said AND gates, the output of each of said shift register stages being connected to the second input of a different one of the AND gates;
(c) an OR gate receiving as inputs the outputs of all of said AND gates, an output signal from said OR gate defining the end of the inhibited interval; and
(d) means responsive to a received command signal for enabling the second input of a selected one of said AND gates by moving a binary bit to the corresponding one of said shift register stages, thereby giving rise to a signal at the output of said OR gate when a selected pulse count has been accumulated in the binary counter.

31. A vehicle-carried transponder in accordance with claim 30, wherein the inhibiting means further includes a latch having a SET input, a RESET input, and an output, said latch output assuming a first state in response to a signal at its SET input and a second state in response to a signal at its RESET input, the first state of said latch output being effective to inhibit the transmission of beacon signals by said transmitting means, and further wherein:
(a) said vehicle transponder includes means for applying a signal to the SET input of said latch in response to the receipt of a general interrogation signal by said transponder;
(b) the output of the said OR gate is applied to the RESET input of said latch; and
(c) said means for causing the binary counter to begin counting the clock pulses produced at the output of the fixed frequency clock comprises an AND gate having its first input connected to the latch output, its second input connected to the output of the fixed frequency clock, and its output connected to the input of the binary counter.

32. A vehicle-carried transponder in accordance with claim 31, wherein said means for applying a signal to the SET input of said latch includes means for delaying the appearance of said signal at the SET input with respect to the time that the general interrogation signal is received by the transponder by a time interval at least as long as the duration of the beacon signal transmitted by said transmitting means, thereby enabling said transmitting means to transmit a complete beacon signal in response to said general interrogation signal prior to the onset of the inhibited interval.

33. A method for determining the positions of a plurality of vehicles traveling on or above a defined sector of the earth's surface using three satellites at spaced orbital locations above the earth, each one of said vehicles carrying a transponder for transmitting, in response to a general interrogation signal directed to said plurality of vehicles, a beacon signal coded with information uniquely identifying said one vehicle, said method comprising the steps of:
(a) transmitting a general interrogation signal from a ground station to said plurality of vehicles in order to give rise to the transmission of beacon signals by said vehicle-carried transponders;
(b) inhibiting the transmission of further beacon signals by each of said vehicle-carried transponders for a predetermined time interval following the response of said transponder to the general interrogation signal;
(c) receiving said beacon signals at said three satellites and retransmitting said received beacon signals to the ground station from said three satellites, whereby three retransmitted beacon signals are produced by said satellites for each beacon signal produced by each of said vehicle transponders;

(d) receiving each of said retransmitted beacon signals at the ground station and detecting its arrival time;

(e) detecting the vehicle identifying information carried by each retransmitted beacon signal; and (f) calculating the instantaneous position of each one of said vehicles within said sector based upon the time of transmission of the interrogation signal from the ground station and the arrival times of the three retransmitted beacon signals which carry vehicle identifying information identifying said one vehicle.

34. A method for determining the positions of a plurality of vehicles traveling on or above a defined sector of the earth's surface as set forth in claim 33, wherein the step of inhibiting the transmission of further beacon signals by each of said vehicle-carried transponders comprises the following steps:

(a) inhibiting the transmission of further beacon signals by a first subgroup of said vehicle-carried transponders for a first predetermined time interval following the response of said transponders to the general interrogation signal; and (b) inhibiting the transmission of further beacon signals by a second subgroup of said vehicle-carried transponders for a second predetermined time interval following the response of said transponders to the general interrogation signal, said second predetermined time interval having a duration different from the duration of said first predetermined time interval.

35. A method for determining the positions of a plurality of vehicles traveling on or above a defined sector of the earth's surface as set forth in claim 33, wherein at least some of said vehicle-carried transponders include control means responsive to a received command signal for varying the predetermined time intervals following the response of said transponders to the general interrogation signal during which said transponders are inhibited from transmitting further beacon signals, and further comprising the step of transmitting said command signal from the ground station to at least one of said vehicles.

36. A method for determining the positions of a plurality of vehicles traveling on or about a defined sector of the earth's surface as set forth in claim 33 wherein said three satellites are in geosynchronous equatorial orbit about the earth, each of said satellites being located in a different longitudinal position in said orbit, and wherein the step of receiving the beacon signals at said three satellites and retransmitting said received beacon signals to the ground station from said three satellites comprises the following steps:

(a) receiving the beacon signals from the vehicle-carried transponders at two of said satellites and retransmitting the received beacon signals to the third satellite;

(b) receiving said retransmitted beacon signals at the third satellite;

(c) receiving beacon signals directly from the vehicle-carried transponders at the third satellite; and (d) retransmitting all beacon signals received at the third satellite to the ground station.

37. A method for determining the positions of a plurality of vehicles traveling on or above a defined sector of the earth's surface as set forth in claim 36, wherein the step of retransmitting all beacon signals received at the third satellite to the ground station includes the further step of modifying in a characteristic manner the beacon signals retransmitted by at least one of said first two satellites, and wherein the step of receiving each of said retransmitted beacon signals at the ground station and detecting its arrival time includes the further step of detecting the characteristic modification, or lack thereof, in each retransmitted beacon signal.

38. A method for determining the positions of a plurality of vehicles traveling on or above a defined sector of the earth's surface as set forth in claim 37, wherein the step of calculating the instantaneous position of each one of said vehicles within said sector includes the further step of associating each retransmitted beacon signal with the particular one of the satellites which produced it according to the characteristic modification, or lack thereof, which has been detected in said retransmitted beacon signal.

39. A method for determining the positions of a plurality of vehicles traveling on or above a defined sector of the earth's surface as set forth in claim 38, wherein the beacon signal transmitted by each vehicle transponder is a digital pulse group carrying successive bits of digital information, the successive pulses of said pulse group being of substantially equal amplitude, and wherein:

(a) the step of modifying in a characteristic manner the beacon signals retransmitted by at least one of said first two satellites comprises retransmitting said digital pulse group in a manner such that one or more of the leading pulses of the retransmitted pulse group have an amplitude substantially different from that of the remaining pulses of said retransmitted pulse group; and (b) the step of detecting the characteristic modification, or lack thereof, in each retransmitted beacon signal comprises comparing the amplitude of one or more of the leading pulses of a retransmitted beacon signal pulse group with the amplitude of one or more of the remaining pulses of said pulse group.

40. A method for determining the positions of a plurality of vehicles traveling on or above a defined sector of the earth's surface as set forth in claim 33, wherein the transmission of beacon signals by said vehicle-carried transponders comprises the following steps:

(a) transmitting a leading pulse for marking the beginning of the beacon signal;

(b) transmitting a plurality of intermediate pulses for carrying the information uniquely identifying said one vehicle; and (c) transmitting a trailing pulse for marking the end of the beacon signal, said leading, intermediate and trailing pulses together constituting a digital pulse group carrying successive bits of digital information.

41. A method for determining the positions of a plurality of vehicles traveling on or above a defined sector of the earth's surface as set forth in claim 40, wherein the beacon signal nominally occupies a predetermined time interval between said leading and trailing pulses, and further comprising the step of:

(a) detecting, at the ground station, any retransmitted beacon signal which occupies a time interval in excess of said predetermined nominal time interval by more than a prescribed tolerance;

(b) producing a rejection signal in response to the detection of a retransmitted beacon signal which exceeds said tolerance; and (c) suppressing the use of a retransmitted beacon signal which exceeds said tolerance in the calculation of vehicle position in response to the occurrence of said rejection signal.

42. A method for determining the positions of a plurality of vehicles traveling on or above a defined sector of the earth's surface as set forth in claim 40, wherein the step of receiving each of said retransmitted beacon signals at the ground station and detecting its arrival time comprises the following steps:

(a) detecting the leading pulse of said retransmitted beacon signal;

(b) producing a numerical value indicative of the arrival time of said leading pulse as measured against a local clock;

(c) detecting the trailing pulse of said retransmitted beacon signal; and (d) producing a numerical value indicative of the arrival time of said trailing pulse as measured against said local clock.

43. A method for determining the positions of a plurality of vehicles traveling on or above a defined sector of the earth's surface as set forth in claim 42, wherein the step of receiving each of said retransmitted beacon signals at the ground station and detecting its arrival time further comprises the step of averaging the numerical values indicative of the arrival times of said leading and trailing pulses to obtain an average value indicative of the arrival time of said retransmitted beacon signal at the ground station.

44. A method for determining the positions of a plurality of vehicles traveling on or above a defined sector of the earth's surface as set forth in claim 42, wherein the step of detecting the vehicle identifying information carried by each retransmitted beacon signal comprises the steps of:

(a) clocking the successive incoming bits of digital information carried by the retransmitted beacon signal into the successive stages of a shift register at a bit rate established by the frequency of a variable frequency clock, the frequency of said variable frequency clock being varied according to the magnitude of an analog control voltage; and (b) deriving said analog control voltage as a function of the difference between the arrival times of the leading and trailing pulses of each retransmitted beacon signal, said difference being indicative of the bit rate of the digital information carried by the beacon signal, whereby the clocking rate of the shift register is accurately matched to the bit rate of the digital information carried by the beacon signal.

45. A method for determining the positions of a plurality of vehicles traveling on or above a defined sector of the earth's surface as set forth in claim 44, wherein the beacon signal nominally occupies a predetermined time interval between said leading and trailing pulses, and further comprising the steps of:

(a) detecting, at the ground station, any retransmitted beacon signal which occupies a time interval exceeding said predetermined nominal time interval by more than a prescribed tolerance;

(b) producing a rejection signal in response to the detection of a retransmitted beacon signal which exceeds said tolerance; and (c) suppressing the use of a retransmitted beacon signal which exceeds said tolerance in the calculation of vehicle position in response to the occurrence of said rejection signal.

46. A method for determining the positions of a plurality of vehicles traveling on or above a defined sector of the earth's surface as set forth in claim 33, further comprising the steps of:

(a) generating a navigational signal carrying position information calculated at the ground station for one of said vehicles and a preassigned address uniquely identifying said one vehicle;

(b) transmitting the navigational signal to said plurality of vehicles; and (c) receiving the navigational signal at said plurality of vehicles;

(d) detecting equivalence at said selected vehicle between the address carried by the navigational signal and the preassigned address uniquely identifying said selected vehicle; and (e) displaying the position information carried by the navigational signal in response to the detection of said address equivalence.

47. A method for determining the positions of a plurality of vehicles traveling on or above a defined sector of the earth's surface as set forth in claim 46, wherein the transponder carried by said one selected vehicle includes control means for varying the inhibited interval of said transponder in response to a received command signal, and further comprising the steps of:

(a) further encoding said navigational signal with control information generated at the ground station for varying the inhibited interval of said transponder; and (b) deriving said command signal from the control information when said address equivalence is detected at said selected vehicle.

48. A method for determining the positions of a plurality of vehicles traveling on or above a defined sector of the earth's surface as set forth in claim 46, further comprising the steps of:

(a) further encoding the navigational signal with control information generated at the ground station for controlling the motion of a selected one of said vehicles; and (b) automatically controlling the motion of said selected vehicle in accordance with the control information when said address equivalence is detected.

49. A method for determining the positions of a plurality of vehicles traveling on or above a defined sector of the earth's surface as set forth in claim 46, wherein said three satellites are in geosynchronous equatorial orbit about the earth, each of said satellites being located in a different longitudinal position in said orbit, and wherein the step of transmitting the navigational signal to said plurality of vehicles is performed by repeater means carried on one of said satellites.

* * * * *